United States Patent
Suzuki et al.

(10) Patent No.: US 6,735,555 B1
(45) Date of Patent: May 11, 2004

(54) PROCESSING DEVICE FOR SEARCHING FOR A SUITABLE NETWORK SHAPE IN A GENERAL METRIC SPACE

(75) Inventors: Ichiro Suzuki, Kanagawa (JP); Shoichi Masuda, Kanagawa (JP); Shigeru Kameda, Kanagawa (JP); Ikuo Fukuda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/484,262

(22) Filed: Jan. 18, 2000

(30) Foreign Application Priority Data

Feb. 3, 1999 (JP) .............................................. 11-026761

(51) Int. Cl.$^7$ .............................................. G06F 17/10
(52) U.S. Cl. ................................ 703/2; 703/13; 703/21; 716/3
(58) Field of Search ................................ 703/2, 13, 21; 716/13

(56) References Cited

U.S. PATENT DOCUMENTS

| | | | | |
|---|---|---|---|---|
| 5,475,842 | A | * 12/1995 | Gilbert et al. | ............... 717/160 |
| 6,047,331 | A | * 4/2000 | Medard et al. | .............. 709/239 |
| 6,093,153 | A | * 7/2000 | Levin | ........................... 600/558 |
| 6,247,167 | B1 | * 6/2001 | Raspopovic et al. | ........... 716/13 |
| 6,310,883 | B1 | * 10/2001 | Mann et al. | ................. 370/408 |
| 6,374,202 | B1 | * 4/2002 | Robinson | ..................... 703/13 |
| 6,389,376 | B1 | * 5/2002 | Lam et al. | ...................... 703/2 |
| 6,401,234 | B1 | * 6/2002 | Alpert et al. | .................. 716/13 |
| 6,442,745 | B1 | * 8/2002 | Arunachalam et al. | ........ 716/13 |

OTHER PUBLICATIONS

"Mathematical Programming in a Hybrid Genetic Algorithm for Steiner Point Problems" D. Thuente, 1995 ACM symposium on Applied computing, Feb. 1995.*

"Merlin: Semi–Order–Independent Hierarchical Buffered Routing Tree Generation using Local Neighborhood Search" A. Salek, ACM 1–58113–109–7/99/06, 1999.*

"On Minimum Stars, Minimum Steiner Stars, and Maximum Matchings", S. Fekete, SCG99, ACM 1–58133–068–6/99/06, 1999.*

"A Multicast Routing Algorithm Reducing Congestion" A. Hac, Int. J. Network mgmt. vol. 7, pp. 147–163, 1997.*

"Closing the Gap: Near–Optimal Steiner Trees in Polynomial Time" J. Griffth, IEEE Transactions on Computer Aided Design of Integrated Circuits, Vol 13, No. 11, Nov. 1994.*

"A Consistant Hierarchical Representation for Vector Data", R. Nelson, SIGGRAPH 86, ACM 0–89791–196–2/86/008/0197, 198.*

"Automatic Array Alignment in Data–Parallel Programs", S. Chatterjee, ACM 0–80791–561–5/93/0001/0016, 1993.*

* cited by examiner

Primary Examiner—Kevin J. Teska
Assistant Examiner—Fred Ferris
(74) Attorney, Agent, or Firm—Staas & Halsey LLP

(57) ABSTRACT

A processing device generates a model of a tree in a given arbitrary space, reshapes the tree based on the nodes included in the tree, and outputs a reshape result. By repeating the reshape of the tree while examining the cost value of a reshaped tree, a local Steiner tree with a good cost value is obtained. A network shape is optimized by using the obtained local Steiner tree.

28 Claims, 68 Drawing Sheets

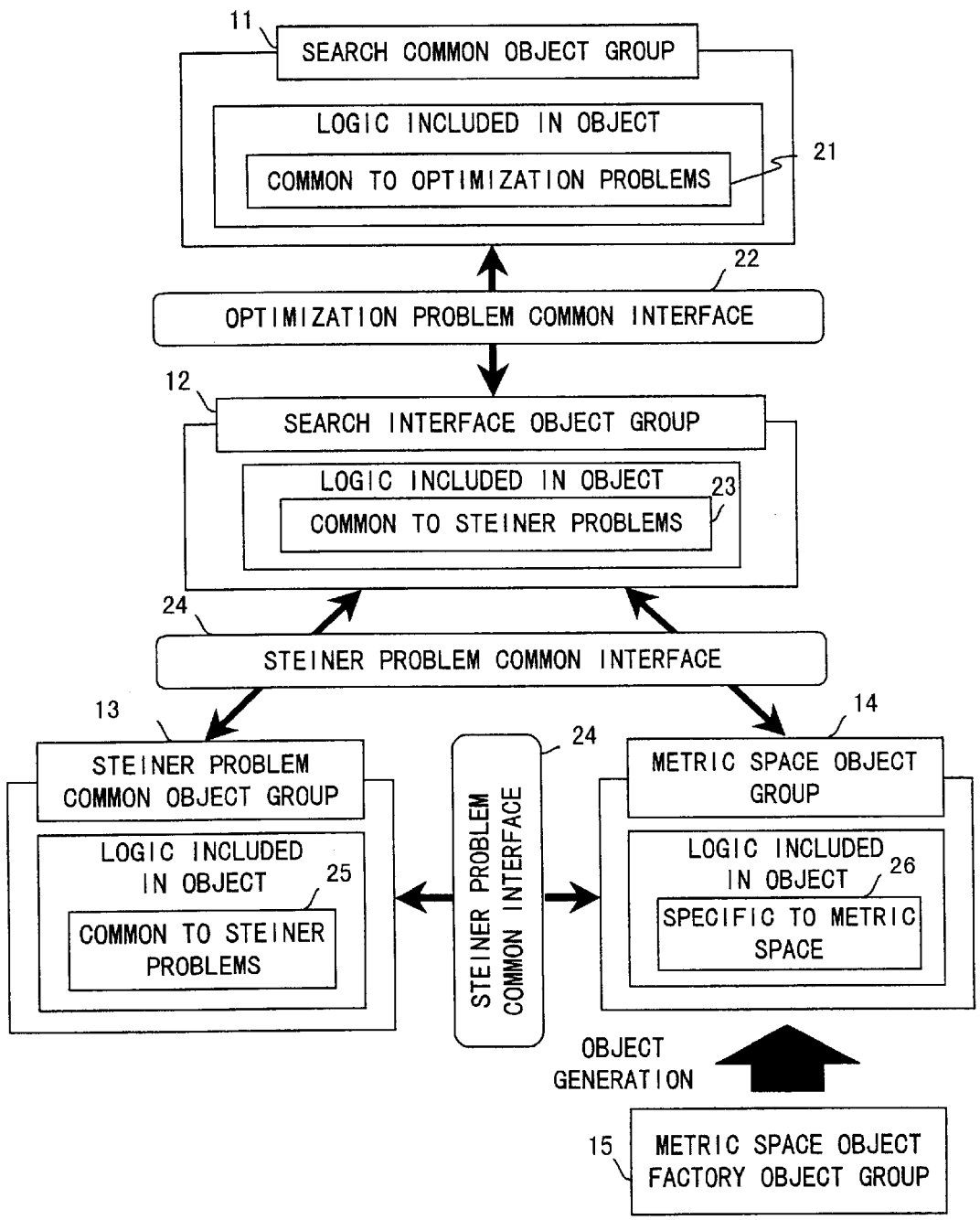
F I G. 6

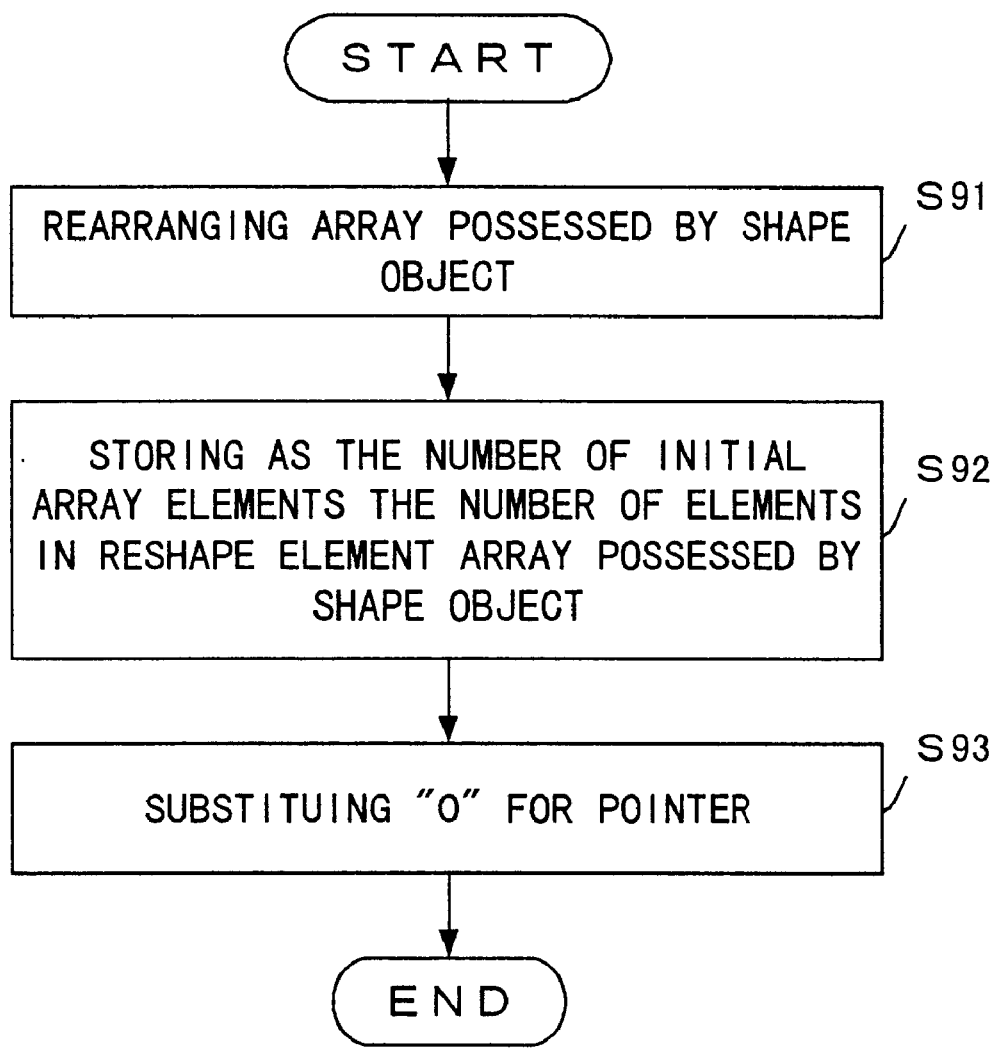
F I G. 1 6

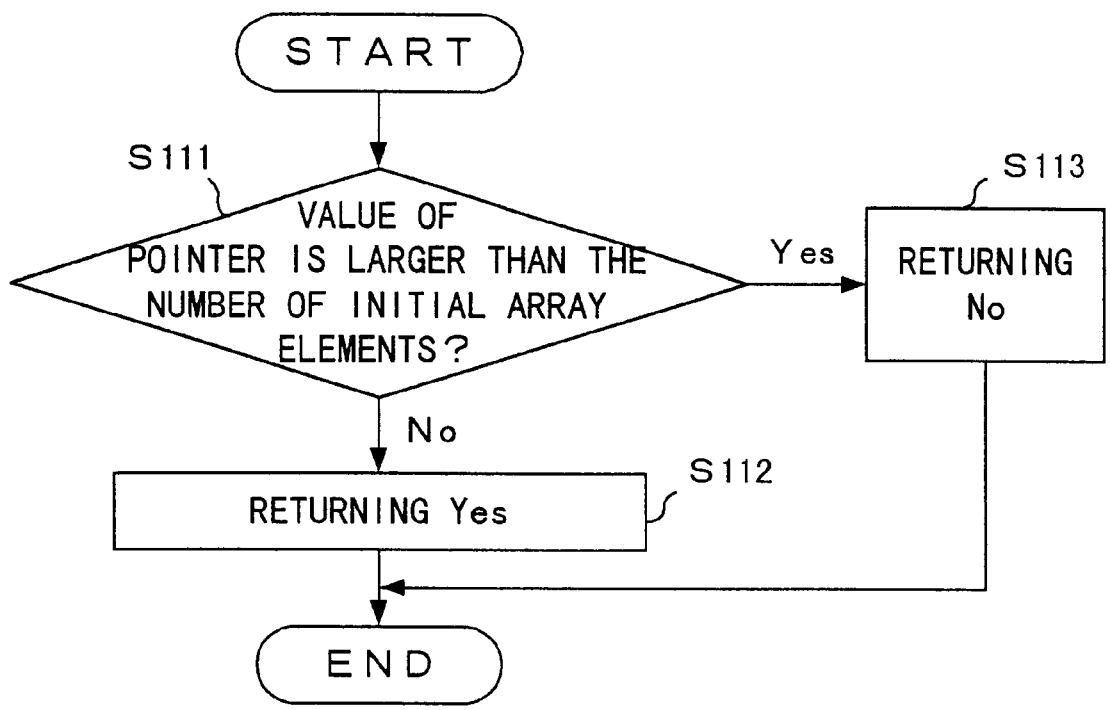
F I G. 1 8

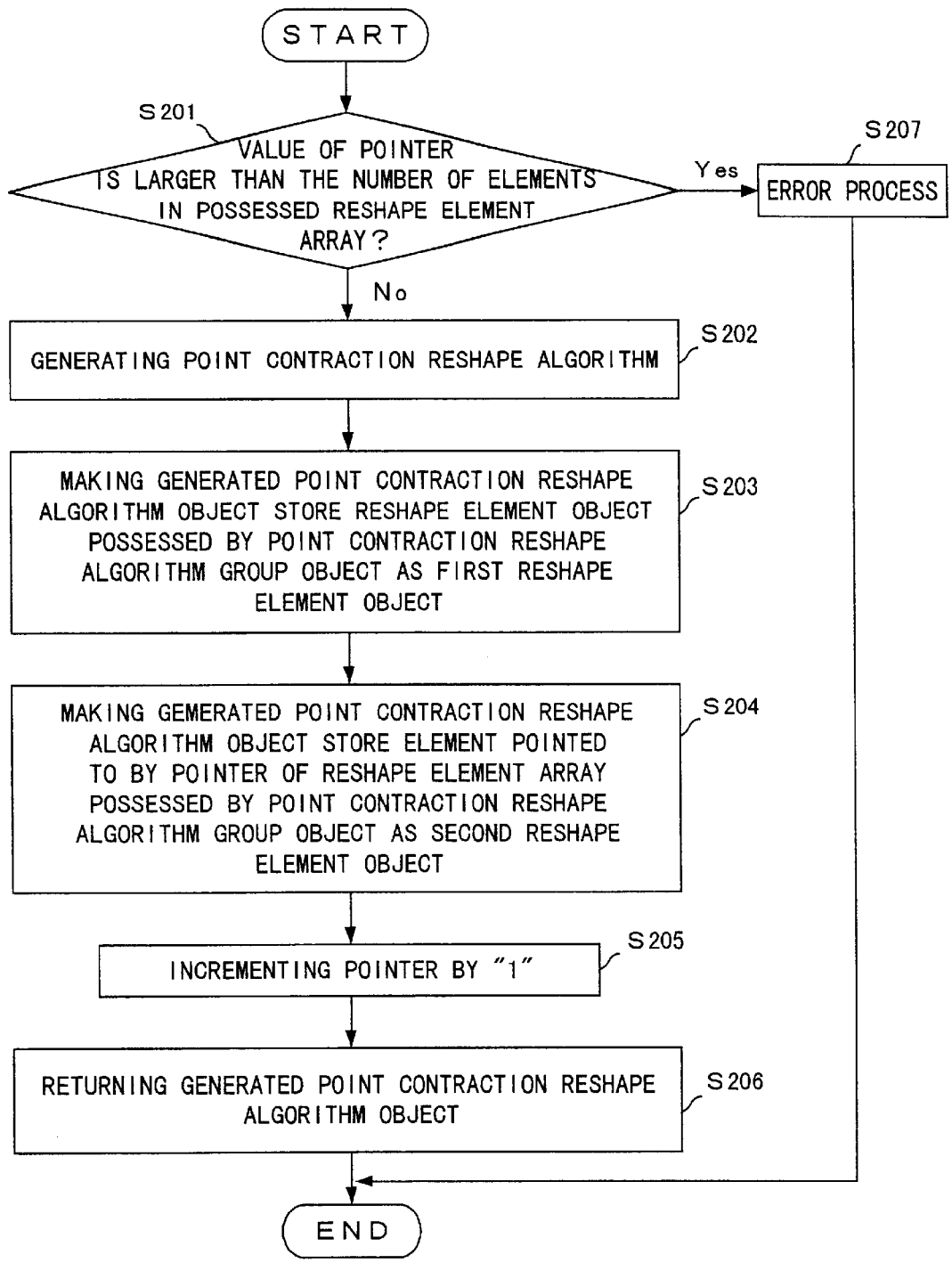
F I G. 27

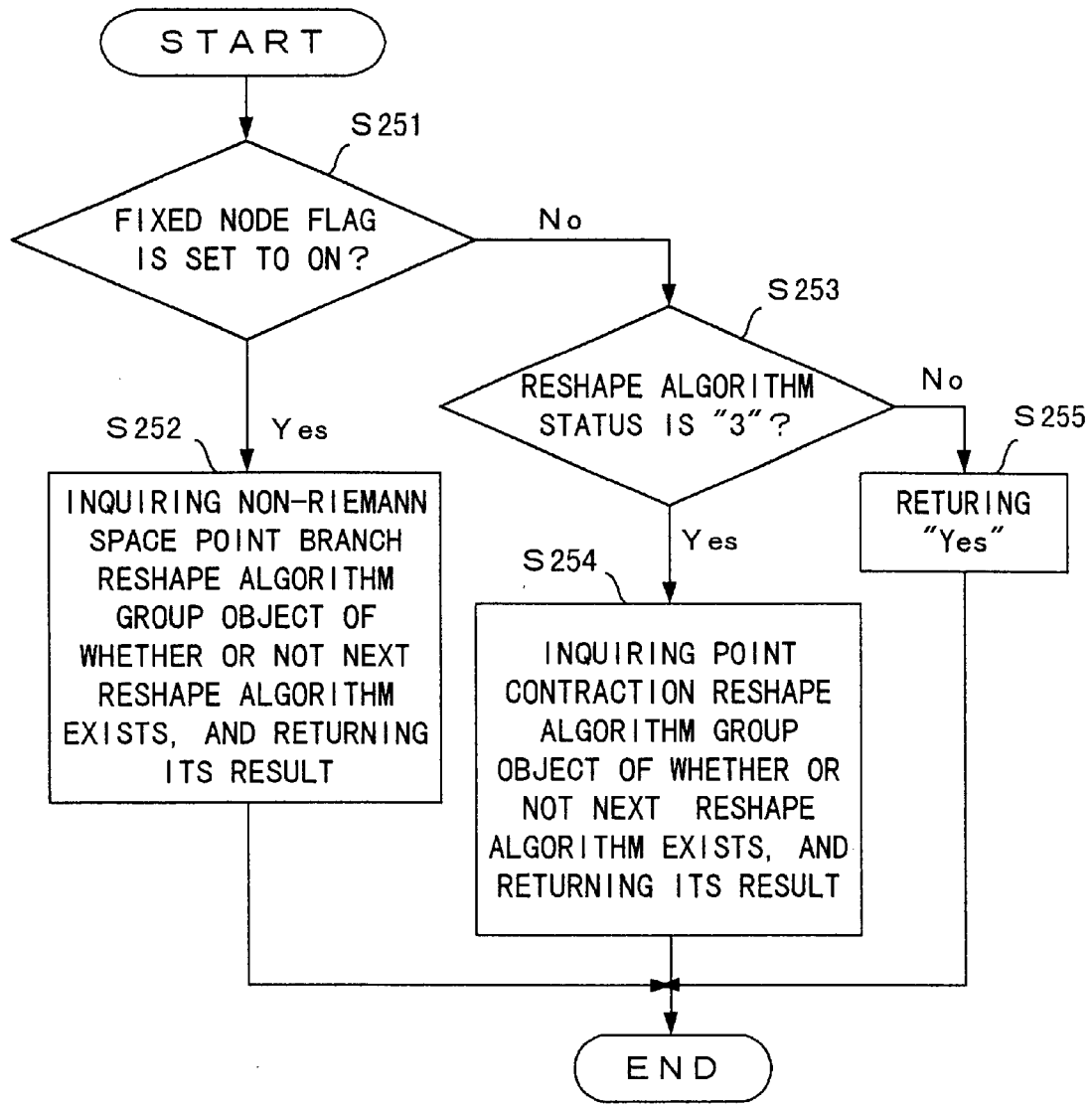
F I G. 3 2

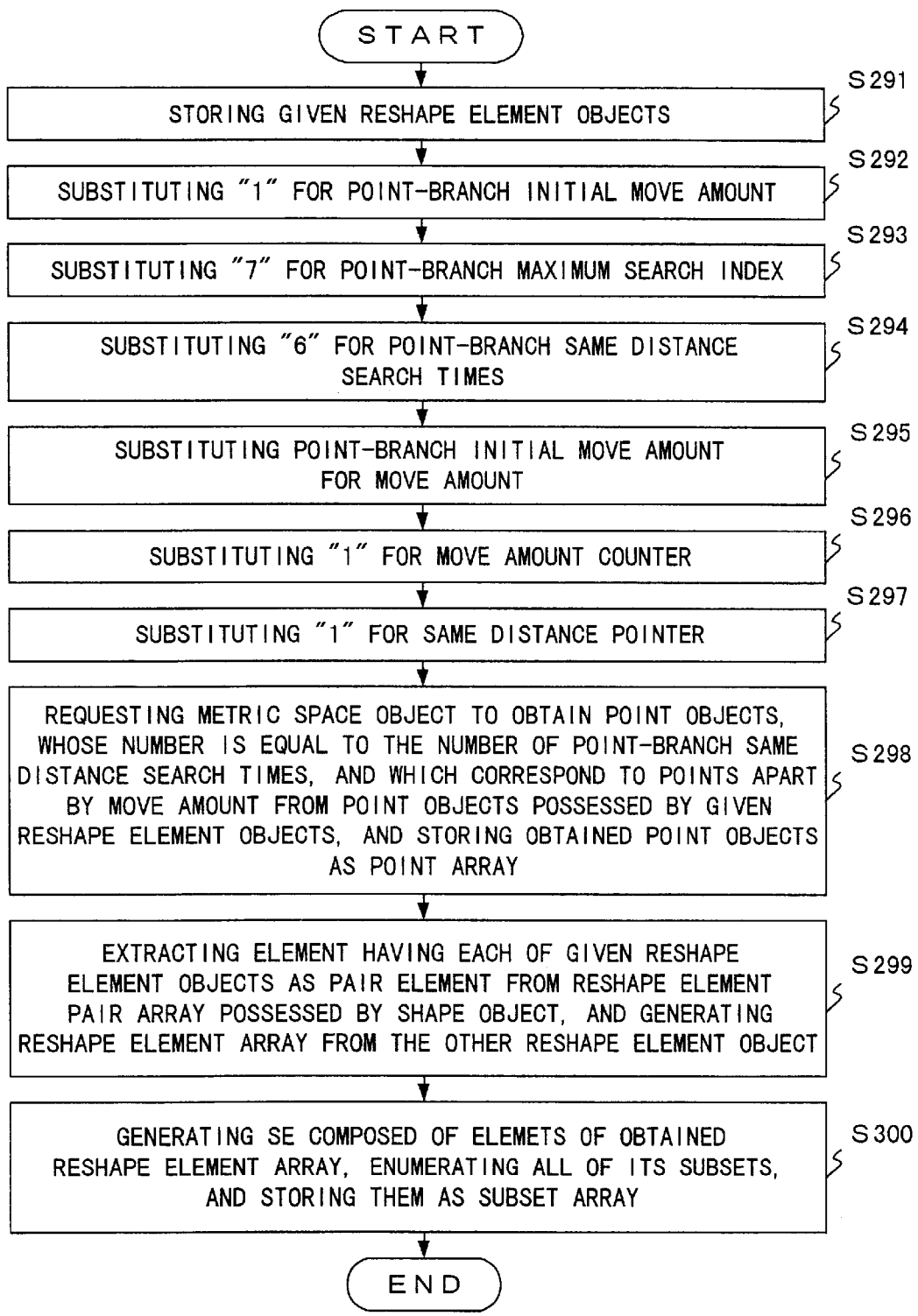
F I G. 3 6

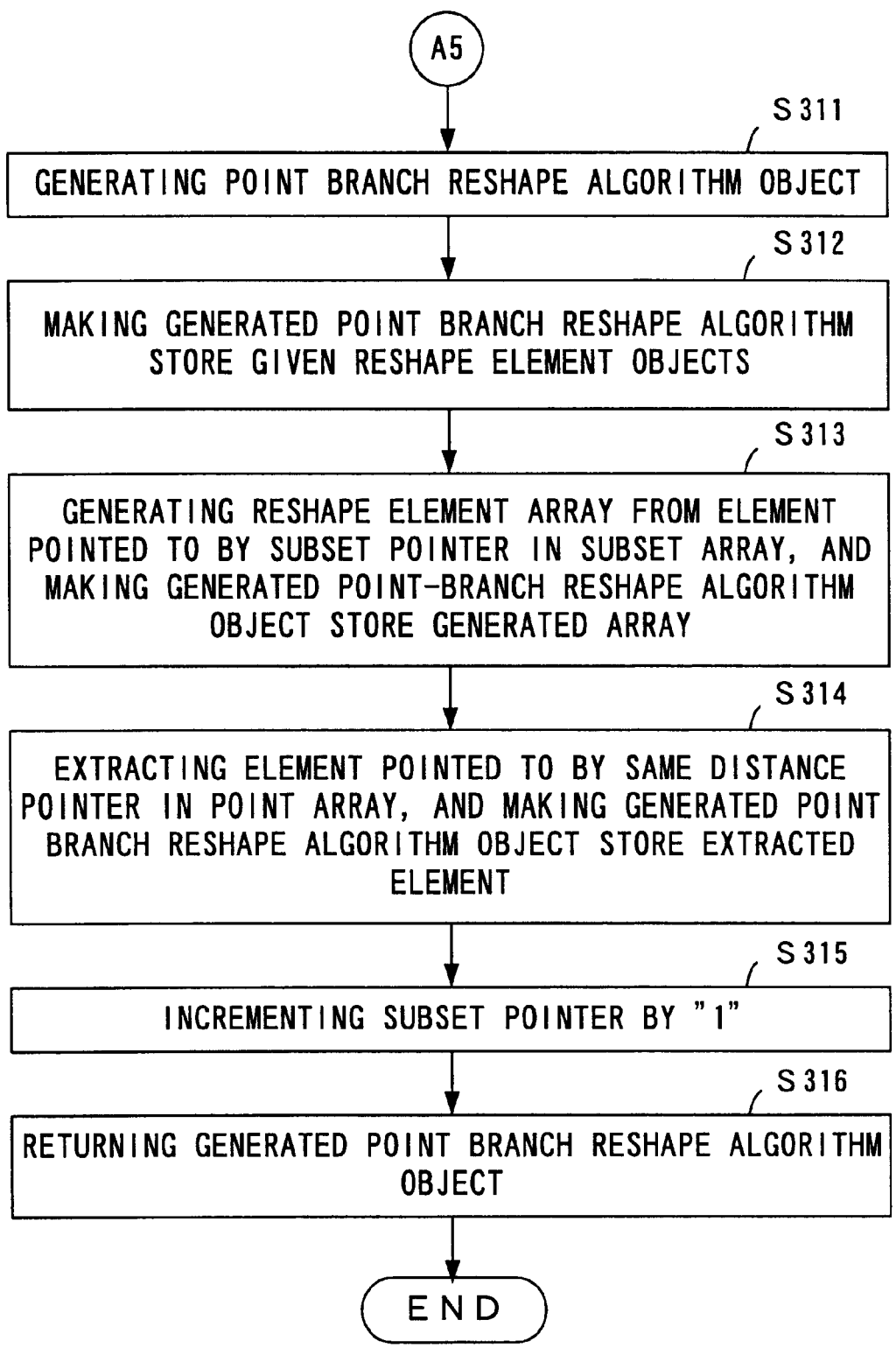
F I G. 3 8

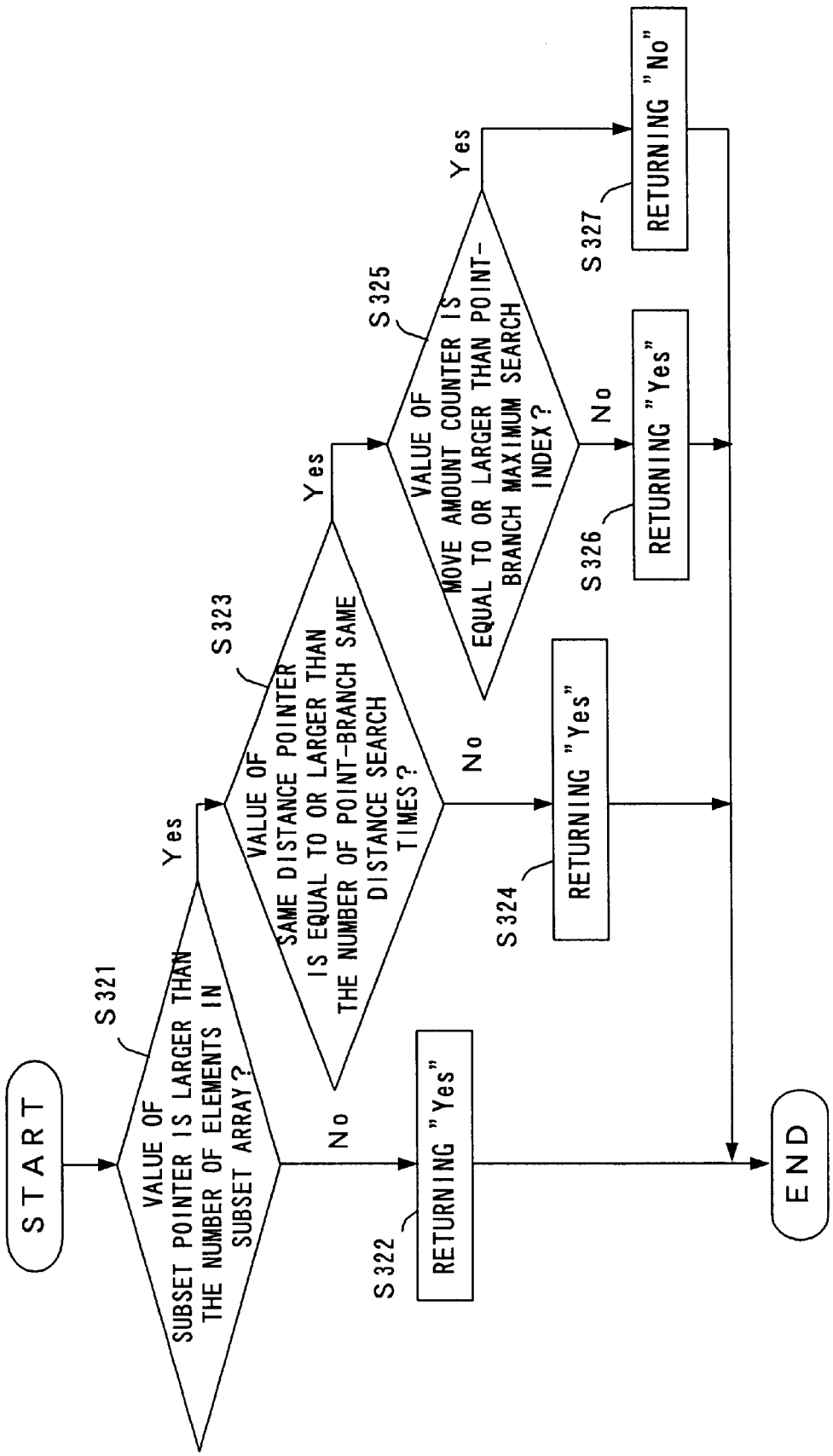
F I G. 39

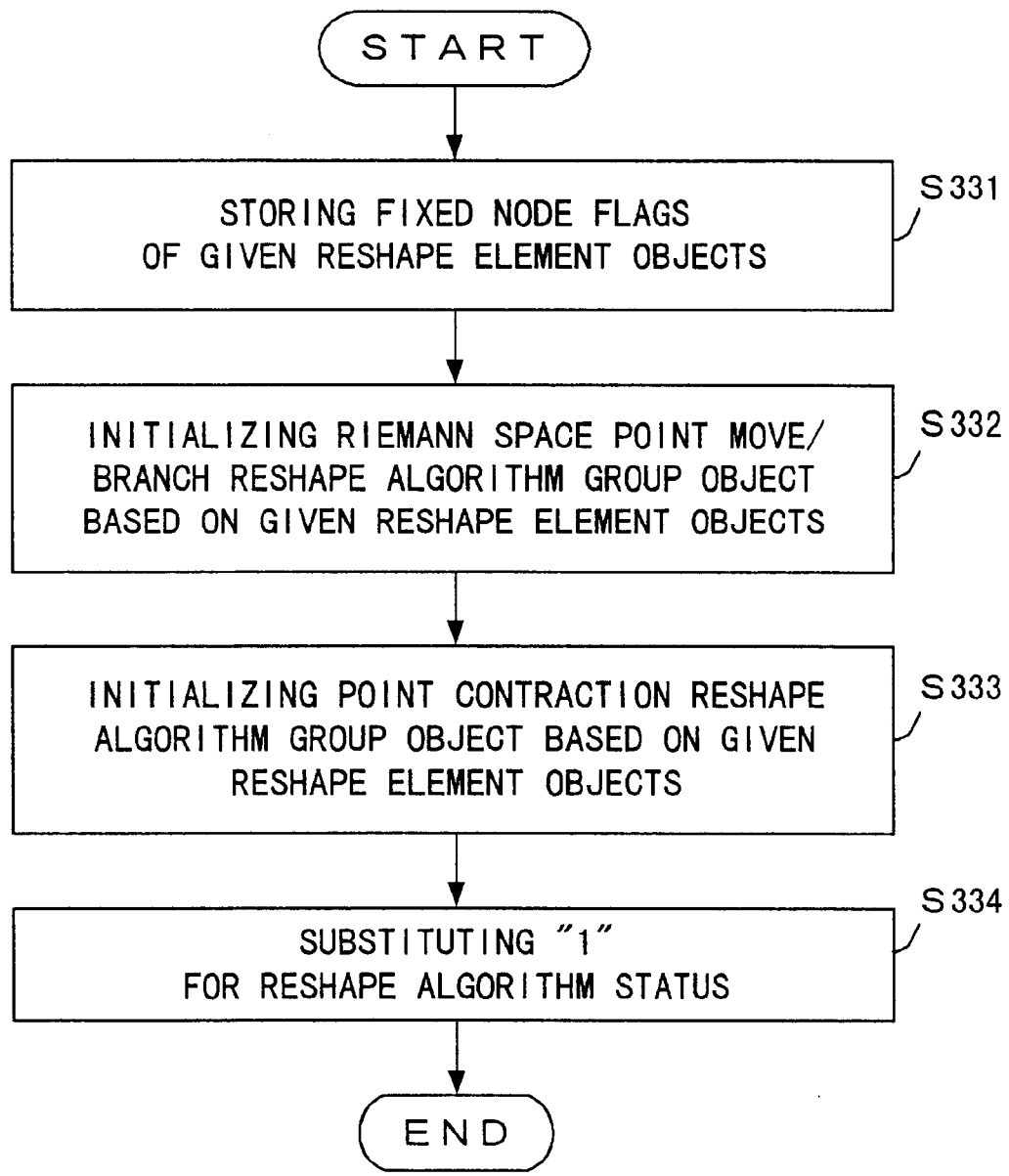
F I G. 4 0

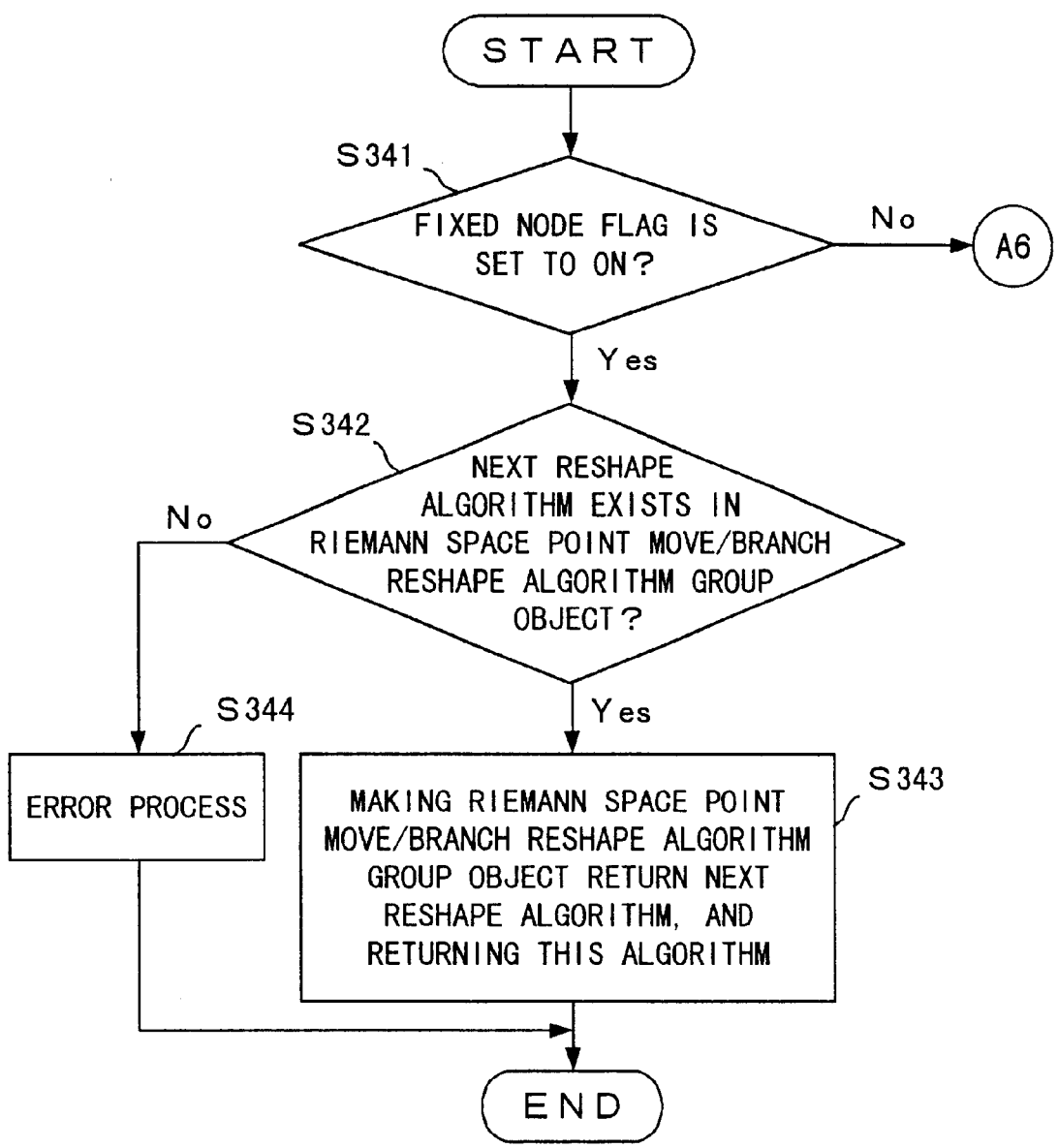
F I G. 4 1

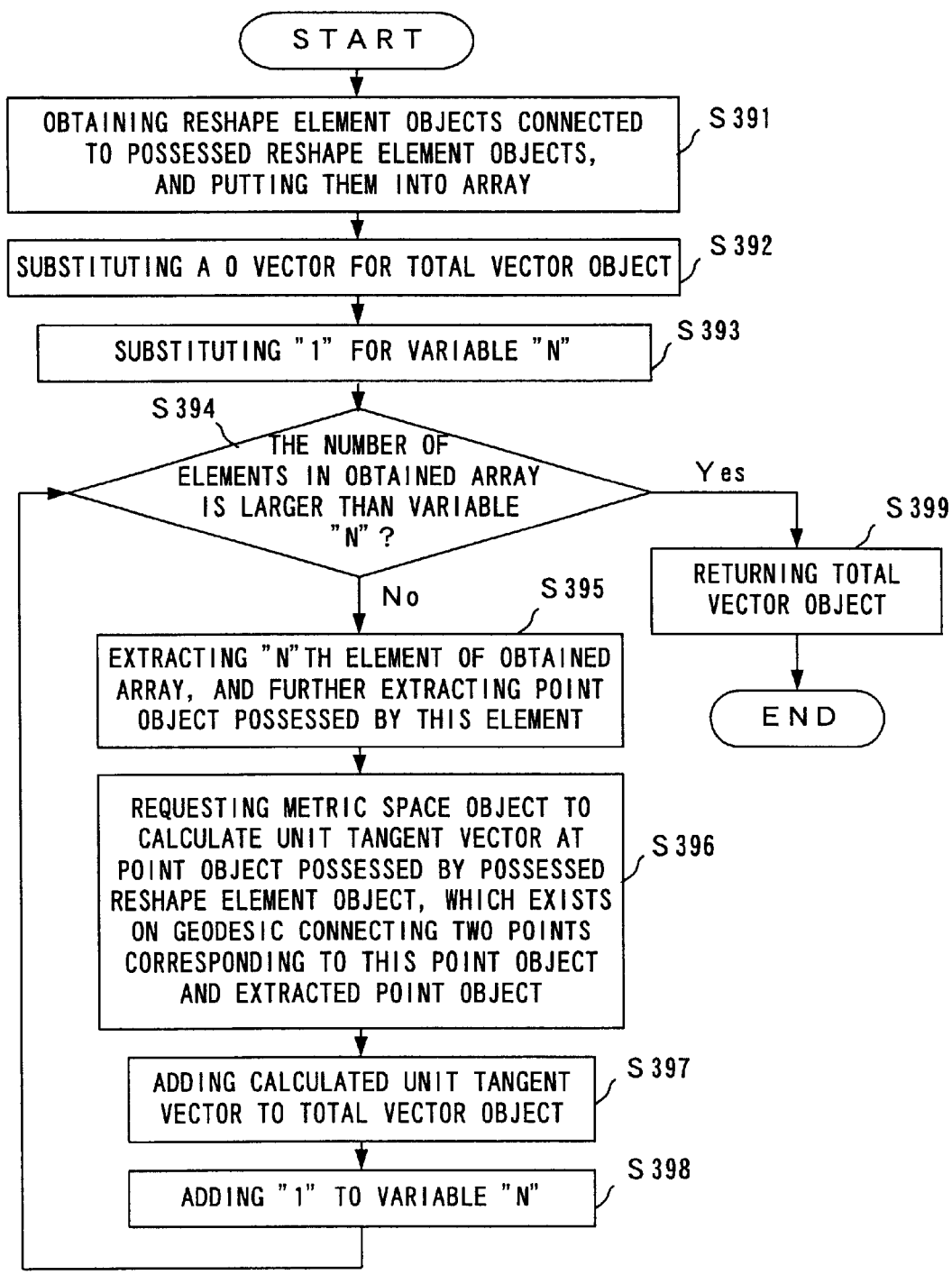
F I G. 4 6

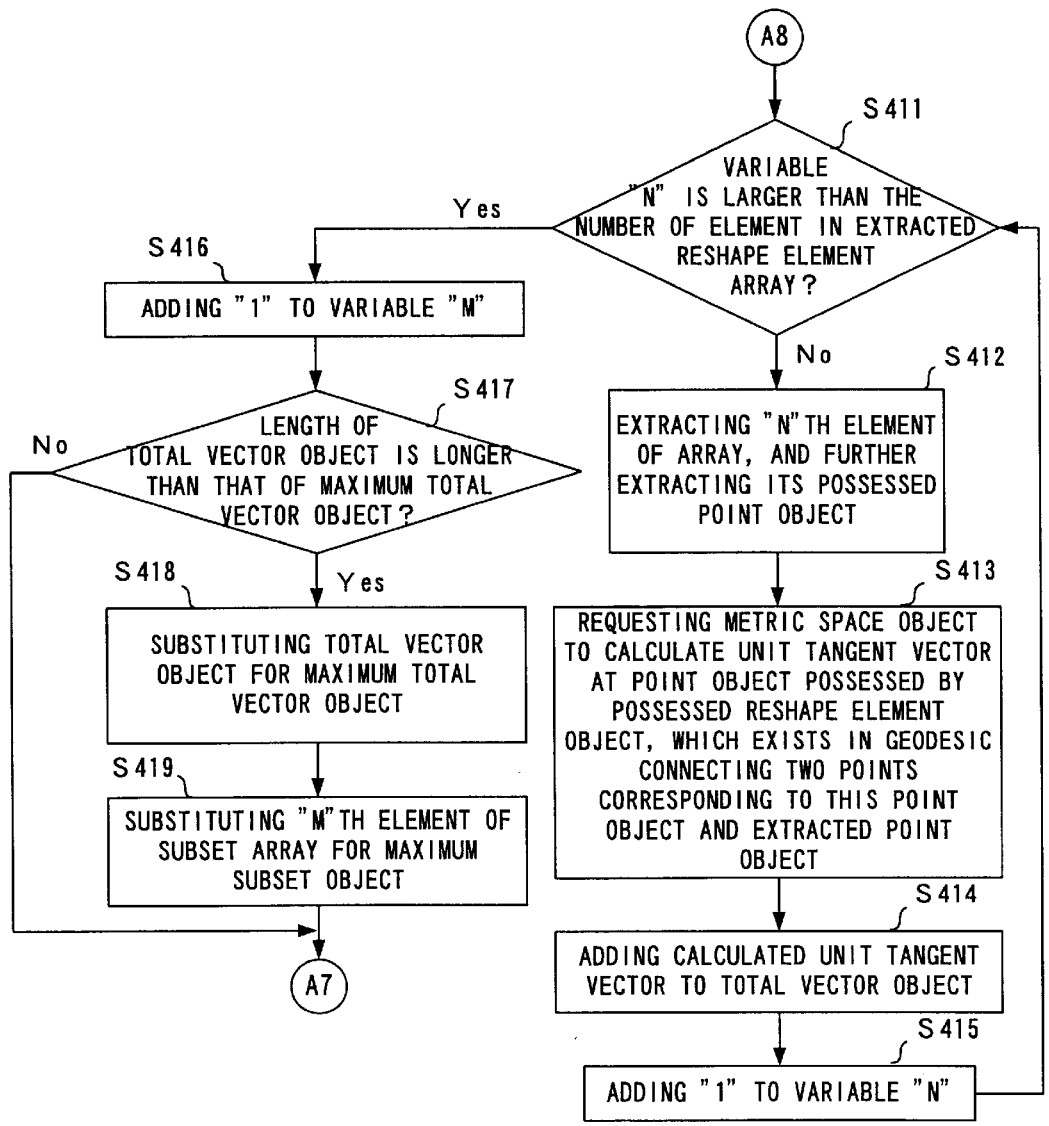
F I G. 4 8

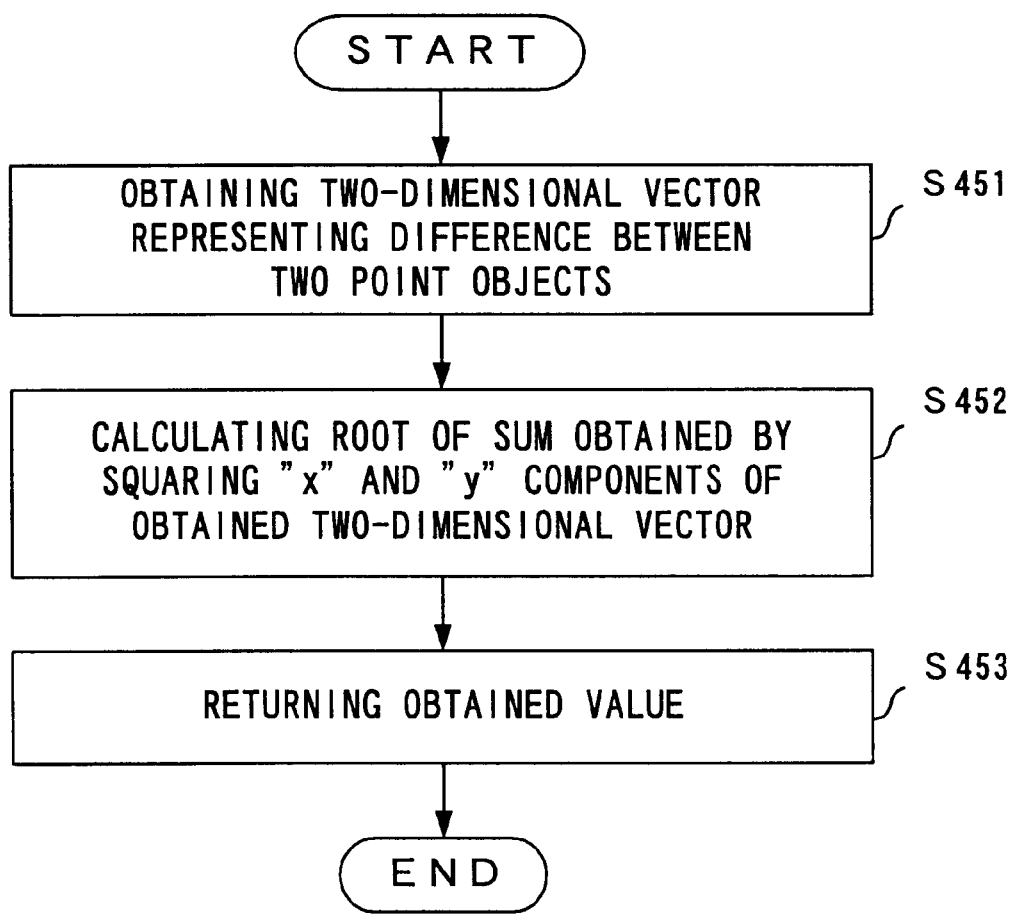
F I G. 5 2

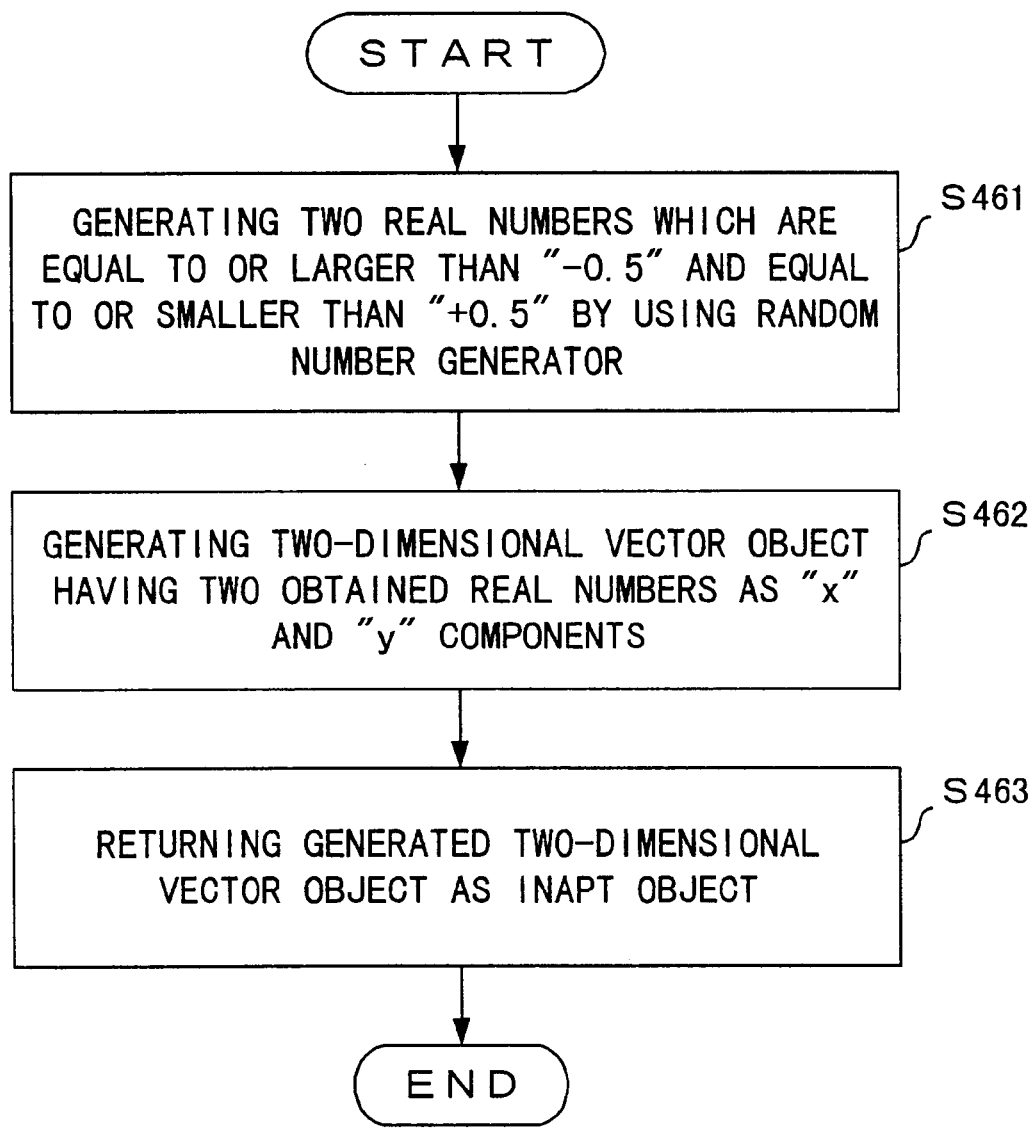
F I G. 53

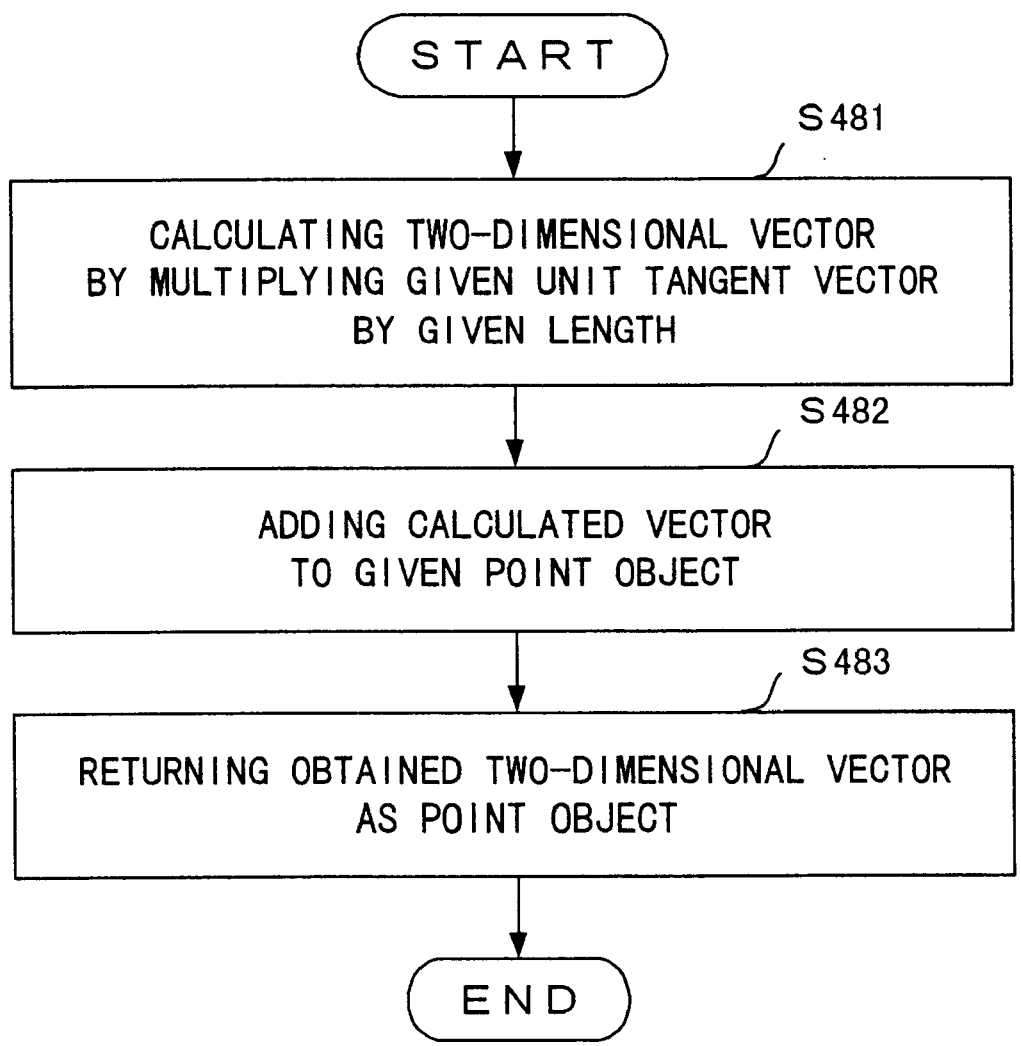
F I G. 5 5

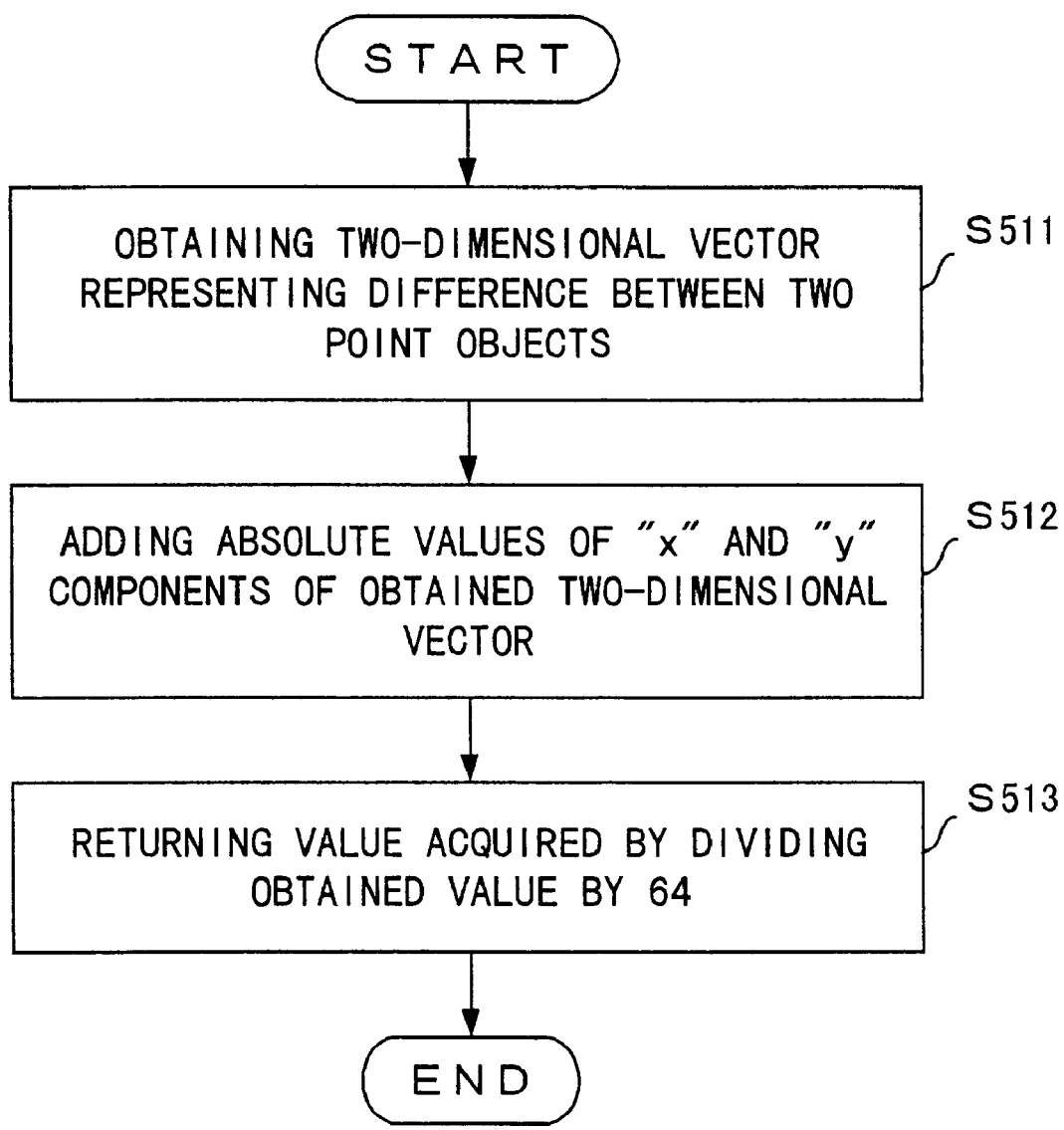
F I G. 5 8

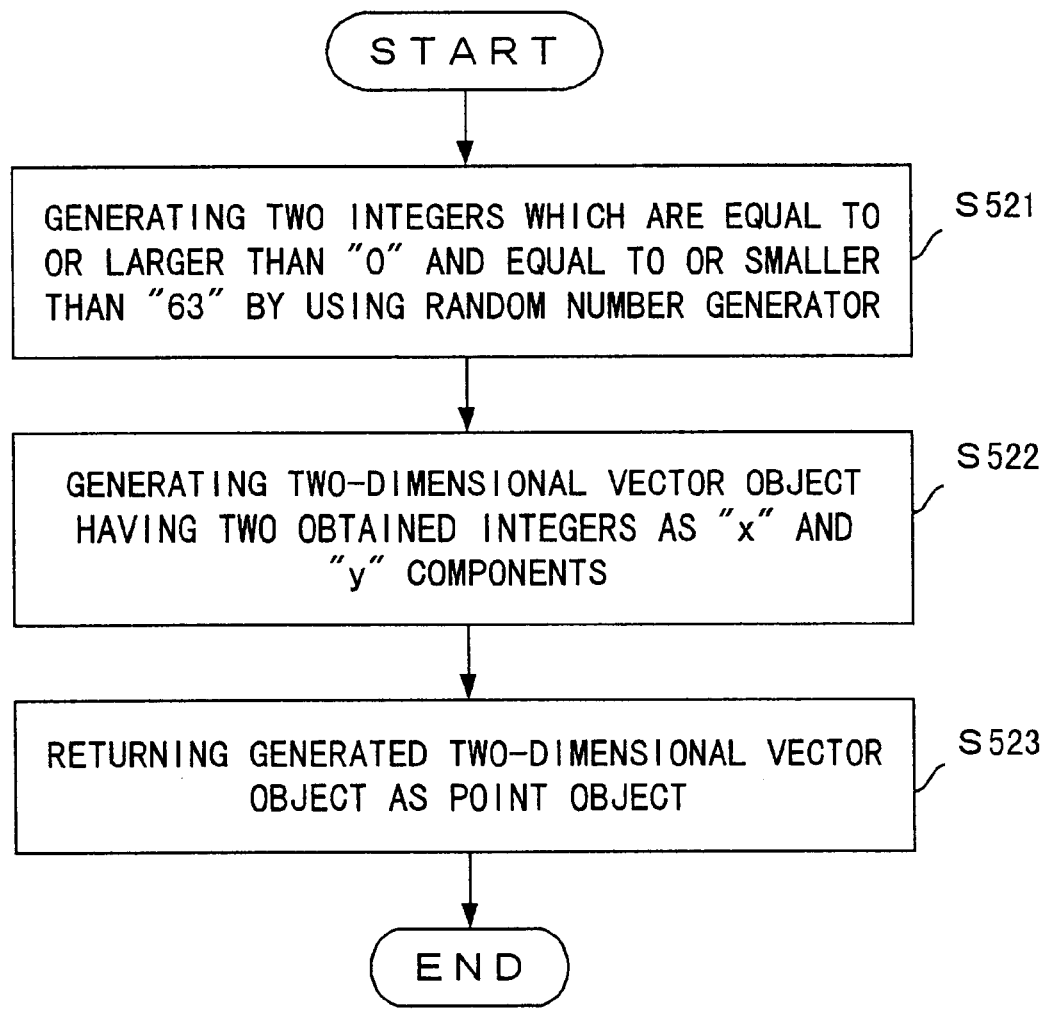
F I G. 5 9

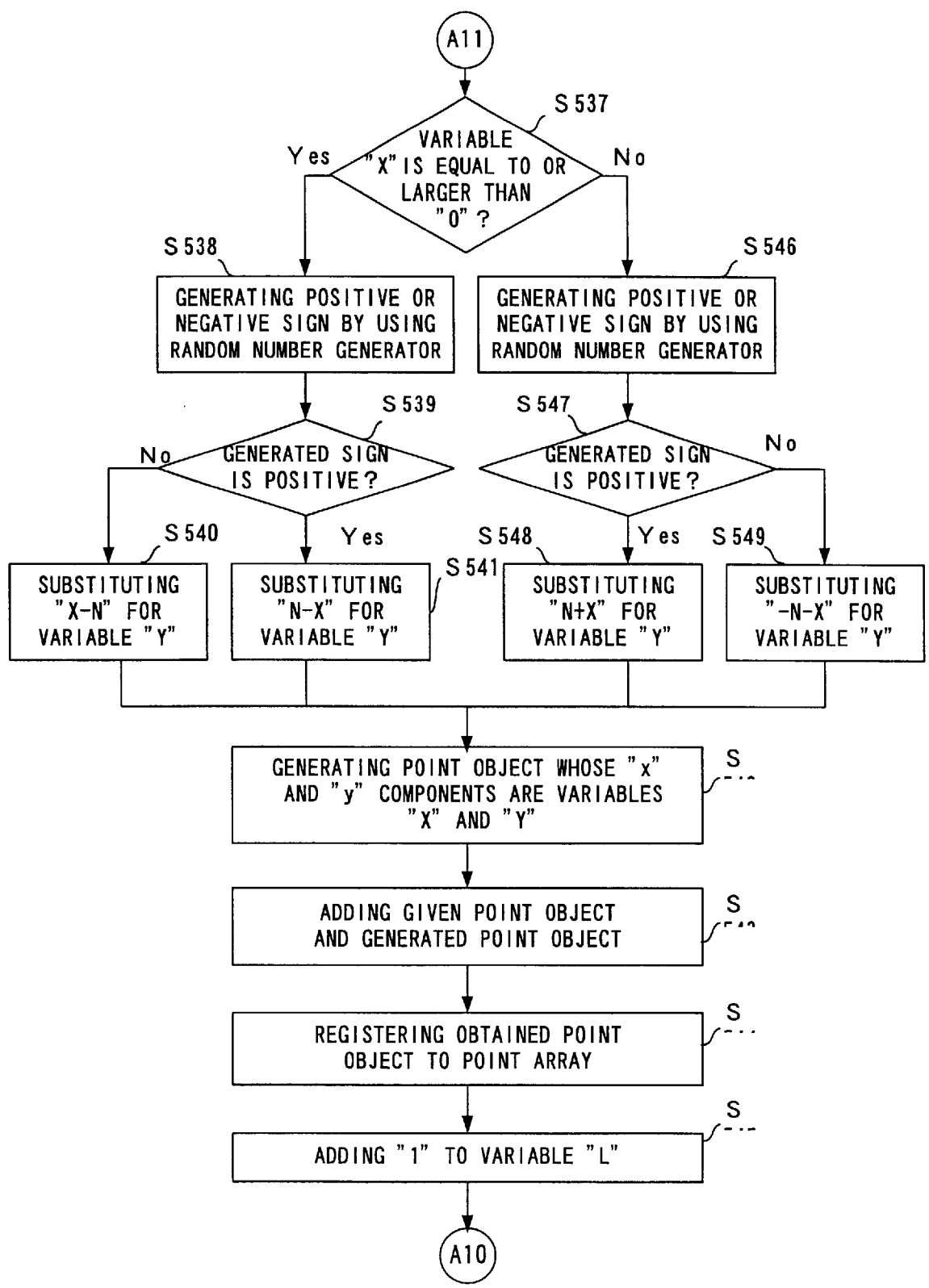
F I G. 6 1

FIG. 64

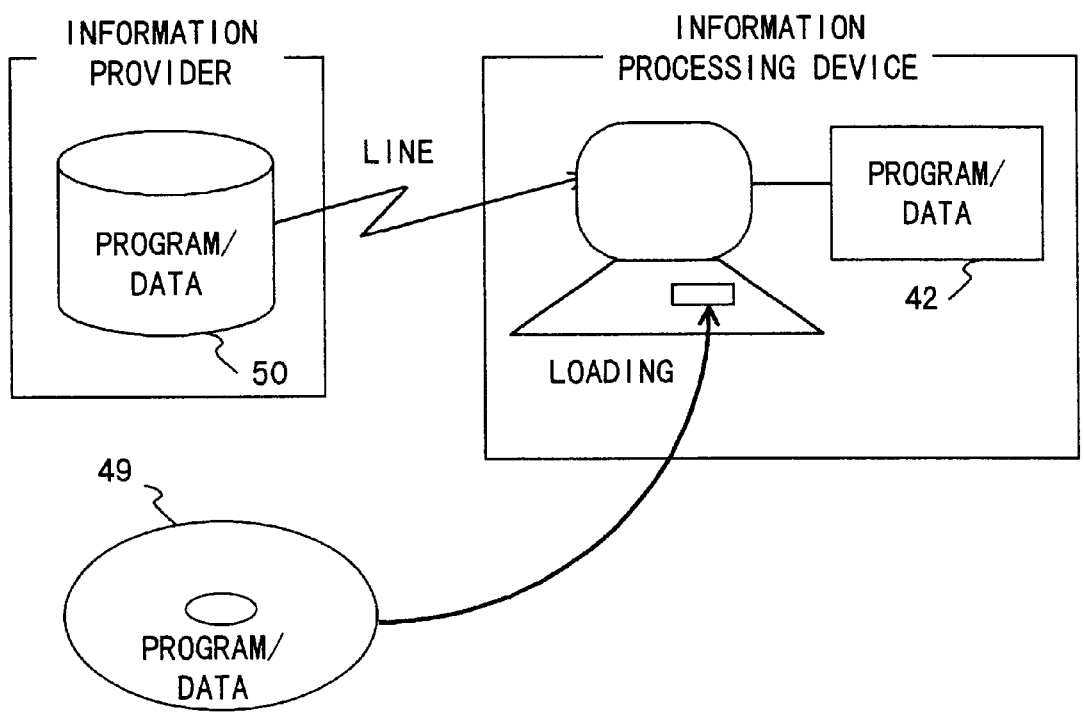
F I G. 6 8

PROCESSING DEVICE FOR SEARCHING FOR A SUITABLE NETWORK SHAPE IN A GENERAL METRIC SPACE

BACKGROUND OF THE INVENTION

1. Field of the Invention

The present invention relates to a processing device for optimizing or locally optimizing the shape of a network such as a road network, a gas network, a watersupply network, a power supply network, a telephony network, a computer network, etc.

b 2. Description of the Related Art

A Steiner problem being one of optimization problems is known as a problem of obtaining a connected tree which includes a plurality of points in a metric space as nodes and whose total distance is the shortest. A tree in a metric space is a network having no closed path. A network such as a road network, a gas network, a watersupply network, a power supply network, a telephony network, a computer network, etc. can be represented by using a tree. In the operations for installing, arranging, and wiring a target having any of these network shapes on a plane, a sphere, or in a three-dimensional space, it is vital to obtain a tree whose total distance is shorter.

For the Steiner problem, the total distance of a tree is used as a cost value, and a tree whose cost value is a minimum or a local minimum is searched. By changing the sign of a cost value, the problem of obtaining the minimum or the local minimum can be replaced with a problem of obtaining a maximum or a local maximum.

Conventionally, attempts were made mainly for a Steiner problem in a two-dimensional Euclidean space or rectilinear space, and no algorithm for solving a Steiner problem in a general metric space or a Riemann space is known. For a Steiner problem on a plane, many algorithms for obtaining the shortest distance network have been developed.

However, the conventional algorithms have the following practical problems.

(A) Cannot be applied to problems in spaces other than on a plane, such as a global network on a worldwide level, a network in a three-dimensional space, and the like.

(B) Cannot prohibit network installation in particular areas. For example, areas where a network cannot be installed or is difficult to be installed, such as a steep mountainous district, lake, sea, a nature conservation area, or a danger zone, etc. from a technical or institutional viewpoint.

(C) Since network installation costs which are respectively required for urban and rural districts per unit length are different, they cannot be estimated based only on the lengths of networks. Accordingly, a network installation cost cannot be accurately optimized.

As described above, the problems inherent in the conventional algorithms exist in a point that the algorithms can be applied only to the case where the length of a network is given as a Euclidean distance on a plane.

SUMMARY OF THE INVENTION

An object of the present invention is to provide a processing device with higher universality, which comprises an algorithm for searching for a suitable network shape in a general metric space.

A processing device according to the present invention comprises a generating unit, a storing unit, a reshaping unit, and an outputting unit. The generating unit generates a tree model in an arbitrary space. The storing unit stores the data of existing nodes included in the tree model. The reshaping unit reshapes the tree model based on the existing nodes. The outputting unit outputs a reshape result.

BRIEF DESCRIPTION OF THE DRAWINGS

FIG. 6 shows the configuration of a processing device;

FIG. 16 is a flowchart showing a first initialization method;

FIG. 18 is a flowchart showing a first notification method;

FIG. 27 is a flowchart showing a point contraction reshape algorithm method;

FIG. 32 is a flowchart showing a fourth notification method;

FIG. 36 is a flowchart showing a sixth initialization method;

FIG. 38 is a flowchart showing the point branch reshape algorithm method (No. 2);

FIG. 39 is a flowchart showing a sixth notification method;

FIG. 40 is a flowchart showing a seventh initialization method;

FIG. 41 is a flowchart showing a third reshape algorithm method (No. 1);

FIG. 46 is a flowchart showing the method for calculating a point-move move vector;

FIG. 48 is a flowchart showing the method for calculating a point-branch move vector (No. 2);

FIG. 52 is a flowchart showing a first distance method;

FIG. 53 is a flowchart showing a first random method;

FIG. 55 is a flowchart showing a geodesic method;

FIG. 58 is a flowchart showing a second distance method;

FIG. 59 is a flowchart showing a second random method;

FIG. 61 is a flowchart showing the plural-points method (No. 2);

FIG. 64 shows a first display screen;

FIG. 68 shows storage media.

DESCRIPTION OF THE PREFERRED EMBODIMENT

Figure 1:
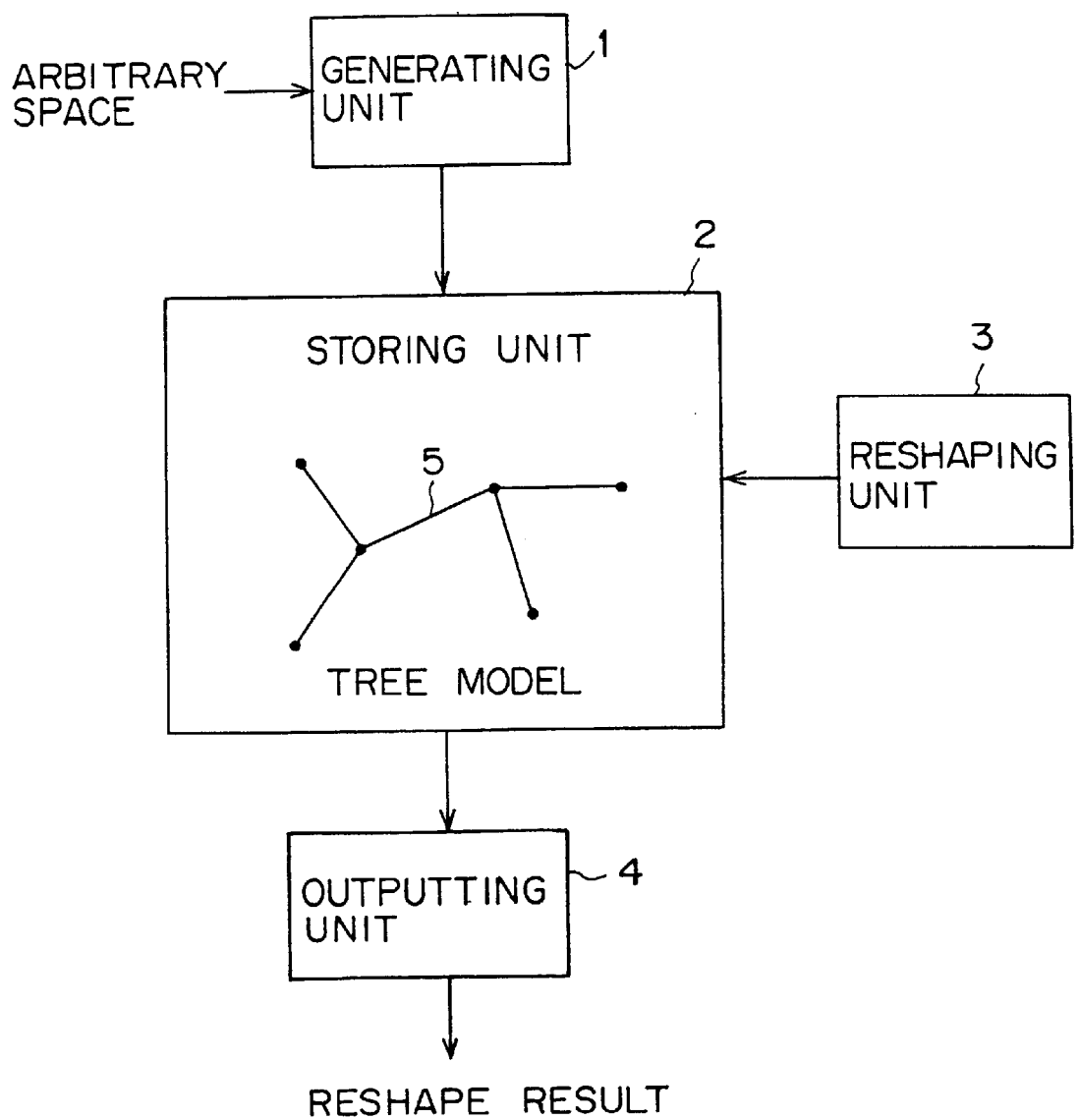
FIG. 1 shows the principle of a processing device according to the present invention.

Details of the preferred embodiments according to the present invention are explained below by referring to the drawings.

FIG. 1 shows the principle of a processing device according to the present invention. The processing device shown in FIG. 1 comprises a generating unit 1, a storing unit 2, a reshaping unit 3, and an outputting unit 4.

The generating unit generates a tree model 5 in an arbitrary space. The storing unit 2 stores the data of existing nodes included in the tree model 5. The reshaping unit 3 reshapes the tree model 5 based on the existing nodes. The outputting unit 4 outputs a reshape result.

The generating unit 1 generates the tree model 5, for example, by suitably connecting a plurality of points in a given space. The storing unit 2 stores the plurality of points as existing nodes. The reshaping unit 3 reshapes the tree model 5 with a reshape operation such as a point move reshape, a point branch reshape, a point contraction reshape, etc. based on the existing nodes. The outputting unit 4 outputs the reshaped tree model 5.

Use of such a tree model allows an arbitrary network optimization problem in an arbitrary space to be generally described, not limited to in a case where the length of a network is given with a Euclidean distance on a plane. Additionally, an algorithm for reshaping a tree shape is simple and easy to understand. If reshape processing currently being performed is made visible on a display screen, a user can easily grasp the progress state of the processing.

Furthermore, a solution to a problem can be automatically obtained from the tree model 5 whose cost value is the best or the locally best. Still further, if a user can estimate a cost value from a displayed shape, he or she can extract a solution at suitable timing. The case where the cost value is the best or the locally best includes both the case where the cost value is the smallest or the locally smallest, and the case where the cost value is the largest or the locally largest.

For example, the generating unit 1, the storing unit 2, the reshaping unit 3, and the outputting unit 4, which are shown in FIG. 1, correspond to, for example, object groups which are shown in FIG. 6 and will be described later.

In this preferred embodiment, the following three algorithms are used as fundamental algorithms for reshaping a tree in an arbitrary space.

(1) Point Move Reshape Algorithm

Figure 2:
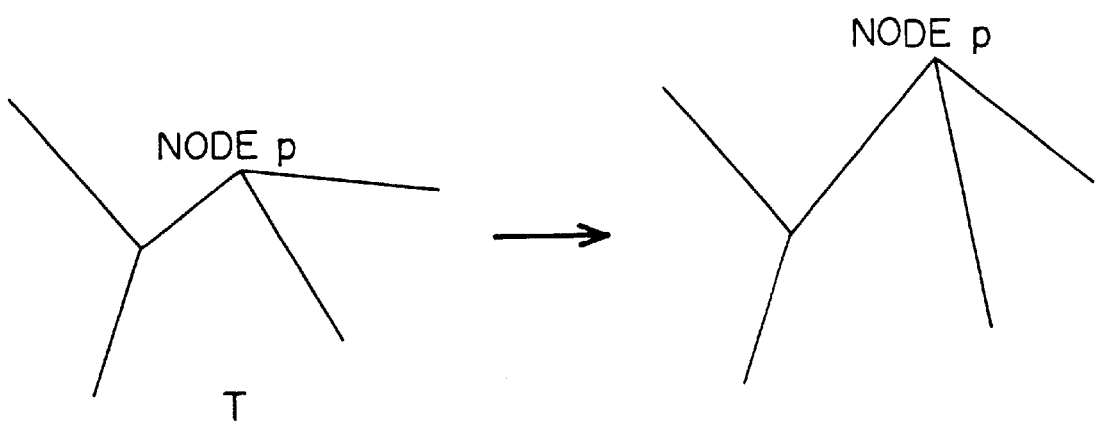
FIG. 2 shows a point move reshape.
Figure 3:
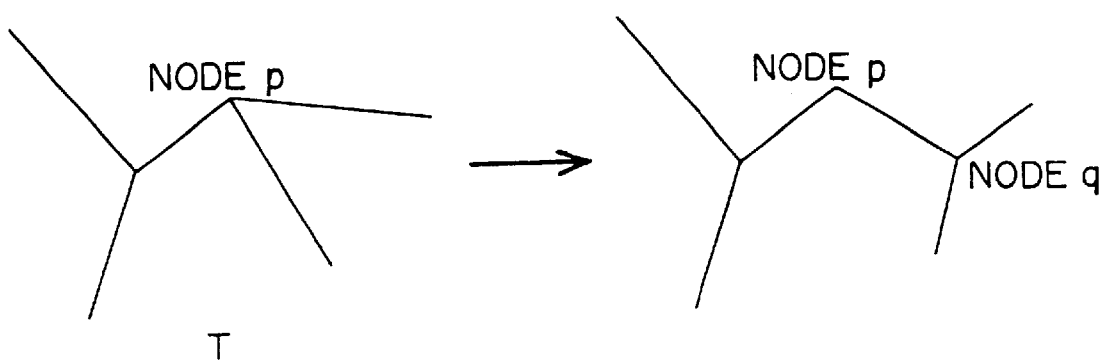
FIG. 3 shows a point branch reshape.
Figure 4:
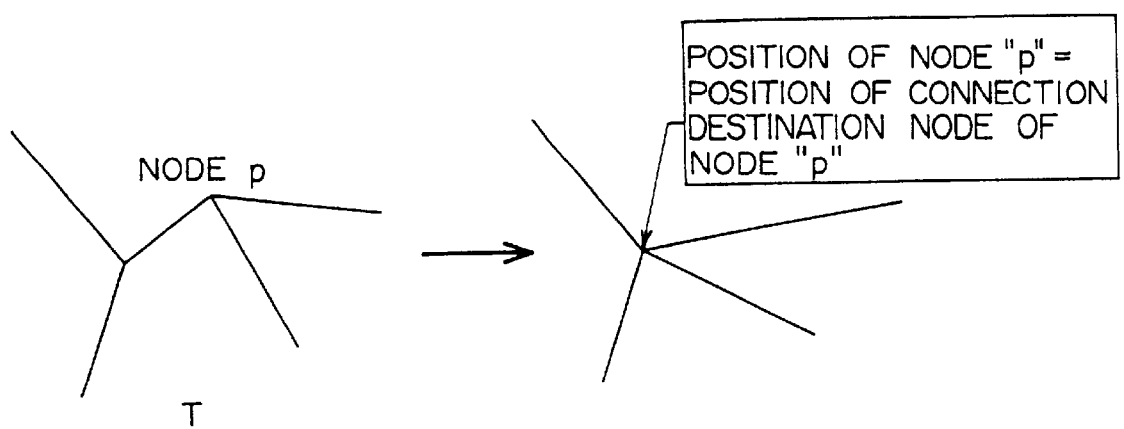
FIG. 4 shows a point contraction reshape.

When a tree "T" in a space and a node "p" of the tree "T" are given, the tree "T" in the space is reshaped by moving the position of the node "p" as shown in FIG. 2.

(2) Point Branch Reshape Algorithm

When a tree "T" in a space and a node "p" of the tree "T" are given, the tree "T" in the space is reshaped by adding a new node "q" to the tree "T", by connecting the nodes "p" and "q", and by relinking to the node "q" some of the connection destination nodes of "p" except for "q".

(3) Point Contraction Reshape Algorithm

When a tree "T" in a space and a node "p" of the tree "T" are given, the tree "T" in the space is reshaped by moving the node "p" to one of the connection destination nodes of "p", and by making them overlap.

With these reshape algorithms, the topology of a tree itself changes, which eliminates the need for a complicated process such as tree topology classification, tree classification depending on cases. Additionally, these reshape algorithms have universality which can be applied to a tree in whatever space. With this universality, an algorithm for searching for a locally optimum tree in a general metric space can be generated.

A metric space is a generic name of a space including the concept of a distance. Metric space examples include not only a two-dimensional Euclidean space (normal plane), a three-dimensional Euclidean space (normal solid space), a sphere, an arbitrary curved surface, etc., but also spaces such as a space obtained by suitably weighing the above described spaces, a space obtained by removing an adequate area from the above described spaces, etc. Also a plane or a space whose distance is stipulated based on the path of a traffic network (roads, trains, etc.) is recognized to be a metric space. Mathematically, the metric space is defined as follows.

A metric space (X, d) is composed of a set "X" and a function "d" (normally referred to as a distance function) of a set "X×X", and satisfies the following conditions.

[condition 1] $d(x, x)=0$ for an arbitrary $x \in X$

[condition 2] $d(x, y) \geq 0$ for an arbitrary $x, y \in X$

[condition 3] $x=y$ if $d(x, y)=0$

[condition 4] $d(x, y)=d(y, x)$ for arbitrary $x, y \in X$

[condition 5] $d(x, z) \leq d(x, y)+d(y, z)$ for arbitrary $x, y, z \in X$

If "N" points $p_1, p_2, \ldots, p_N$ in the metric space (X, d) are given, the connected tree having the shortest total distance among connected trees including these points as nodes is referred to as a Steiner tree. The problem of obtaining the Steiner tree is referred to as a Steiner problem. Especially, if the metric space (X, d) is a two-dimensional Euclidean space, the Steiner problem is known to be NP (Nondeterministic Polynomial) complete. Accordingly, if "N" is sufficiently large, the connected tree having the shortest possible distance is normally obtained with an approximation method.

This preferred embodiment adopts an algorithm for obtaining a connected tree which satisfies the following three conditions (such a tree is referred to as a local Steiner tree) instead of the Steiner tree. Here, it is assumed that a new point other than given points can be added as a node, and the added node can be moved/deleted.

[condition 1] Being a connected tree.

[condition 2] The total distance of the tree obtained by infinitesimally changing the positions of a node other than $p_1, p_2, \ldots, p_N$ is not shorter than the total distance of the original tree.

[condition 3] The total distance of the tree, which is obtained by adding a new node "q" to the neighborhood of an arbitrary node "p", by connecting the nodes "p" and "q", and by suitably relinking the connection destination of "p" to "q", is not shorter than the total distance of the original tree.

If a space where a tree is realized is a Riemann space, the above described reshape algorithms can be further concretized to obtain a local Steiner tree. The Riemann space is one of special metric spaces, and has a smooth nature in which a differential operation, etc. can be performed. In the meantime, a general metric space does not assume smoothness.

Riemann space examples include not only a two-dimensional Euclidean space, a three-dimensional Euclidean space, a sphere, an arbitrarily smooth curved surface, etc., but also spaces such as a space obtained by suitably weighing the above described spaces with a smooth function, etc.

On a plane or in a space, whose distance is stipulated based on the paths of a traffic network, a corner occurs at an intersection, etc. and smoothness is lost. Therefore, such a plane or a space is not always a Riemann space. However, these spaces can be approximated by the Riemann space by suitably changing a weight function. Accordingly, an algorithm for searching for a local Steiner tree in a Riemann space has sufficiently high universality.

Figure 5:
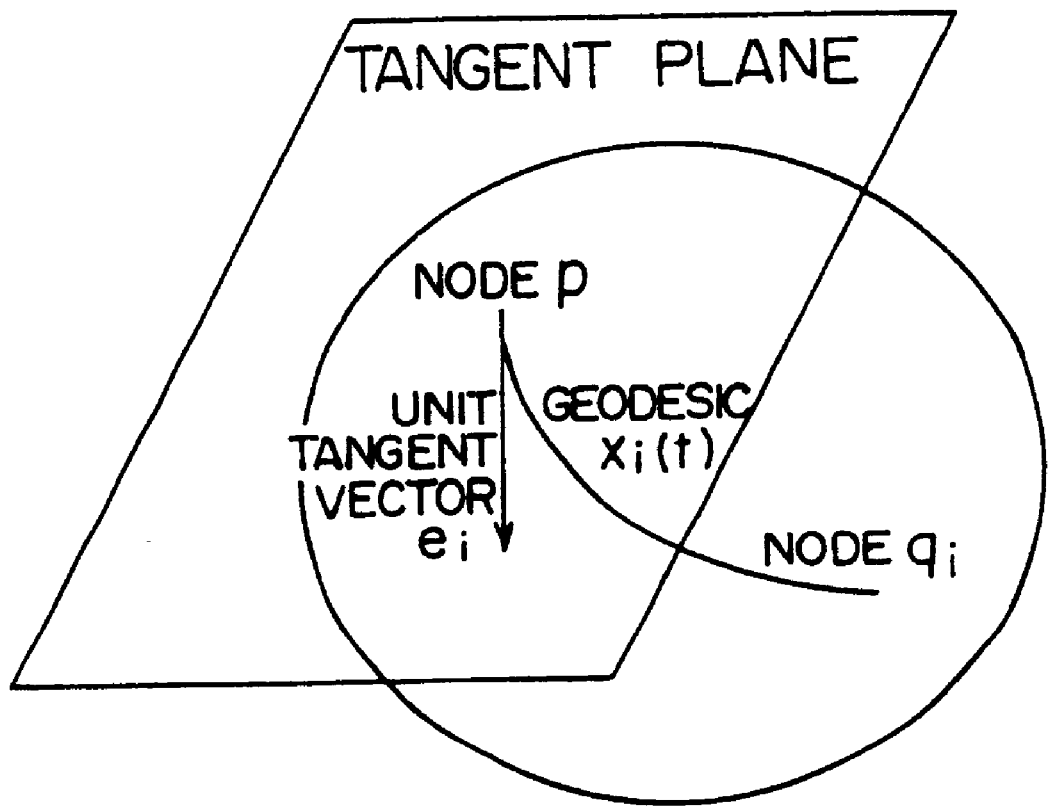
FIG. 5 shows a geodesic and a tangent vector.

First of all, the definitions of the symbols for describing this search algorithm are provided. Here, assume that a tree "T" in a Riemann space and a node "p" are given, and "m"

connection destination nodes of the node "p" are $q_1, q_2, \ldots, q_m$. Also assume that a geodesic $x_i(t)$ ($1 \leq i \leq m$), which connects the node "p" and a node "$q_i$" ($1 \leq i \leq$) and is parameterized with an arc length parameter "t" corresponding to a tree edge, exists as shown in FIG. 5. If a plurality of geodesics exist, one of them is selected as $x_i(t)$.

At this time, a unit tangent vector at the position of the node "p" on the geodesic $x_i(t)$ ($1 \leq i \leq m$) in the direction of the node $q_i$ ($1 \leq i \leq m$) is supposed to be the unit tangent vector $e_i$ ($1 \leq i \leq m$) at the position of the node "p". With these symbols, the kernel algorithm of a local Steiner tree search can be represented as follows.

[Reshape Algorithm $\alpha 1$]

The tangent vector "e" at the node "p" is defined by the following equation.

$$e = \sum_{i=1}^{m} ei \qquad (1)$$

If "e" is other than a zero vector, a tree is reshaped with the point move reshape algorithm that moves the node "p" to the position of a point on the geodesic which starts from the node "p" and goes along the tangent vector "e".

[Reshape Algorithm $\alpha 2$]

Suppose that a set $\Omega = \{1, 2, \ldots, m\}$, and "A" is an arbitrary subset of $\Omega$. At this time, a tangent vector "J(A)" at the node "p" is defined by the following equation.

$$J(A) = \sum_{i \in A} ei \qquad (2)$$

If a subset A which satisfies $|J(A)| > 1$ can be selected at this time, the tree is reshaped with the point branch reshape algorithm that arranges a new node "q" at the position of a point on the geodesic which starts from the node "p" and goes along the tangent vector J(A), and relinks the connection of the node $q_j$ ($j \in A$) to the node "p" to the node "q".

In other words, the tangent vector "J(A)" the magnitude of which exceeds a predetermined value is generated by using one or more unit tangent vectors "$e_i$"s according to the equation (2), and the node "q" is arranged at the position of the point on the geodesic which starts from the node "p" and goes along "J(A)".

It is desirable that $|J(A)|$ should have the largest possible value when such a subset "A" of $\Omega$ is selected. For example, the following methods can be considered as such a method.

[Method 1]

A subset "$A_{max}$" of $\Omega$ is defined by the following equation.

$$\max_{A \subset \Omega} |J(A)| = |J(A_{max})| \qquad (3)$$

If $|J(A_{max})| > 1$, "$A_{max}$" is defined to be the above described subset "A". In other words, the unit tangent vector "$e_i$" in the equation (2) is selected so that the magnitude of the tangent vector "J(A)" becomes a maximum.

[Method 2]

Since the total number of the subsets of $\Omega$ is $2^m$ in the method 1, it seems difficult to obtain "$A_{max}$" if "m" is large. Accordingly, a subset "$A'_{max}$" of $\Omega$, which satisfies the following conditions, is obtained.

(condition 1) for an arbitrary $k \in \Omega - A'_{max}$ $$|J(A'_{max} \cup \{k\})| \leq |J(A'_{max})| \qquad (4)$$

(condition 2) for an arbitrary $k \in \Omega A'_{max}$ $$|J(A'_{max} - \{k\})| \leq |J(A'_{max})| \quad (5)$$

where "$A'_{max}$" is considered to be a set approximate to the set "$A_{max}$". If $|J(A'_{max})| > 1$, "$A'_{max}$" is defined to be the above described subset "A". That is to say, the unit tangent vector "$e_i$" in the equation (2) is selected so that the magnitude of the tangent vector "J(A)" approximately becomes a maximum.

[Reshape Algorithm α3]

When the above described subset "A" can be selected, the comparison between "|e|" and "|J(A)|−1" is made and the reshape algorithm α1 or α2 is selected according to their largeness/smallness relationship. If $|e| > |J(A)| - 1$, a tree is reshaped with the reshape algorithm α1. If $|e| < |J(A)| - 1$, the tree is reshaped with the reshape algorithm α2.

These reshape algorithms can be applied to any Riemann space, and are search algorithms using the nature of a Riemann space. Here, the cost value relationship between the reshape algorithms α1 and α2 is considered. In a Riemann space, the following theorems are satisfied.

[Theorem 1]

Assume that a function of a tree set in a Riemann space (M, g), which is corresponded to the total of the edge lengths of the tree, is "F" for the tree in the Riemann space given by a manifold "M" and a metric "g".

Here, suppose that a tree "T" is in (M, g), and the position of a node "a" of the tree "T" in "M" is p∈M, the connection destination node of the node "a" is $b_i (1 \leq i \leq m)$, and the position of each $b_i$ in "M" is $q_i \in M (1 \leq i \leq m)$. Also suppose that a geodesic connecting the points "$q_i$" and "p", whose length from "p" to "$q_i$" is the distance between "p" and "$q_i$", exists, and the tree obtained by moving the position of the node "a" of the tree "T" to q∈M is "T'". If the point "q" is sufficiently close to the point "p", the following equations are satisfied.

$$F(T') - F(T) = -g(e, h) + o(|h|^2) \quad (4)$$

Note that, however, the following equation is satisfied by assuming that the distance from the point "p" to the point "$q_i$" is d(p, $q_i$) for a geodesic $x_i(t)$.

$$g(dx_i(t)/dt, dx_i(t)/dt) = 1 \quad (1 \leq i \leq m) \quad (5)$$

$$x_i(0) = p \quad (1 \leq i \leq m) \quad (6)$$

$$x_i(d(p, q_i)) = q_i \quad (1 \leq i \leq m) \quad (7)$$

Additionally, $e_i \in T_p(M)$ is defined by the following equation based on the assumption that the tangent space of the point "p" is $T_p(M)$.

$$e_i = dx_i(0)/dt \quad (8)$$

Furthermore, $h \in T_p(M)$ is defined by the following equation.

$$q = \exp(h) \quad (9)$$

[Demonstration of Theorem 1]

A function "G" in "M" is defined by the following equation.

$$G(x) = \sum_{i=1}^{m} d(x, qi) \quad (10)$$

At this time, the next equation is satisfied.

$$G(q) - G(p) = F(T') - F(T) \quad (11)$$

This is because none but the edge starting from the node "a" exists as an edge changing when the tree "T" is reshaped into the tree "T'". The left side of the equation (11) is given by the following equation.

$$G(q) - G(p) = g(\nabla G(p), h) + o(|h|^2) \quad (12)$$
$$= g\left(\sum_{i=1}^{m} \nabla d(x, q_1)|_{x=p}, h\right) + o(|h|^2)$$
$$= -g(e, h) + o(|h|^2)$$

The equation (4) is obtained from the equations (11) and (12). Q.E.D

It is concluded from the theorem 1 that the cost value efficiently decreases with the use of the reshape algorithm α1. Here, assume that "F" in the equation (4) is the cost function of a tree, and e≠0. At this time, it is considered that the value of the equation (4) is reduced to a smallest possible number by setting "ε" to a sufficiently small positive number, and by moving "h" in the range of $|h| = \epsilon$ in the theorem 1.

Here, it may be considered that the first term −g(e, h) on the right side of the equation (4) is reduced to a smallest possible number if the second term on the right side is ignored as the order term of the square of an infinitesimal amount ε. The following equation is satisfied with a Schwartz inequality for an arbitrary "h" which satisfies $|h| = \epsilon$.

$$-\epsilon|e| = -|h||e| \leq -g(e, h) \quad (13)$$

Accordingly, −g(e, h) becomes the smallest when the equal sign in the equation (13) is satisfied. When "h" is given by the following equation, the equal sign in the equation (13) is satisfied.

$$h = (\epsilon/|e|)e \quad (14)$$

Additionally, the equation (14) is substituted for the equation (4) and the term of the square of the infinitesimal amount is ignored, so that the following equation is obtained.

$$F(T') - F(T) = -\epsilon|e| < 0 \quad (15)$$

Accordingly, if a point is infinitesimally moved in the direction of "h" represented by the equation (14) (in the direction of "e" if the vector multiplied by the scalar in the equation (14) is ignored), a cost is proved to decrease most efficiently.

Additionally, also the following theorem can be satisfied in a Riemann space.

[Theorem 2]

A function of a tree set in a Riemann space (M, g), which is corresponded to the total of the edge lengths of a tree, is assumed to be "F" for the tree in (M, g).

Here, suppose that "T" is a tree in (M, g), the position of a node "a" of the tree "T" in "M" is p∈M, the connection destination node of the node "a" is "$b_i$" $(1 \leq i \leq m)$, the position of each "$b_i$" in "M" is $q_i \in M$ $(1 \leq i \leq m)$, and the geodesic connecting the points "$q_i$" and "p", whose length from "p" to "$q_i$" is the distance between "p" and "$q_i$" exists.

Also suppose that a new node "c" whose position is q∈M is added to the tree "T", the nodes "a" and "c" are connected, and the tree obtained by disconnecting from the node "a" the node "$b_i$" which satisfies i∈A for the subset "A" of the set Ω and by connecting "$b_i$" to the node "c" is "$T'_A$". If the point "q" is sufficiently close to the point "p" at this time, the following equation is satisfied.

$$F(T'_A)-F(T)=|h|-g(J(A),h)+o(|h|^2) \quad (16)$$

However, it is assumed that the equations (5) through (7) are satisfied for the geodesic $x_i(t)$, and $e_i \in T_p(M)$ and h∈$T_p$(M) are defined by the equations (8) and (9).

[Demonstration of Theorem 2]

A function "H" of "M" is defined by the following equation.

$$H(x) = d(x, p) + \sum_{i \in A} d(x, q_i) \quad (17)$$

At this time, the following equation is satisfied.

$$H(q)-H(p)=F(T'_A)-F(T) \quad (18)$$

This is because none but the edge connecting the nodes "a" and "$b_i$" exists as an edge changing when the tree "T" reshapes into "$T'_A$". The left side of the equation (18) is given by the following equation.

$$H(q) - H(p) = d(p, q) + \sum_{i \in A} d(q, q_i) - d(p, q_i) \quad (19)$$

$$= |h| + g\left(\sum_{i \in A} \nabla d(x, q_i)|_{x=p}, h\right) + o(|h|^2)$$

$$= |h| - g(J(A), h) + o(|h|^2)$$

The equation (16) is obtained by the equations (18) and (19). Q.E.D

It is concluded from the theorem 2 that the cost value efficiently decreases with the use of the reshape algorithm α2. Here, assume that "F" in the equation (16) is the cost function of the tree, and e≠0. At this time, it is considered that the value of the equation (16) is reduced to a smallest possible number by setting "ϵ" to a sufficiently small positive number, and by moving "h" in the range of |h|=ϵ in the theorem 2.

Because the first term on the right side of the equation (16) is a constant value ϵ, it may be considered that the second term −g(J(A), h) on the right side is reduced to a smallest possible number if the third term on the right side is ignored as the order term of the square of the infinitesimal amount ϵ. Likewise the above described consideration of the theorem 1, −g(J(A), h) becomes the smallest when "h" is given by the following equation.

$$h=(\epsilon/|J(A)|)J(A) \quad (20)$$

Additionally, the equation (20) is substituted for the equation (16), and the term of the square of the infinitesimal amount is ignored, so that the following equation is obtained.

$$F(T'_A) - F(T) = \epsilon - \epsilon|J(A)| \quad (21)$$

$$= \epsilon(1 - |J(A)|)$$

Here, if $|J(A)|\leq 1$, $F(T'_A)-F(T)\geq 0$ is satisfied. As a result, it can be proved that the cost does not decrease with such an infinitesimal reshape of the tree "T". In the meantime, if $|J(A)|>1$, $F(T'_A)-F(T)<0$ is satisfied. As a result, it can be proved that the cost is decreased with the infinitesimal reshape. Accordingly, if $|J(A)|>1$, the cost is proved to decrease most efficiently if a new node is arranged in the direction of "h" represented by the equation (20) (in the direction of J(A) if the vector multiplied by the scalar in the equation (20) is ignored).

The reshape algorithm α3 is an algorithm adopting either of the reshape algorithms α1 and α2, which implements a lower cost, based on the comparison between the equations (15) and (21). The reshape algorithms α through α3 are proved to possess the nature which makes a search efficient, as described above.

With the above explained local Steiner tree search algorithms, the practical problems describer earlier can be solved as follows.

(A) The algorithms can be applied also to a problem in spaces other than on a plane, such as in a global network on a worldwide level or a network in a three-dimensional space.

(B) If network installation in a particular area is prohibited, the installation can be automatically prevented by selecting as a model a metric space where the corresponding area is weighted.

(C) It becomes possible to optimize a network installation cost in consideration of a difference in network installation costs per unit length. In this case, a metric space where each area is weighted with an installation cost per unit length may be selected as a model.

A processing device based on this search algorithm can be implemented by arbitrary hardware or software. Exemplified below is the configuration using object-oriented programming, which is revealed in the previous application "Processing Device for Solving an Optimization Problem and a Method Thereof" (Japanese Patent Application No. 11-16500).

FIG. 6 shows the configuration of such a processing device. A processing device shown in FIG. 6 comprises a search common object group 11, a search interface object group 12, a Steiner problem common object group 13, a metric space object group 14, and a metric space object factory object group 15. An object normally comprises data and a procedure (method) for the data, and can also have a linkage with another object.

The search common object group 11 is a common object of a search process, and has a general-purpose logic 21 for optimization problems and a general-purpose method interface (optimization problem common interface) 22, not limited to Steiner problems. This search common object group 11 includes the following objects.

(1) search engine object
(2) start button object
(3) stop button object

The search interface object group 12 comprises a logic 23 common to Steiner problems, and exchanges messages with the search common object group 11 via the method interface 22. Additionally, the search interface object group 12 exchanges messages with the Steiner problem common object group 13 or the metric space object group 14 via the Steiner problem common interface 24. The search interface object group 12 includes the following objects.

(1) cost function object
(2) start shape generation object
(3) shape object
(4) reshape element object
(5) reshape algorithm management object
(6) reshape algorithm group object
(7) reshape algorithm object
(8) point move reshape algorithm object
(9) point branch reshape algorithm object
(10) point contraction reshape algorithm object
(11) shape display object The classes of the point move reshape algorithm object, the point branch reshape algorithm object, and the point contraction reshape algorithm object among the above described objects are special forms (inheritance classes) of a reshape algorithm object class.

The Steiner problem common object group 13 comprises a logic 25 which is common to all of Steiner problems and does not depend on the nature of a metric space where a tree is realized, and exchanges messages with the metric space object group 14 via the Steiner problem common interface 24. The Steiner problem common object group 13 includes the following objects.

(1) point contraction reshape algorithm object
(2) non-Riemann space reshape algorithm group object
(3) non-Riemann space point move reshape algorithm group object
(4) non-Riemann space point branch reshape algorithm group object
(5) Riemann space reshape algorithm object
(6) Riemann space point move/branch reshape algorithm group object The metric space object group 14 comprises a common method interface which is independent from the inherent nature of a metric space where a tree is realized. However, a method operation logic 26 depends on the inherent nature of the metric space. The metric space object group 14 includes the following objects.

(1) metric space object
(2) point object
(3) screen coordinate transformation object The metric space object factory object group 15 generates each of the objects included in the metric space object group 14. By customizing the factory object group 15, the processing device can be adapted to an individual metric space. To be more specific, the factory object group 15 generates a metric space object group 14 which comprises the algorithms satisfying the requirements of an individual metric space. The factory object group 15 includes the following objects.

(1) metric space object generation object
(2) point object generation object
(3) screen coordinate transformation object generation object As described above, the processing device shown in FIG. 6 is configured by the common object component parts 11, 12, and 13, which do not depend on the nature of a metric space, and the individual object component parts 14 and 15 which depend on the nature of the metric space. By exchanging the individual object component parts, the processing device corresponding to a different metric space can be easily configured. Furthermore, also the tuning of the individual object component parts can be easily performed, thereby increasing a processing efficiency according to the nature of a metric space.

Next, the data and the method, which are possessed by each of the objects, are explained. First of all, the respective objects included in the search common object group 11 are as follows.

The search engine object possesses a shape object, a cost value object, and a search method.

The start button object possesses a timing flag object and a start method, and detects the operation of a search engine start button displayed on a display screen. The timing flag object possesses a flag representing the timing at which the data of the shape object is displayed. The start method starts the search engine object based on an event driven by pressing the button.

The stop button object possesses a termination flag object and a stop method, and detects the operation of the search engine stop button displayed on a display screen. The termination flag object possesses a flag representing the timing at which the search process by the search engine object is terminated. The stop method stops the search engine object based on an event driven by pressing the button.

Next, the respective objects included in the search interface object group 12 are as follows.

The cost function object possesses a cost value method for returning the cost value of a given shape. For a Steiner problem, the total distance of a connected tree in a metric space corresponds to the cost value.

The start shape generation object possesses a fixed node number object, an initial completion node number object, a start shape generation button object, and a start shape method.

The fixed node number object possesses the number (integer) of fixed nodes as data. This number is the number of fixed nodes, which is initially given as a start shape (the shape of a connected tree in a metric space) in a Steiner problem, and such fixed nodes do not move or annihilate during a tree reshape.

The initial completion node number object possesses the number (integer) of initial completion nodes as data. The number of completion nodes is the number of completion nodes added besides the above described fixed nodes. Such completion nodes move and annihilate during a tree reshape.

The start shape method detects the operation of the start shape generation button displayed on a display screen, and generates a start shape based on an even driven by pressing the button.

The reshape element object corresponds to each node of a tree in a metric space, and possesses a point object and a fixed node flag object.

The shape object corresponds to a model of a tree in a metric space, and possesses a reshape element array object, a reshape element pair array object, and a rearrangement method. The reshape element array object possesses an array of reshape element objects corresponding to all of nodes of a tree. The reshape element pair array object possesses an array of a reshape element object pair corresponding to two interconnected nodes.

The rearrangement method rearranges an array of updated reshape element objects and an array of an updated reshape element object pair. When an array is rearranged, array elements which become unnecessary are deleted.

The reshape algorithm management object possesses an initialization method, a reshape element method, and a notification method. The initialization method initializes a reshape algorithm management object. The reshape element method obtains the reshape element object to be processed next. The notification method notifies whether or not the next reshape element object exists.

The reshape algorithm group object possesses an update flag object, an initialization method, a reshape algorithm method, and a notification method. The initialization method initializes a reshape algorithm group object for each reshape element object. The reshape algorithm method obtains the reshape algorithm object to be applied next. The notification method notifies whether or not the next reshape algorithm object exists.

The reshape algorithm object possesses a reshape method for returning to a given shape the shape after being reshaped.

The point move reshape algorithm object is one of the special forms of the reshape algorithm object, and possesses a reshape element object, a point object, and a reshape method. The reshape method is equivalent to the point move reshape algorithm which moves a reshape element object to the position of a point object.

The point branch reshape algorithm object is one of the special forms of the reshape algorithm object, and possesses a reshape element object, a point object, a reshape element array object, and a reshape method. The reshape method is equivalent to the point branch reshape algorithm which recognizes a point object to be the position of a newly added node, and relinks the node indicated by the reshape element array object among the connection destination nodes of the node corresponding to the reshape element object.

The point contraction reshape algorithm object is one of the special forms of the reshape algorithm object, and possesses a first reshape element object, a second reshape element object, and a reshape method. The reshape method is equivalent to the point contraction reshape algorithm which makes a first node overlap with a second node corresponding to the second reshape element object among the connection destination nodes of the first node corresponding to the first reshape element object.

The shape display object possesses a timing flag object, a state flag object, and a display method. The display method displays a given shape on a display screen.

Next, the respective objects included in the Steiner problem common object group 13 are as follows.

The point contraction reshape algorithm group object possesses a pointer object, a reshape element object, a reshape element array object, an initialization method, a point contraction reshape algorithm method, and a notification method. The pointer object possesses a pointer (whose value is an integer) as data.

The initialization method initializes the point contraction reshape algorithm group object for each reshape element. The point contraction reshape algorithm method obtains the point contraction reshape algorithm to be applied next. The notification method notifies whether or not the next point contraction reshape algorithm exists.

The non-Riemann space reshape algorithm group object possesses a fixed node flag object, a reshape algorithm status object, a non-Riemann space point move reshape algorithm group object, a non-Riemann space point branch reshape algorithm group object, a point move reshape algorithm group object, an initialization method, a reshape algorithm method, and a notification method. The reshape algorithm status object possesses the data (integer) of the reshape algorithm status.

The initialization method initializes the non-Riemann space reshape algorithm group object for each reshape element. The reshape algorithm method obtains the reshape algorithm to be applied next. The notification method notifies whether or not the next reshape algorithm exists.

The reshape algorithm firstly obtains the reshape algorithm based on the point move reshape algorithm, secondly the reshape algorithm based on the point branch reshape algorithm, and lastly the reshape algorithm based on the point contraction reshape algorithm. Accordingly, the current state where a reshape algorithm object is obtained based on which algorithm is stored in the reshape algorithm status.

Specifically, "reshape algorithm status=1" represents that the algorithm to be obtained next is an algorithm obtained form the point move reshape algorithm. "reshape algorithm status=2" represents that the algorithm to be obtained next is an algorithm obtained from the point branch reshape algorithm. "reshape algorithm status=3" represents that the algorithm to be obtained next is an algorithm obtained from the point contraction reshape algorithm. The non-Riemann space point move reshape algorithm group object possesses a reshape element object, a point array object, a move amount object, a move amount counter object, a same distance pointer object, a point-move initial move amount object, a point-move maximum search index object, a point move same distance search times object, an initialization method, a point move reshape algorithm method, and a notification method.

The point array object possesses an array of point objects. The move amount object, the move amount counter object, the same distance pointer object, the point-move initial move amount object, the point-move maximum search index object, and the point move same distance search times object respectively possess as data a move amount (real number), a move amount counter (integer), a same distance pointer (integer), a point-move initial move amount (real number), a point-move maximum search index (integer), and the number (integer) of point move same distance search times.

The initialization method initializes the non-Riemann space point move reshape algorithm group object for each reshape element. The point move reshape algorithm method obtains the point move reshape algorithm to be applied next. The notification method notifies whether or not the next point move reshape algorithm exists.

The non-Riemann space point branch reshape algorithm group object possesses a reshape element object, a point array object, a subset array object, a move amount object, a move amount counter object, a same distance pointer object, a subset pointer object, a point-branch initial move amount object, a point branch maximum search index object, a point branch same distance search times object, an initialization method, a point branch reshape algorithm method, and a notification method.

The subset array object possesses an array of subset objects. Additionally, the move amount object, the move amount counter object, the same distance pointer object, the subset pointer object, the point-branch initial move amount object, the point branch maximum search index object, and the point branch same distance search times object respectively possess as data a move amount (real number), a move amount counter (integer), a same distance pointer (integer), a subset pointer (integer), a point-branch initial move amount (real number), a point branch maximum search index (integer), and the number of point branch same distance search times (integer).

The initialization method initializes the non-Riemann space point branch shape algorithm group object for each reshape element. The point branch reshape algorithm method obtains the point branch reshape algorithm to be applied next. The notification method notifies whether or not the next point branch reshape algorithm exists.

The Riemann space reshape algorithm group object possesses a Riemann space point move/branch reshape algorithm group object, a point contraction reshape algorithm group object, a reshape algorithm status object, an initialization method, a reshape algorithm method, and a notification method.

The initialization method initializes the Riemann space reshape algorithm group object for each reshape element. The reshape algorithm method obtains the reshape algorithm to be applied next. The notification method notifies whether or not the next reshape algorithm exists.

The reshape algorithm method firstly obtains the reshape algorithm based on the Riemann space point move/branch reshape algorithm group object, and secondly the reshape algorithm based on the point contraction reshape algorithm. Accordingly, the current state where a reshape algorithm object is obtained based on which algorithm is stored in the reshape algorithm status.

Specifically, "reshape algorithm status=1" represents that the reshape algorithm to be obtained next is an algorithm obtained from the Riemann space point move/branch reshape algorithm group object. "reshape algorithm status=3" represents that the reshape algorithm to be obtained next is an algorithm obtained from the point contraction reshape algorithm.

The Riemann space point move/branch reshape algorithm group object possesses a reshape element object, a reshape element array object, a point move algorithm flag object, a move direction vector object, a move amount object, a move amount counter object, a point-move initial move amount object, a point-move maximum search index object, a point-branch initial move amount object, a point-branch maximum search index object, an initialization method, a reshape algorithm method, a notification method, a reshape algorithm determination method, a point-move move vector calculation method, and a point-branch move vector calculation method.

The point move algorithm flag object, the move direction vector object, the move amount object, the move amount counter object, the point-move initial move amount object, the point-move maximum search index object, the point-branch initial move amount object, and the point-branch maximum search index object respectively possess as data a point move algorithm flag, a move direction vector (n-dimensional vector), a move amount (real number), a move amount counter (integer), a point-move initial move amount (real number), a point-move maximum search index (integer), a point-branch initial move amount (real number), and a point-branch maximum search index (integer).

The initialization method initializes the Riemann space point move/branch reshape algorithm group object for each reshape element. The reshape algorithm method obtains the reshape algorithm to be applied next. The notification method notifies whether or not the next reshape algorithm exists.

The reshape algorithm determination method determines the reshape algorithm to be applied. The point-move move vector calculation method calculates the point-move move vector corresponding to the tangent vector "e" used in the above described reshape algorithm α1. The point-branch move vector calculation method calculates the point-branch move vector corresponding to the tangent vector $J(A_{max})$ used in the above described reshape algorithm α2, and an array of the reshape element objects, which corresponds to the subset $A_{max}$.

The reshape algorithm object used here is the point move reshape algorithm object or the point branch reshape algorithm object. The reshape algorithm determination method determines which reshape algorithm object is adopted by using the above described reshape algorithm α3, and updates the point move algorithm flag according to its result. Here, if the point move reshape algorithm is adopted, this flag is set to ON. Otherwise, the flag is set to OFF.

The reshape algorithm determination method not only determines a reshape algorithm, but also returns a move direction vector. If a determined algorithm is the point branch reshape algorithm, this method further returns an array of reshape element objects. The array of reshape element objects has a significance only when the point branch reshape algorithm is adopted, and represents an array of relinked nodes.

In the point move reshape algorithm, the move direction vector indicates the move direction of the position of a node. In the point branch reshape algorithm, the move direction vector indicates the position of a newly added node, which is viewed from the original node, and is represented by the vector at the position of the original node in the tangent space.

Additionally, the point-move initial move amount is equivalent to the move amount (distance) of a point when a tree is initially reshaped with the point move reshape algorithm.

Furthermore, the point move maximum search index is an index for determining an infinitesimal move amount which is a criteria for stopping a search according to the point move reshape algorithm. The processing device continues to make the search according to the point move reshape algorithm until the move amount becomes the infinitesimal move amount. The infinitesimal move amount is decreased as this index is increased, so that the search according to the point move reshape is made with high accuracy. Assuming that the point-move initial move amount is "H", and the point move maximum search index is "H", the infinitesimal move amount for a search stop is given by the following equation.

$$\text{infinitesimal move amount} = H/2^N \qquad (22)$$

Additionally, the point-branch initial move amount is equivalent to the distance between the position of the original node recognized as a criteria and that of a newly added node, when a tree is initially reshaped with the point branch reshape algorithm.

The point-branch maximum search index is an index for determining an infinitesimal move amount being a criteria for stopping a search according to the point branch reshape algorithm. The infinitesimal move amount is decreased as this index is increased, so that the search according to the point branch reshape can be made with high accuracy. Assuming that the point-branch initial move amount is "H", and the point-branch maximum search index is "N", the infinitesimal move amount for a search stop is given by the equation (22).

Next, the respective objects included in the metric space object group 14 are as follows.

The point object corresponds to a point in a metric space.

The metric space object possesses a Riemann space flag object, a distance method, a random method, a tangent vector method, a geodesic method, and a plural-points method. The Riemann space flag object possesses a Riemann space flag as data.

If two point objects are given, the distance method returns the distance between the two corresponding points, and the random method returns point objects generated at random. If two point objects are given, the tangent vector method returns a unit tangent vector at one point on the geodesic connecting the two corresponding points. This tangent vector method is valid only when the Riemann space flag is set to ON.

If a point object, the unit tangent vector object at the point corresponding to the point object, and its length are given, the geodesic method obtains the point which is apart from the given point by the given distance on the geodesic which starts from the given point and goes along the unit tangent vector corresponding to the unit tangent vector object, and returns the point object corresponding to the obtained point.

If point objects, lengths, and the number of point objects are given, the plural-points method returns the point objects apart from the given point objects by the given lengths, the number of which is given. the plural-points method may be valid only when the Riemann space flag is set to OFF.

The screen coordinate transformation object possesses a coordinate transformation method and a line method. The coordinate transformation method transforms a given point object into corresponding coordinates on a screen, and returns the coordinates. The line method returns the line on a screen, which connects two corresponding points to the given two point objects.

Next, the respective objects included in the metric space object factory object group 15 are as follows.

The metric space object generation object possesses a generation method for generating a metric space object corresponding to an individual metric space. The point object generation object possesses a generation method for generating a point object corresponding to a point in an individual metric space. The screen coordinate transformation object generation object comprises a generation method for generating a screen transformation object for an individual metric space.

Next, details of the processes performed by the objects shown in FIG. 6 are explained. Here, when all of the reshape operations according to the reshape algorithms managed by the reshape algorithm group object are completed, a search for one reshape element is terminated and the entire search is completed when a user presses a stop button on a screen with a mouse, etc.

Figure 7:
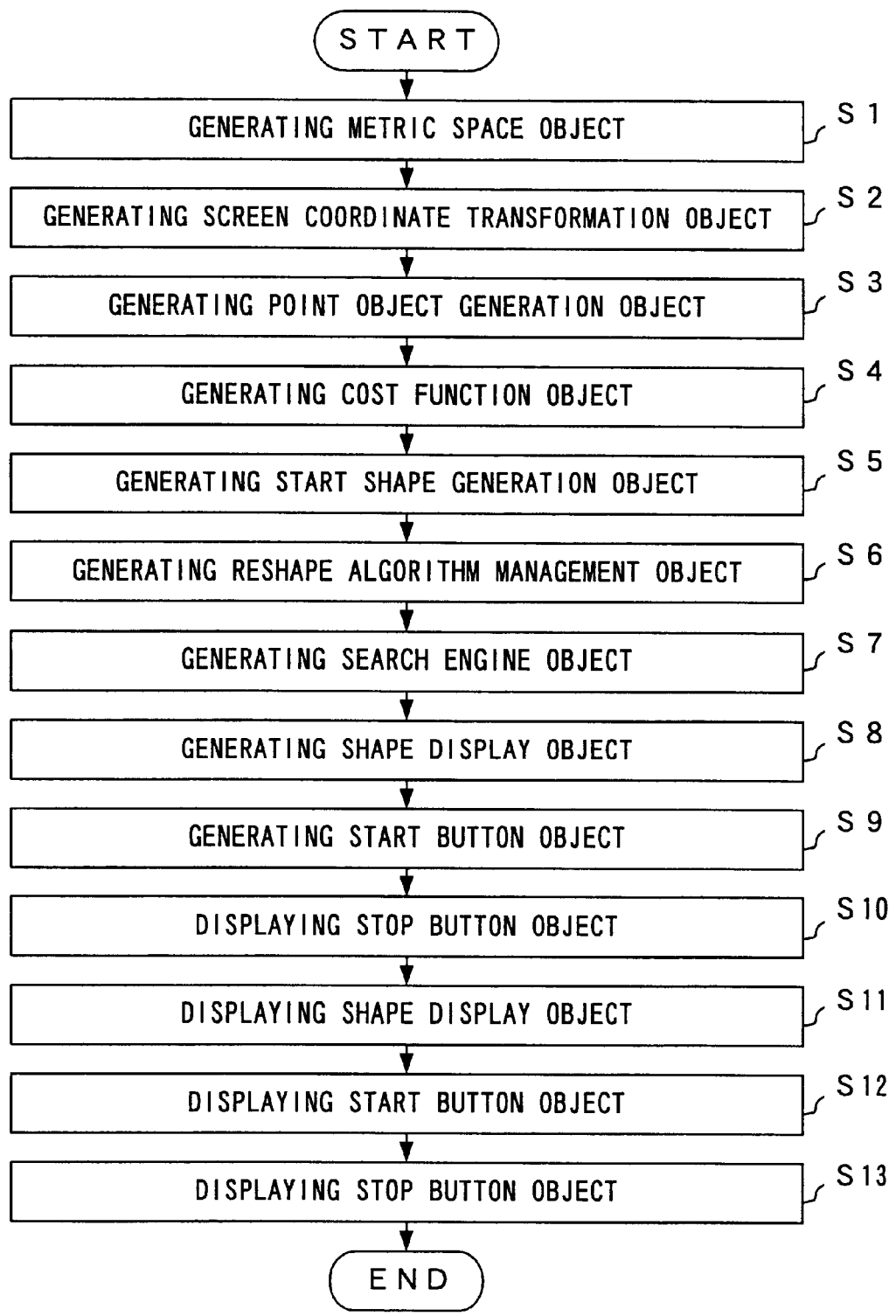
FIG. 7 is a flowchart showing a start process.

FIG. 7 is a flowchart showing the process of a start program for starting up a system. The start program generates a metric space object by starting the metric space object generation object (step S1), generates a screen coordinate transformation object by starting the screen coordinate transformation object generation object (step S2), and generates a point object by starting the point object generation object (step S3).

Next, the start program generates a cost function object (step S4), generates a start shape generation object (step S5), generates a transformation algorithm management object (step S6), generates a search engine object (step S7), and generates a shape display object (step S8). Then, the start program generates a start button object (step S9), and generates a stop button object (step S10).

Next, the start program displays the display area corresponding to the shape display object (step S11), displays the start button corresponding to the start button object (step S12), displays the stop button corresponding to the stop button object (step S13), and terminates the process.

Figure 8:
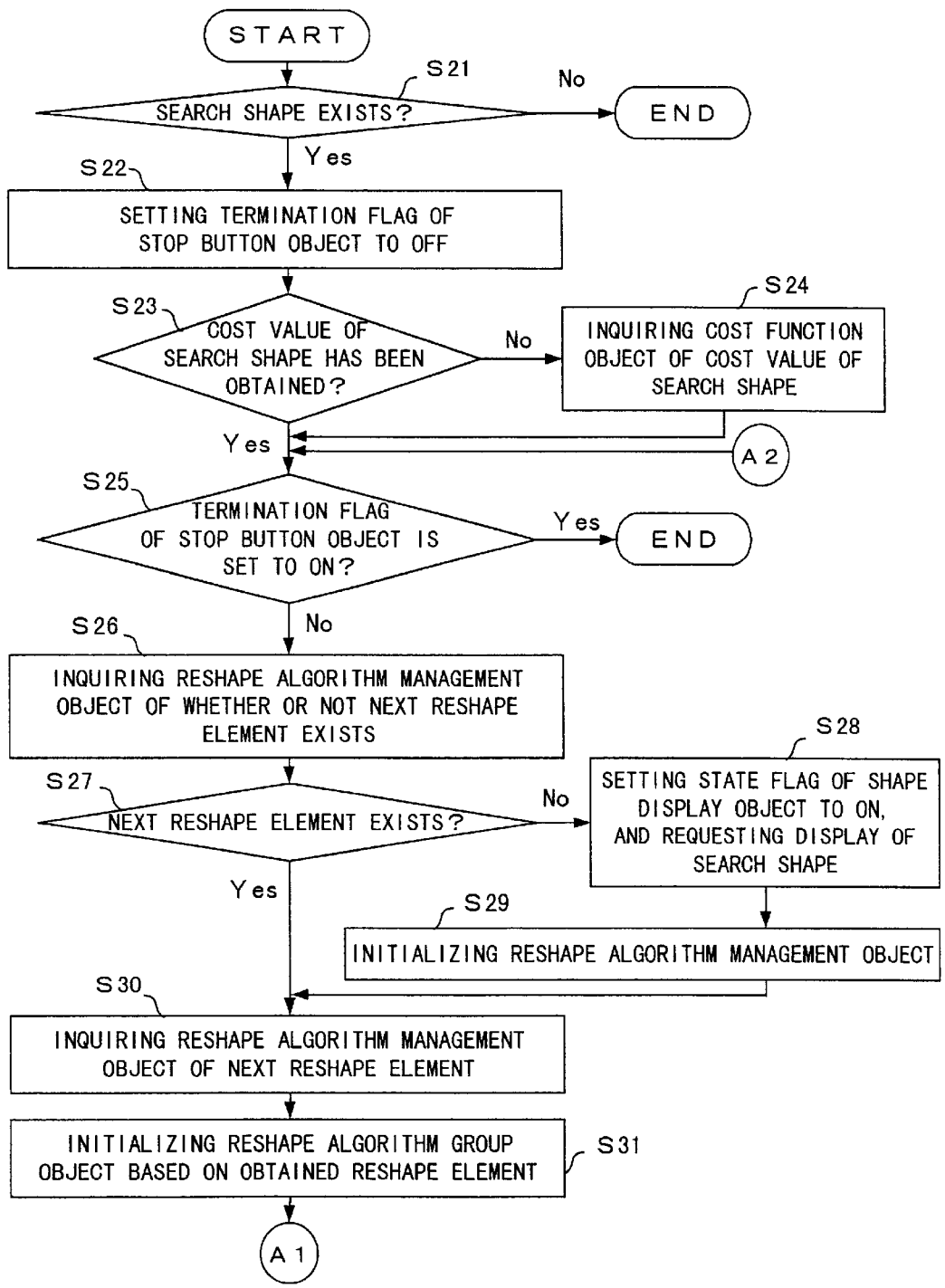
FIG. 8 is a flowchart showing a search method (No. 1)
Figure 9:
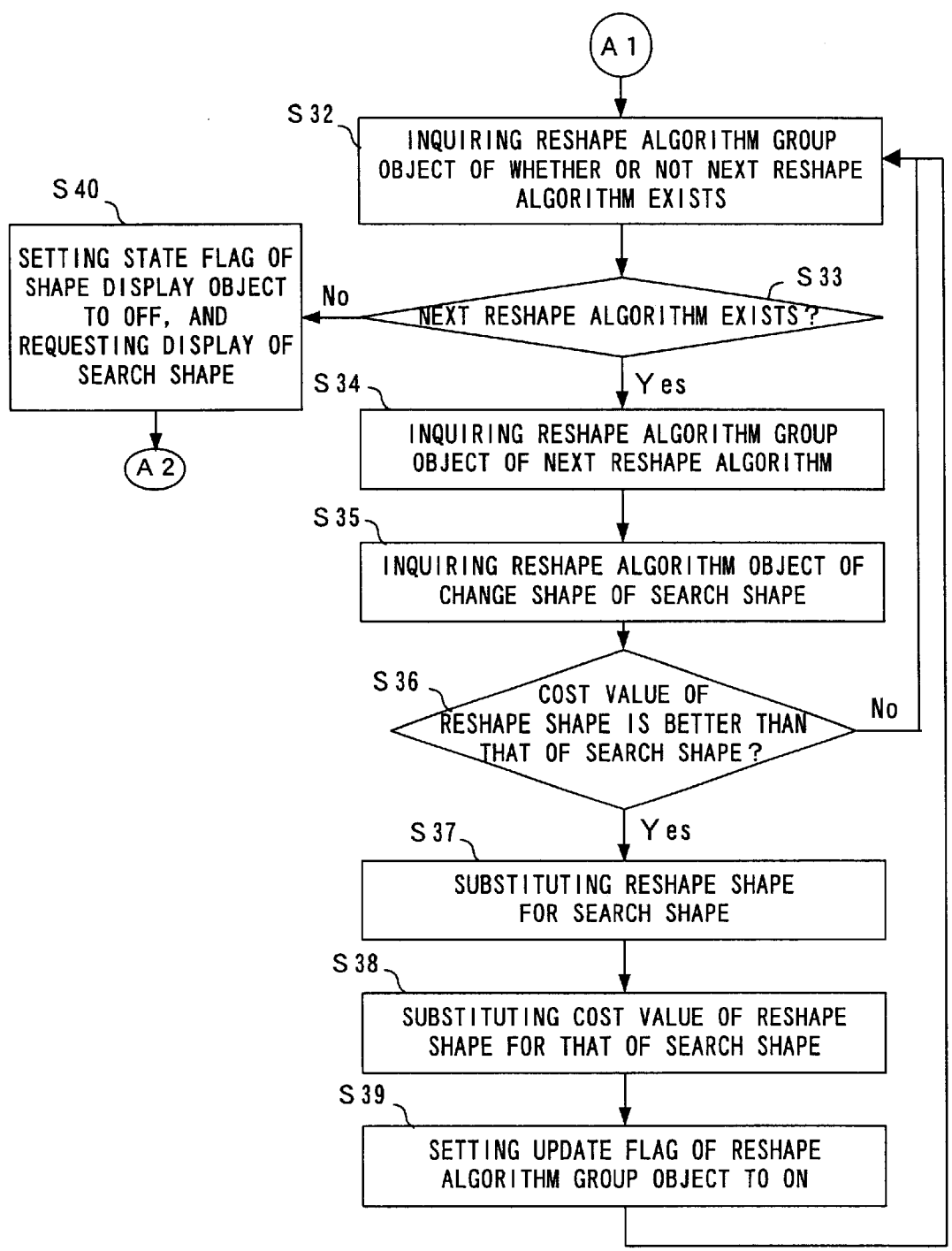
FIG. 9 is a flowchart showing the search method (No. 2)

FIGS. 8 and 9 are flowcharts showing the process of the search method possessed by the search engine object. The search method first checks whether or not a shape object representing a search shape exists (step S21 of FIG. 8), and terminates the process if the shape object does not exist. If the shape object exists, the search method sets to OFF the termination flag of the termination flag object possessed by the stop button object (step S22).

Then, the search method checks whether or not the cost value of the search shape has been obtained (step S23). If the cost value has not been obtained yet, the method inquires the cost function object of the cost value of the search shape, and stores the obtained cost value in the cost value of the cost value object (step S24).

Next, the search method inquires the suspension button object of whether or not the termination flag of the termination flag object is set to ON, and terminates the process if the termination flag is set to ON (step S25).

Then, the search method inquires the reshape algorithm management object of whether or not the next reshape element exists (steps S26 and S27). If the next reshape element does not exist, the search method requests the display of the search shape by setting to ON the state flag of the state flag object possessed by the shape display object (step S28), and requests the reshape algorithm management object to execute the initialization method (step S29).

Then, the search method inquires the reshape algorithm management object of the next reshape element (step S30), and requests the reshape algorithm group object to execute the initialization method based on the obtained reshape element (step S31).

Next, the method inquires the reshape algorithm group object of whether or not the next reshape algorithm exists (steps S32 and S33 of FIG. 9). If the next reshape algorithm exists, the search method obtains the reshape algorithm object representing the next reshape algorithm (step S34), and inquires the obtained reshape algorithm object of the change shape of the search shape (step S35).

Then, the search method inquires the cost function object of the cost value of the obtained change shape, and compares the obtained cost value with the cost value of the search shape possessed by the cost value object (step S36). If the cost value of the change shape is equal to or larger than that of the search shape, the method repeats the operations in and after step S32. If the cost value of the change shape is smaller than that of the search shape, the method adopts the change shape as a search shape and updates the shape object and the reshape element object after being reshaped (step S37).

Then, the search method substitutes the cost value of the change shape for that of the cost value object (step S38), sets to ON the update flag of the update flag object possessed by the reshape algorithm group object (step S39), and repeats the operations in and after step S32.

If the next reshape algorithm does not exist in step S33, the search method requests the display of the search shape by setting to OFF the state flag of the state flag object possessed by the shape display object (step S40), and repeats the operations in and after step S25 of FIG. 8. In this way, the process for the next reshape element is performed.

Figure 10:
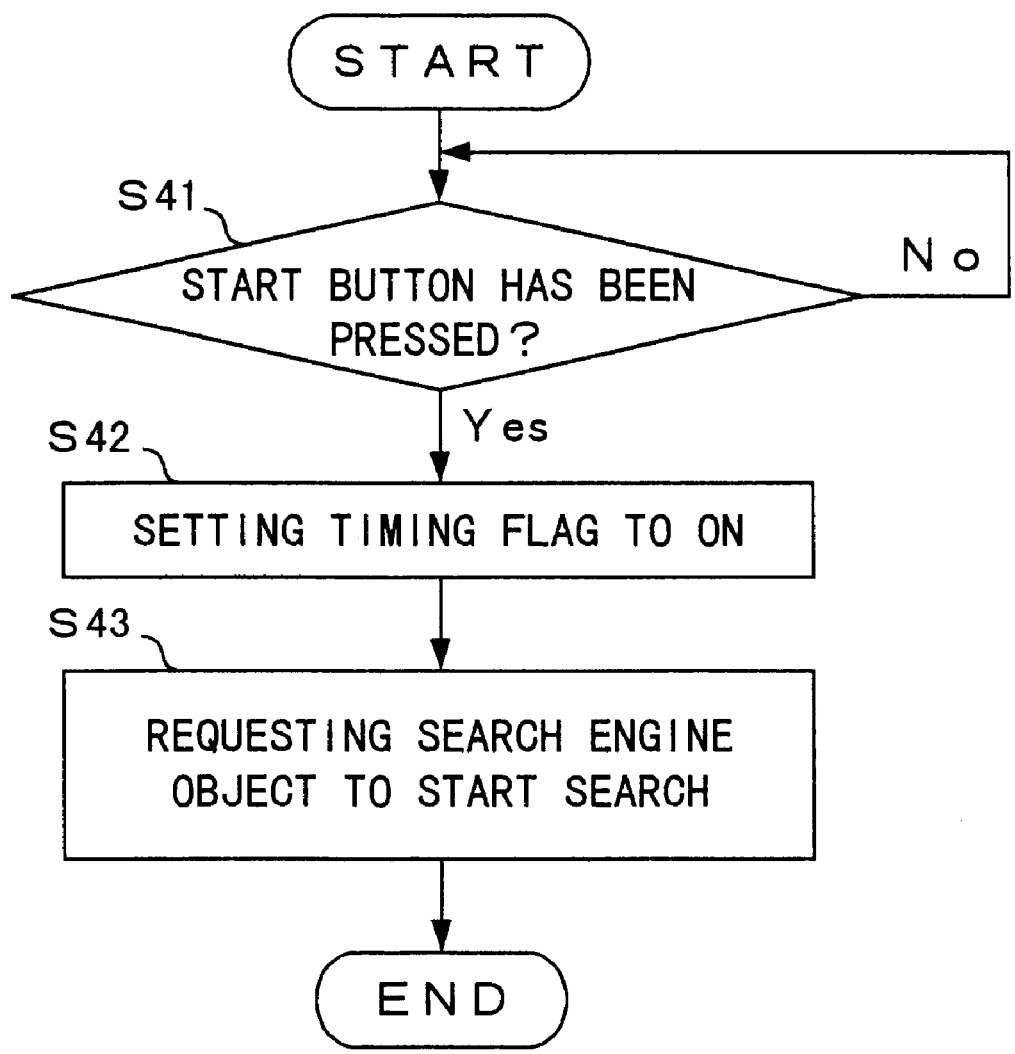
FIG. 10 is a flowchart showing a start method.

FIG. 10 is a flowchart showing the process of the start method possessed by the start button object. The start method periodically checks whether or not the start button has been pressed (step S41). If the start button has been pressed, the start method sets to ON the timing flag of the timing flag object (step S42), requests the search engine object to start a search (step S43), and terminates the process.

In step S42, two operations such as an operation for setting the timing flag to ON, and an operation for setting the timing flag to OFF are considered. Whether or not a search shape is displayed on a screen is determined based on the relationship between the timing and the state flags as will be described later. Therefore, different display timing can be specified depending on whether the timing flag is set to either ON or OFF.

Figure 11:
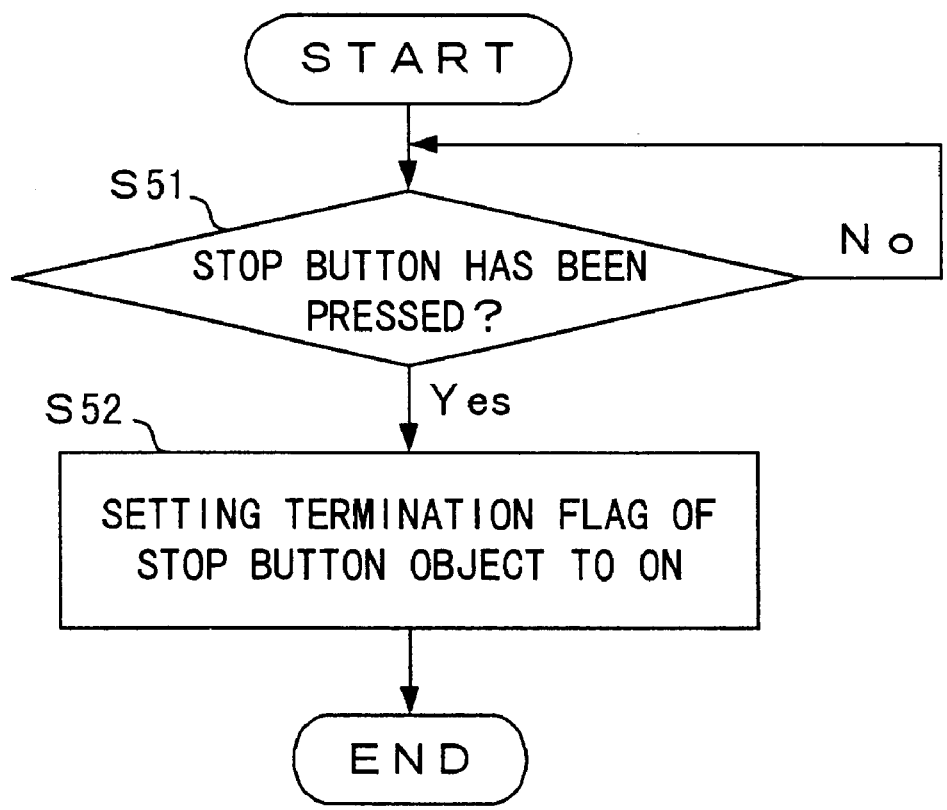
FIG. 11 is a flowchart showing a stop method.

FIG. 11 is a flowchart showing the process of the stop method possessed by the stop button object. The stop method periodically checks whether or not a start button has been pressed (step S51). If the start button has been pressed, the stop method sets the termination flag of the termination flag object to ON (step S52), and terminates the process.

Figure 12:
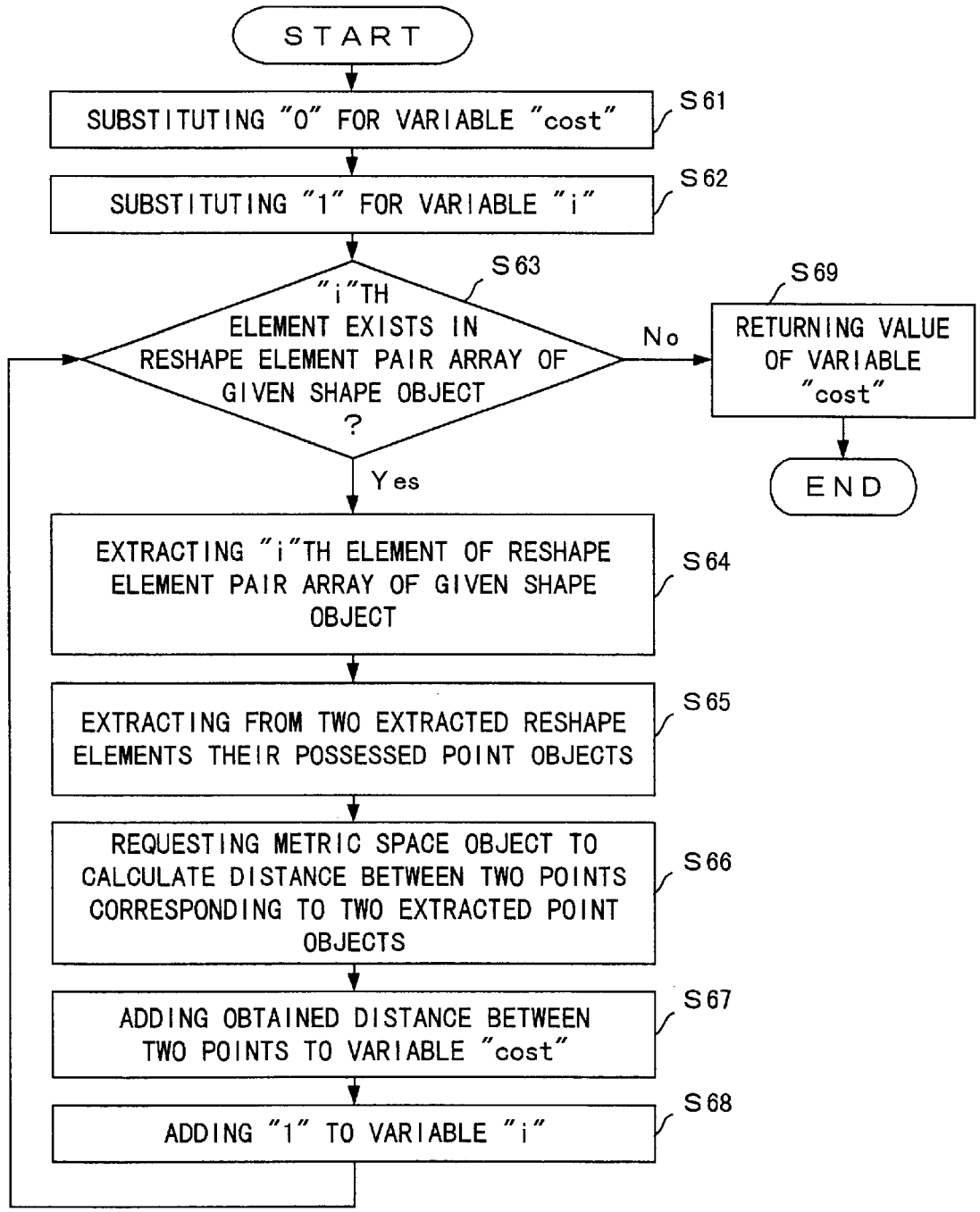
FIG. 12 is a flowchart showing a cost value method.

FIG. 12 is a flowchart showing the process of the cost value method possessed by the cost function object. The cost value method first substitutes "0" for a variable "cost" (step S61), substitutes "1" for a variable "i" (step S62), and checks whether or not an "i" th element exists in a reshape element pair array of a given shape object (step S63).

If the "i" th element exists, the cost value method extracts the reshape element pair corresponding to this element (step S64), and further extracts the point objects possessed by the two reshape elements included in the extracted reshape element pair from the elements (step S65).

Then, the cost value method requests the distance space object to calculate the distance between the two points corresponding to the two extracted point objects (step S66), and adds the obtained distance between the two points to the value of the variable "cost" (step S67). Then, the method adds "1" to the variable "i" (step S68), and repeats the operations in and after step S63. If the "i" th element does not exist in step S63, the method returns the value of "cost" (step S69) and terminates the process.

Figure 13:
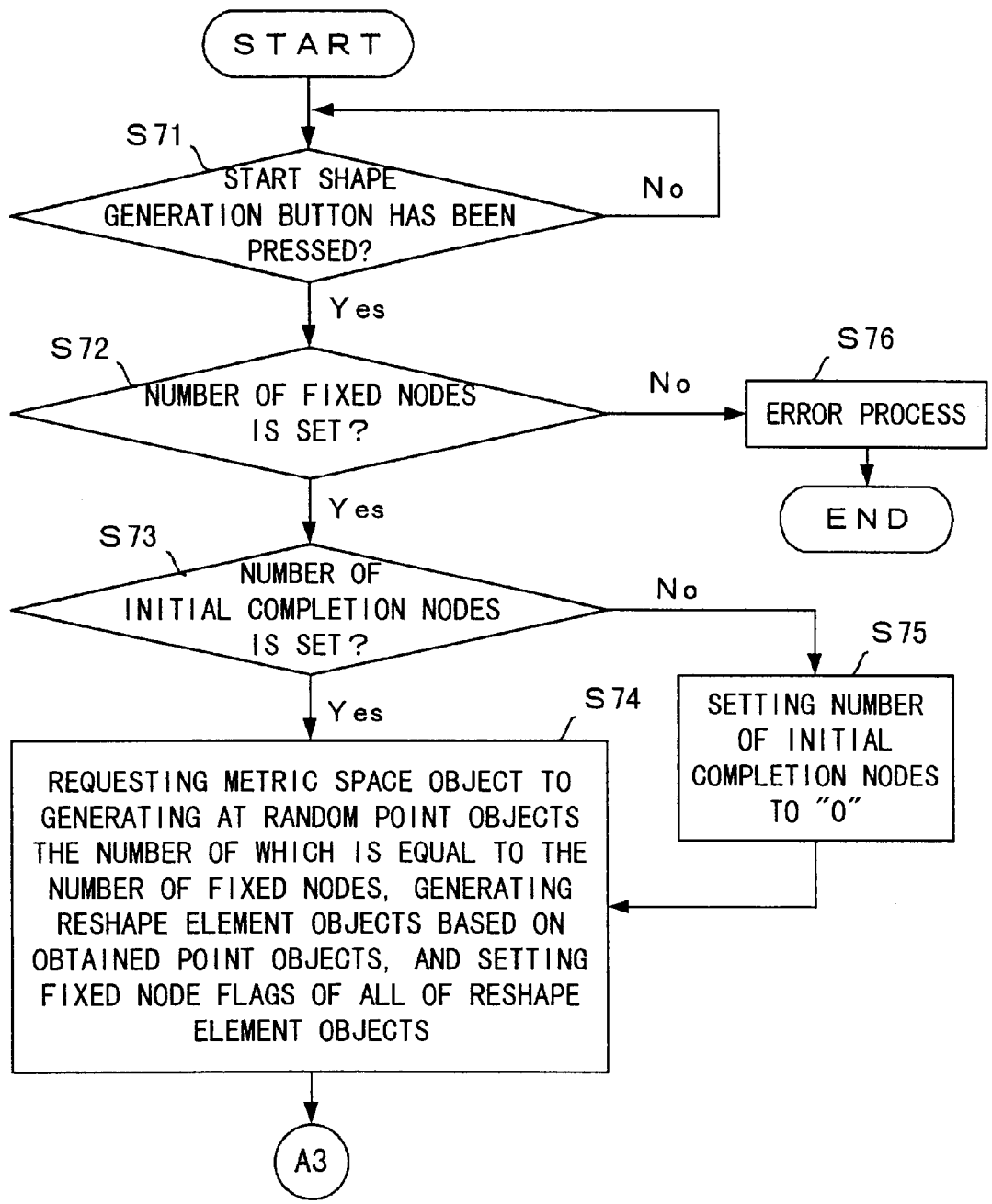
FIG. 13 is a flowchart showing a start shape method (No. 1)
Figure 14:
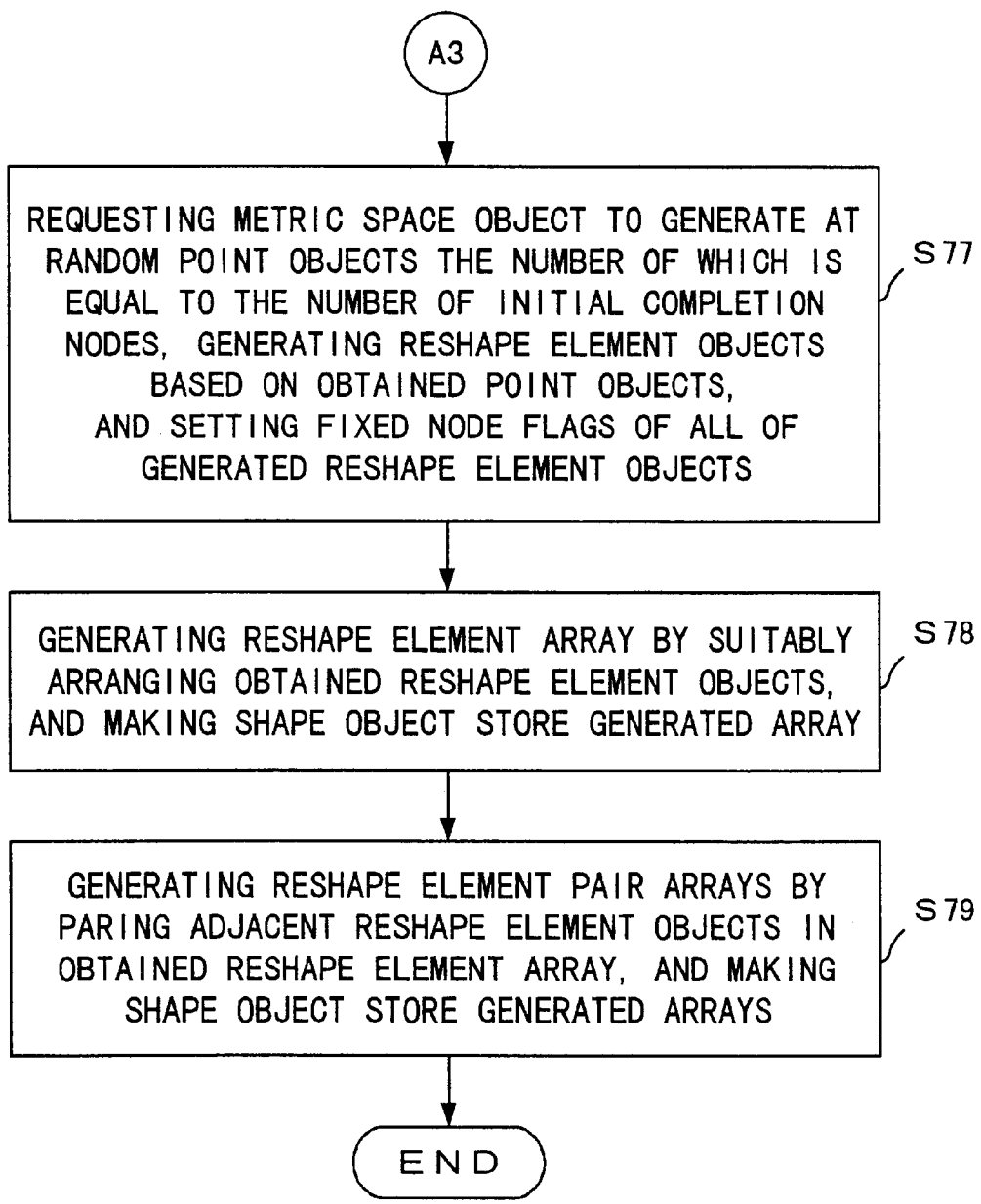
FIG. 14 is a flowchart showing the start shape method (No. 2)

FIGS. 13 and 14 are flowcharts showing the process of the start shape method possessed by the start shape generation object. Initially, the start shape method periodically checks whether or not a start shape generation button has been pressed (step S71 of FIG. 13). If the start shape generation button has been pressed, the start shape method checks whether or not the number of fixed nodes is set (step S72). If the number of fixed nodes is set, the method checks whether or not the number of initial completion nodes is set (step S73).

If the number of initial completion nodes is set, the start shape method requests the metric space object to generate point objects the number of which is equal to the number of fixed nodes at random, generates reshape element objects based on the obtained point objects, and sets to ON the fixed node flags of all of the generated reshape element objects (step S74).

If the number of initial completion nodes is not set, the start shape method sets this number to "0" (step S75), and performs the operation of step S74. If the number of fixed nodes is not set in step S72, the method displays an error message, etc. by performing an error process (step S76) and terminates the process.

Next, the start shape method requests the metric space object to generate point objects the number of which is equal to the number of initial completion nodes at random, generates reshape element objects based on the obtained point objects, and sets to OFF the fixed node flags of all of the generated reshape element objects (step S77).

Then, the start shape method generates an array of reshape elements by suitably arranging the obtained reshape element objects, and makes the shape object store the generated array (step S78). The method next generates reshape element pair arrays by paring adjacent reshape element objects, makes the shape object store the generated arrays (step S79), and terminates the process.

Figure 15:
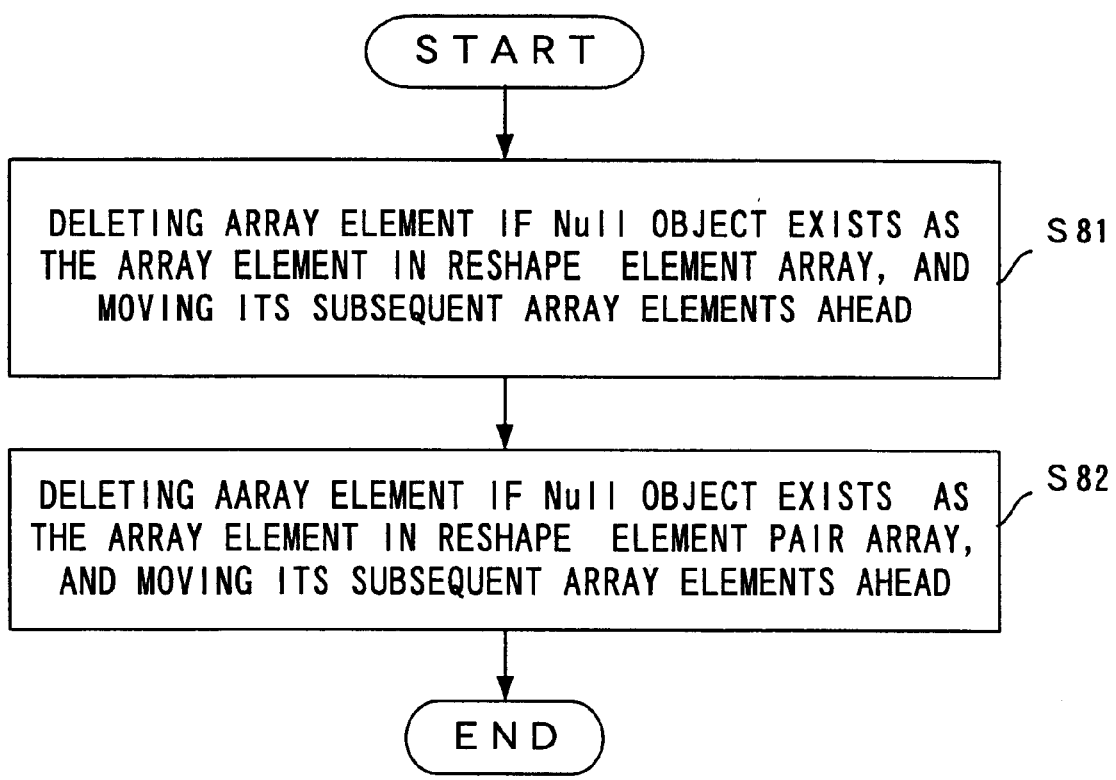
FIG. 15 is a flowchart showing a rearrangement method.

FIG. 15 is a flowchart showing the process of the rearrangement method possessed by the shape object. If a null object (empty element) exists as an element of a reshape element array, the rearrangement method first deletes this element and moves the subsequent elements ahead (step S81). Then, if a null object exists as an element of a reshape element pair array, the method deletes this element, moves the subsequent elements ahead (step S82) and terminates the process.

FIG. 16 is a flowchart showing the process of the initialization method possessed by the reshape algorithm management object. The initialization method rearranges the reshape element array and the reshape element pair array, which are possessed by the shape object (step S91), and stores the numbers of elements of the reshape element arrays as the initial numbers of the array elements (step S92). Then, the initialization method substitutes "0"0 for a pointer (step S93), and terminates the process.

Figure 17:
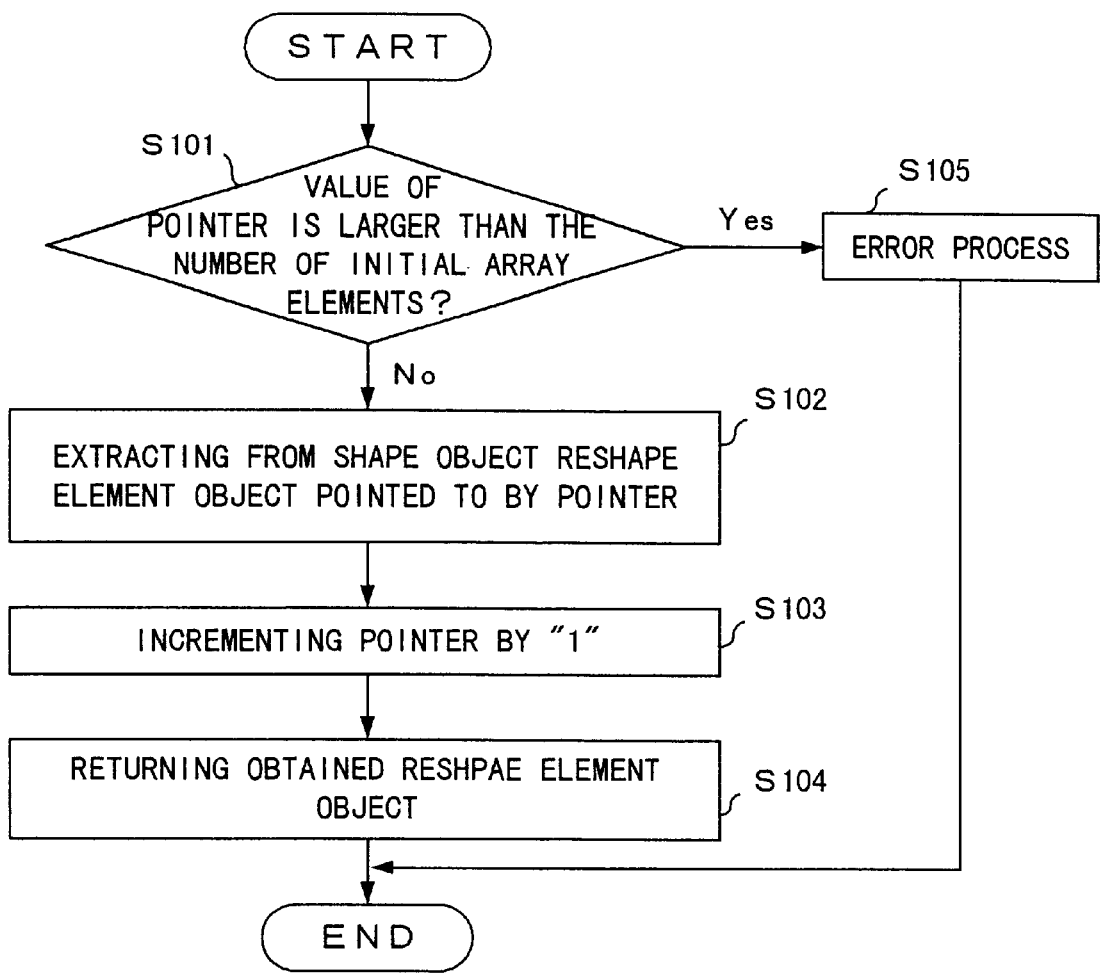
FIG. 17 is a flowchart showing a reshape element method.

FIG. 17 is a flowchart showing the process of the reshape element method possessed by the reshape algorithm management object. The reshape element method compares the value of a pointer with the number of initial array elements (step S101). If the value of the pointer is equal to or smaller than the number of initial array elements, the reshape element method extracts from the shape object the information of the reshape element object pointed to by the pointer (step S102). Then, the method increments the pointer by "1" (step S103), returns the extracted information (step S104), and terminates the process.

If the value of the pointer is larger than the number of initial array elements in step S101, the method performs an error process (step S105), and terminates the process.

FIG. 18 is a flowchart showing the process of the notification method possessed by the reshape algorithm management object. The notification method compares the value of the pointer with the number of initial array elements (step S111). If the value of the pointer is equal to or smaller than the number of initial array elements, the notification method returns "Yes" (step S112) and terminates the process. If the value of the pointer is larger than the number of initial array elements, the method returns "No" (step S113) and terminates the process.

Figure 19:
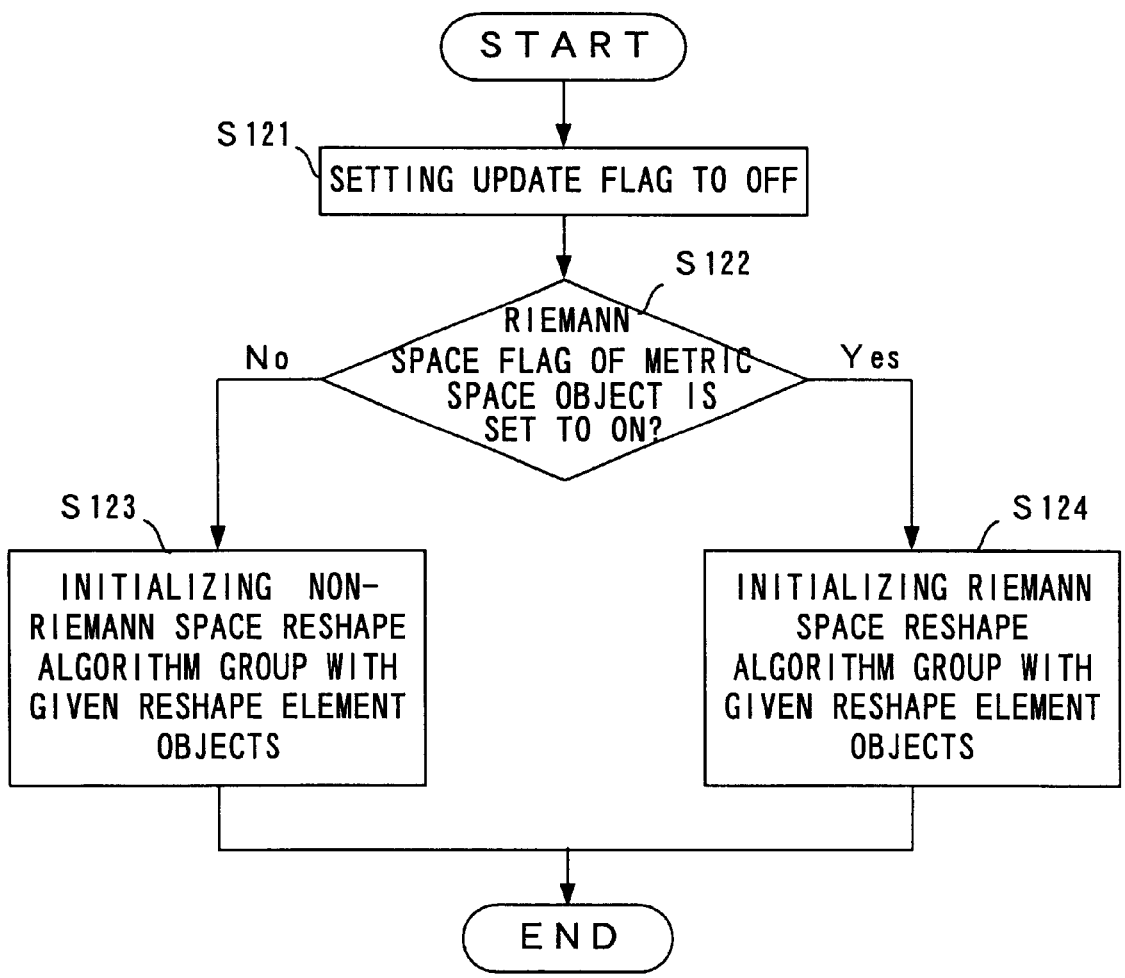
FIG. 19 is a flowchart showing a second initialization method.

FIG. 19 is a flowchart showing the process of the initialization method possessed by the reshape algorithm group object. The initialization method first sets an update flag to OFF (step S121), and checks whether or not the Riemann space flag of the metric space object is set to ON (step S122).

If the Riemann space flag is not set to ON, the initialization method initializes the non-Riemann space reshape algorithm group object with given reshape element objects (step S123) and terminates the process. If the Riemann space flag is set to ON, the method initializes the Riemann space reshape algorithm group object with the given reshape element objects (step S124) and terminates the process.

Figure 20:
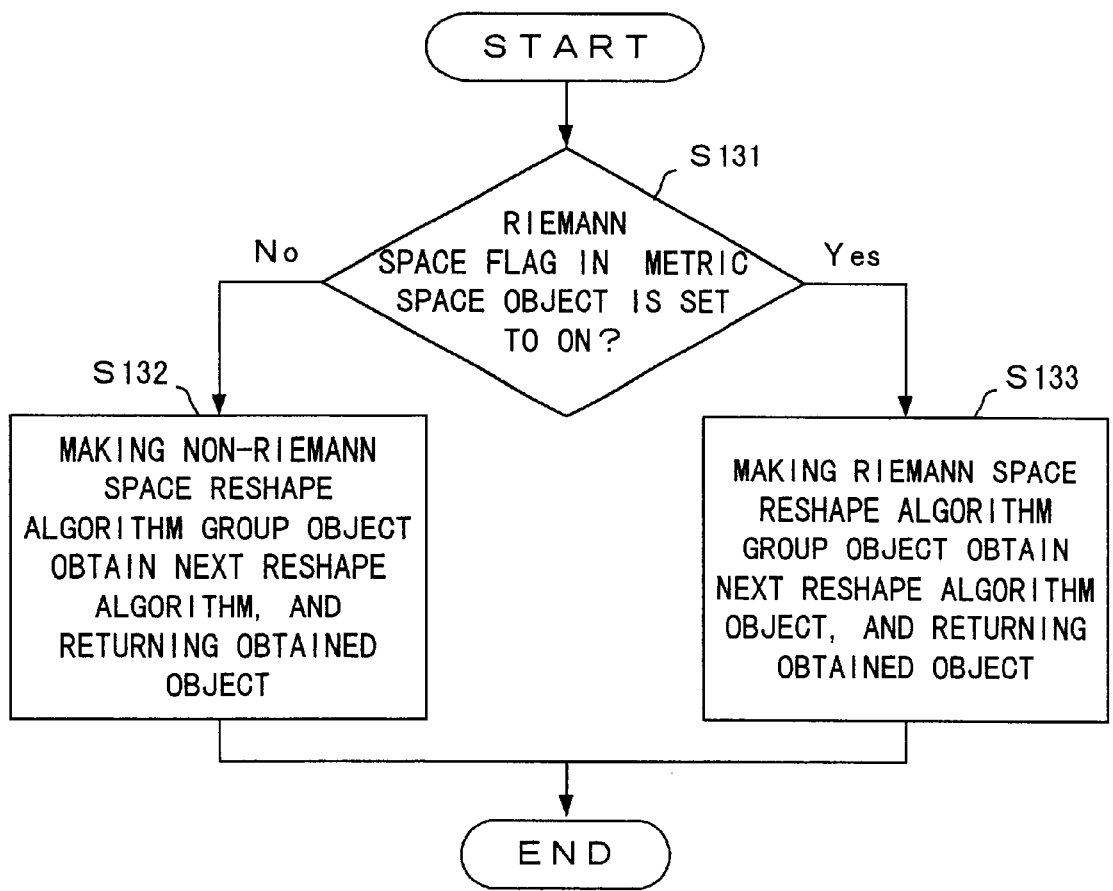
FIG. 20 is a flowchart showing a first reshape algorithm method.

FIG. 20 is a flowchart showing the process of the reshape algorithm method possessed by the reshape algorithm group object. The reshape algorithm method first checks whether or not the Riemann space flag of the metric space object is set to ON (step S131).

If the Riemann space flag is not set to ON, the reshape algorithm method requests the non-Riemann space reshape algorithm group object of the next reshape algorithm object, returns the obtained information (step S132), and terminates the process. If the Riemann space flag is set to ON, the method requests the Riemann space reshape algorithm group object of the next reshape algorithm object, returns the obtained information (step S133), and terminates the process.

Figure 21:
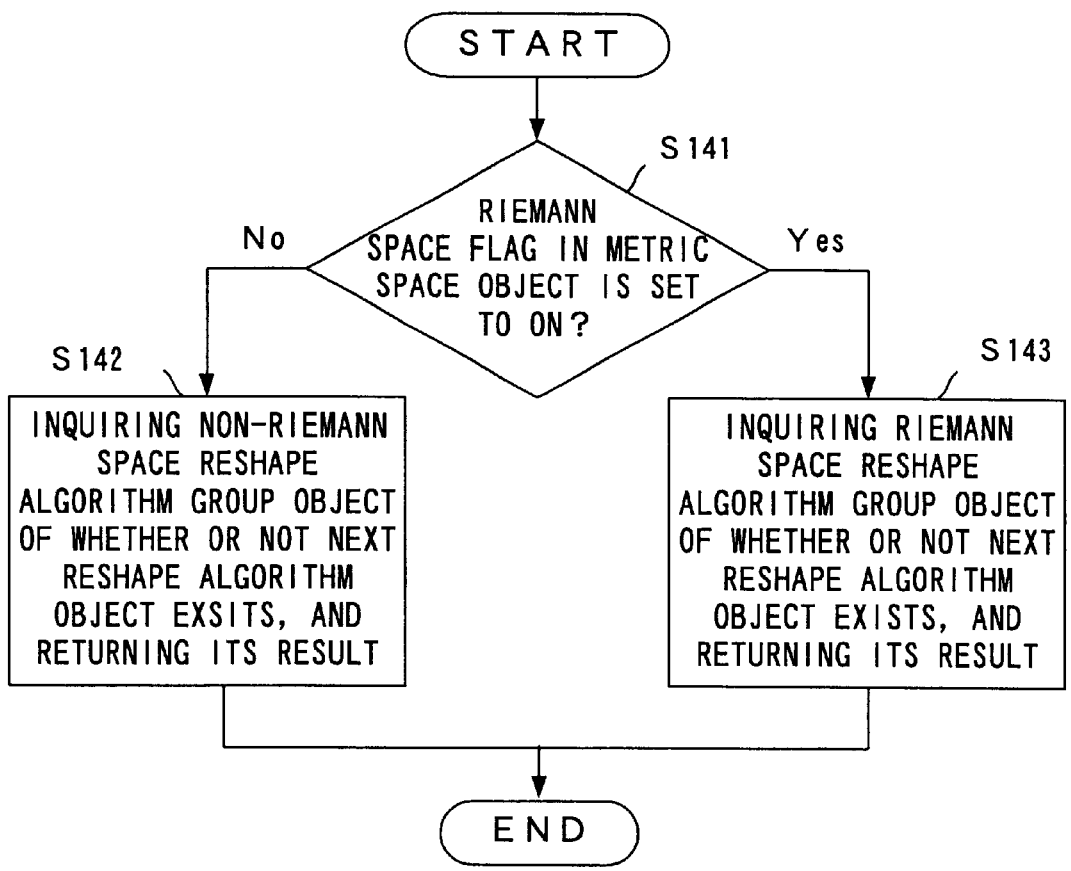
FIG. 21 is a flowchart showing a second notification method.

FIG. 21 is a flowchart showing the process of the notification method possessed by the reshape algorithm group object. The notification method first checks whether or not the Riemann space flag of the metric space object is set to ON (step S141).

If the Riemann space flag is not set to ON, the notification method inquires the non-Riemann space reshape algorithm group object of whether or not the next reshape algorithm object exists, returns the obtained result (step S142), and terminates the process. If the Riemann space flag is set to ON, the method inquires the Riemann space reshape algorithm group object of whether or not the next reshape algorithm object exists, returns the obtained result (step S143), and terminates the process.

Figure 22:
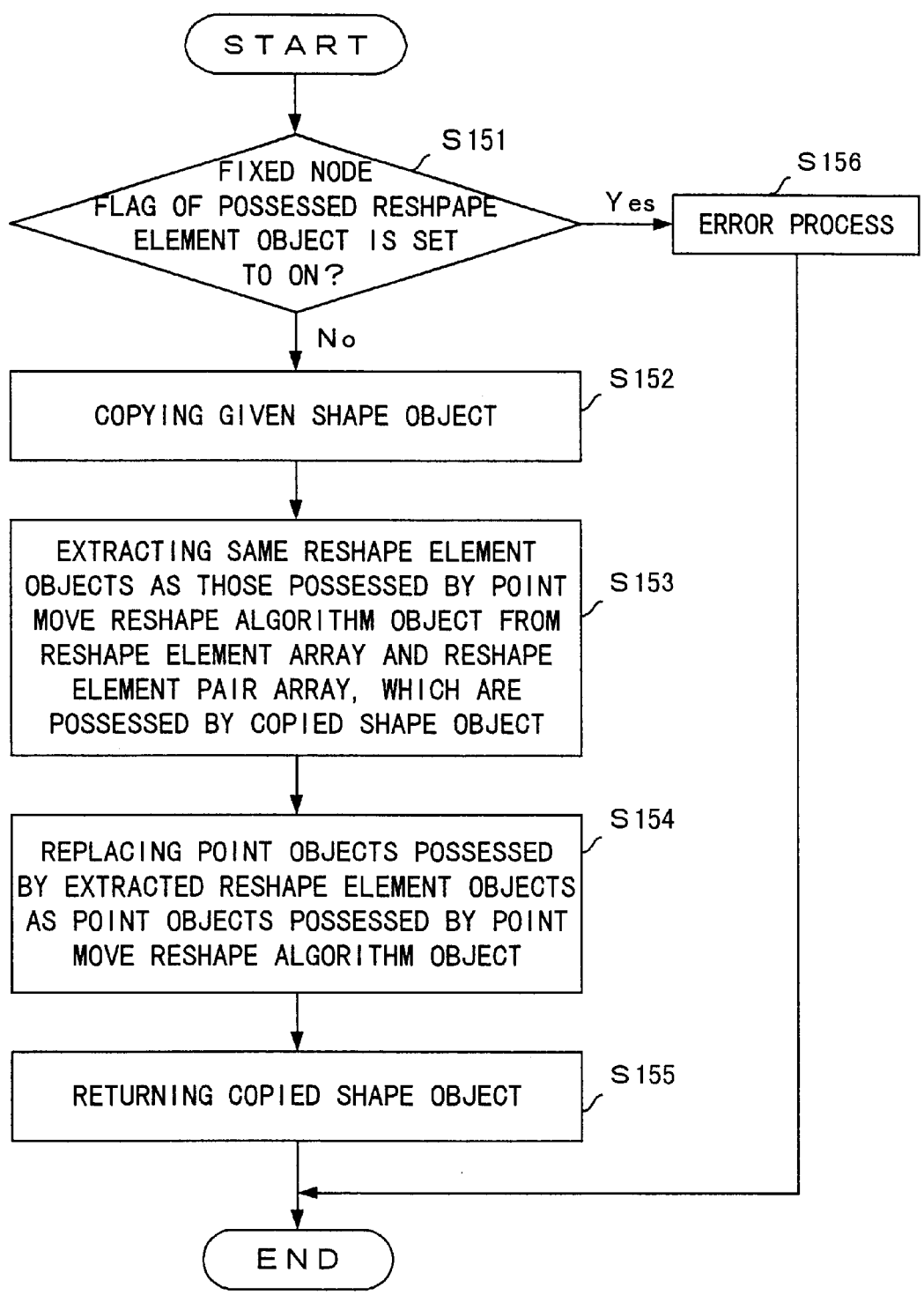
FIG. 22 is a flowchart showing a first reshape method.

FIG. 22 is a flowchart showing the process of the reshape method possessed by the point move reshape algorithm object. The reshape method first checks whether or not the fixed node flag of possessed reshape element object is set to ON (step S151).

If the fixed node flag is not set to ON, the reshape method copies a given shape object (step S152), and extracts the same reshape element objects as those possessed by the point move reshape algorithm object, from the reshape element and the reshape element pair arrays possessed by the copied shape object (step S153).

Next, the reshape method replaces the point objects possessed by the extracted reshape element objects with those possessed by the point move reshape algorithm object (step S154), returns the copied shape object (step S155), and terminates the process.

If the fixed node flag is set to ON in step S151, the method performs an error process (step S156) and terminates the process.

Figure 23:
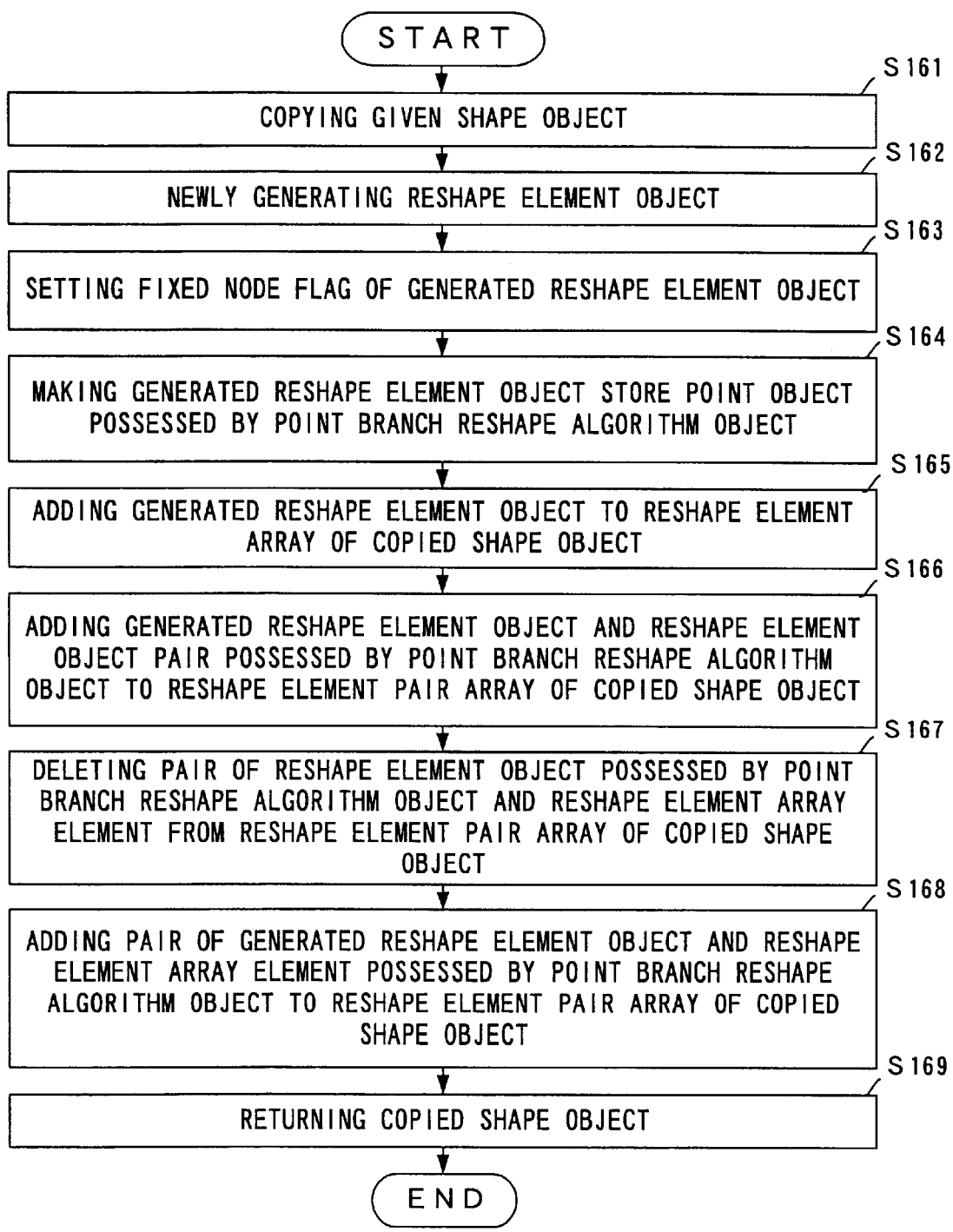
FIG. 23 is a flowchart showing a second reshape method.

FIG. 23 is a flowchart showing the process of the reshape method possessed by the point branch reshape algorithm object. The reshape method first copies a given shape object (step S161), and newly generates a reshape element object (step S162).

Next, the reshape method sets the fixed node flag of the generated reshape element object to OFF (step S163), and makes the reshape element object store the point object possessed by the point branch reshape algorithm object (step S164).

Next, the reshape method adds the generated reshape element object to the reshape element array of the copied shape object (step S165), and adds the pair of the generated reshape element object and the reshape element object possessed by the point branch reshape algorithm object to the reshape element pair array of the copied shape object (step S166).

Then, the method deletes from the reshape element pair array of the copied shape object the pair of the reshape element object and the element of the reshape element array, which are possessed by the point branch reshape algorithm object (step S167).

Then, the reshape method adds to the reshape element pair array of the copied shape object the pair of the generated reshape element object and the element of the reshape element array possessed by the point branch reshape algorithm object (step S168). The method returns the copied shape object (step S169), and terminates the process.

Figure 24:
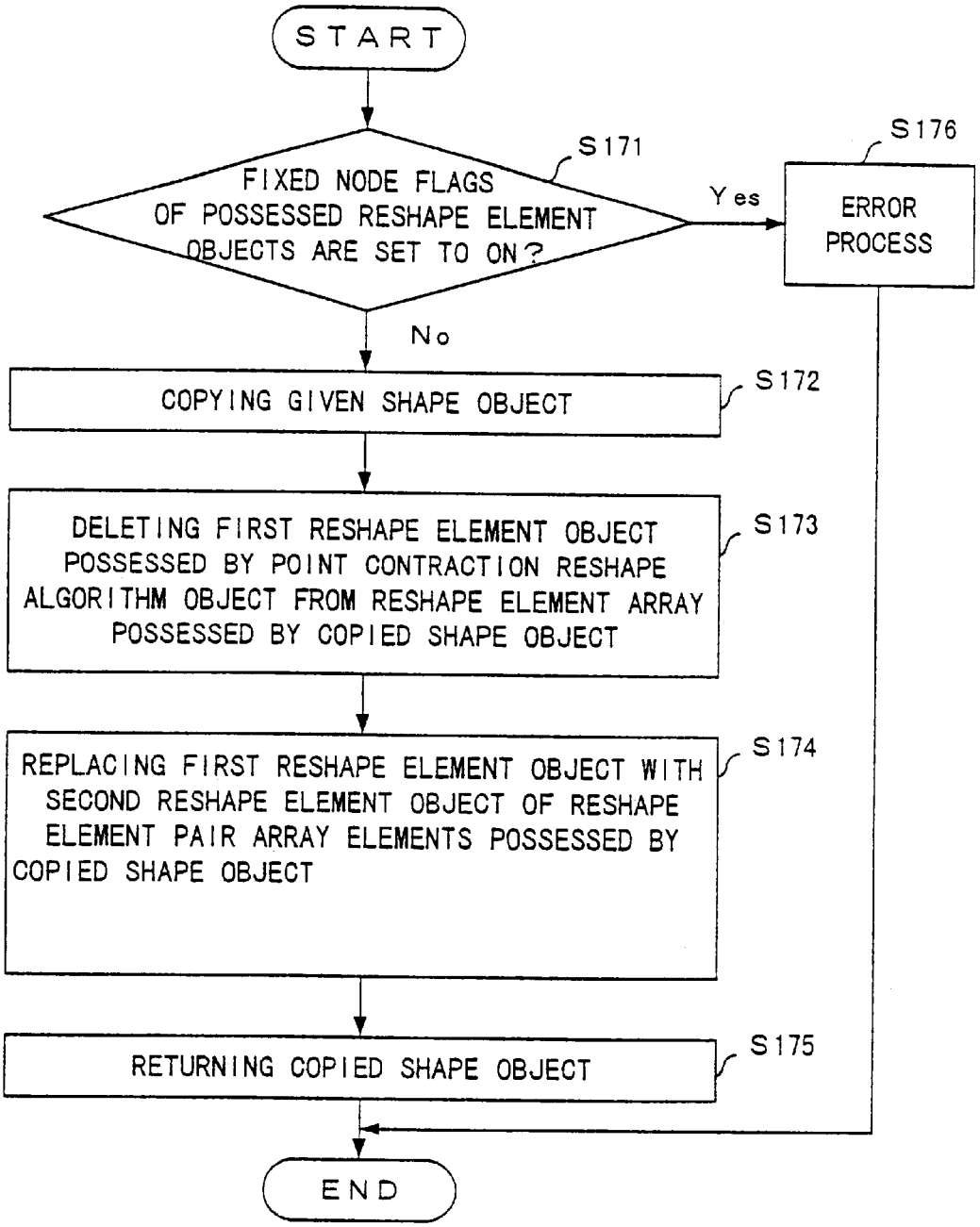
FIG. 24 is a flowchart showing a third reshape method.

FIG. 24 is a flowchart showing the process of the reshape method possessed by the point contraction reshape algorithm object. The reshape method first checks whether or not the fixed node flags of possessed reshape element objects are set to ON (step S171).

If the fixed node flags are not set to ON, the reshape method copies a given shape object (step S172), and deletes a first reshape element object possessed by the point contraction reshape algorithm object from the reshape element array possessed by the copied shape object (step S173).

Then, the method replaces an array element having the first reshape element object as a pair element with an element having a second reshape element object in the reshape element pair array possessed by the copied shape object (step S174). Then, the method returns the copied shape object (step S175), and terminates the process.

If the fixed node flag is set to ON in step S171, the reshape method performs an error process (step S176) and terminates the process.

Figure 25:
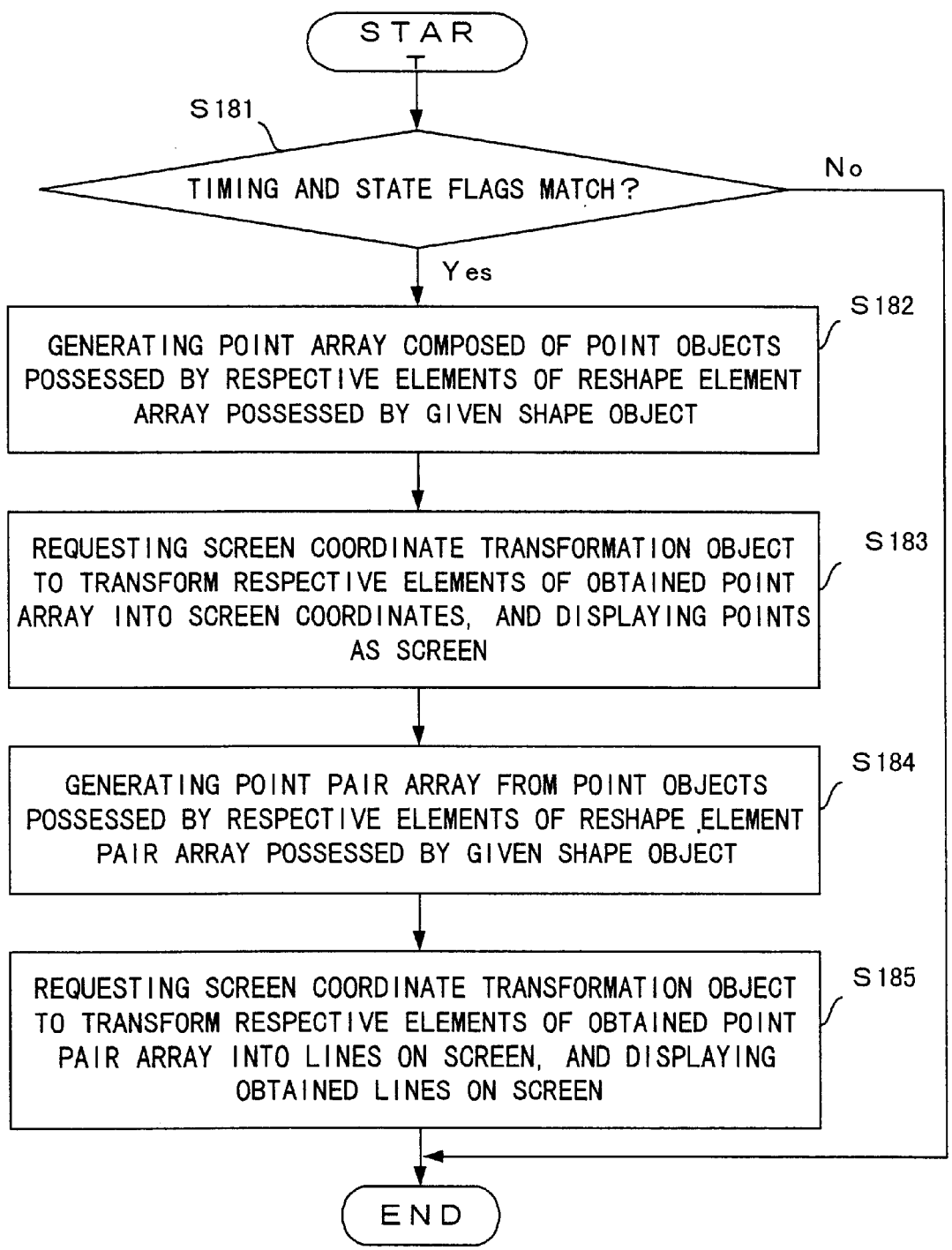
FIG. 25 is a flowchart showing a display method.

FIG. 25 is a flowchart showing the process of the display method possessed by the shape display object. The display method first checks whether or not the timing flag of the timing flag object and the state flag of the state flag object match (step S181).

If they match, the display method generates an array (point array) composed of the point objects possessed by the respective elements of the reshape element array possessed by a given shape objects (step S182). Then, the method requests the screen coordinate transformation object to transform the respective elements (point objects) of the obtained point array into screen coordinates, and displays the elements as the points on a screen (step S183).

Next, the display method extracts the point objects possessed by the two reshape element objects included in the respective elements of the reshape element pair array possessed by the given shape object, and generates an array of point object pairs (step S184).

Then, the method requests the screen coordinate transformation object to transform the respective elements (point object pairs) of the obtained point pair array into lines on the screen, displays the elements as the lines on the screen (step S185), and terminates the process.

If the two flags do not match in step S181, the display method terminates the process without displaying a search shape.

If a logic is "0" or "1", the status of the timing and the state flags respectively correspond to OFF or ON status. Additionally, if the logic is "0", the state flag represents the status where a search for one reshape element is terminated. If the logic is "1", the state flag represents the status where a search is made for one cycle of the respective reshape elements of a shape.

Accordingly, if the timing flag is set to the logic "0" when the start button is pressed, a search shape is displayed on a screen each time a search for one reshape element is terminated. If the timing flag is set to the logic "1" when the start button is pressed, the search shape is displayed on the screen each time the search is made for one cycle of the respective reshape elements.

Figure 26:
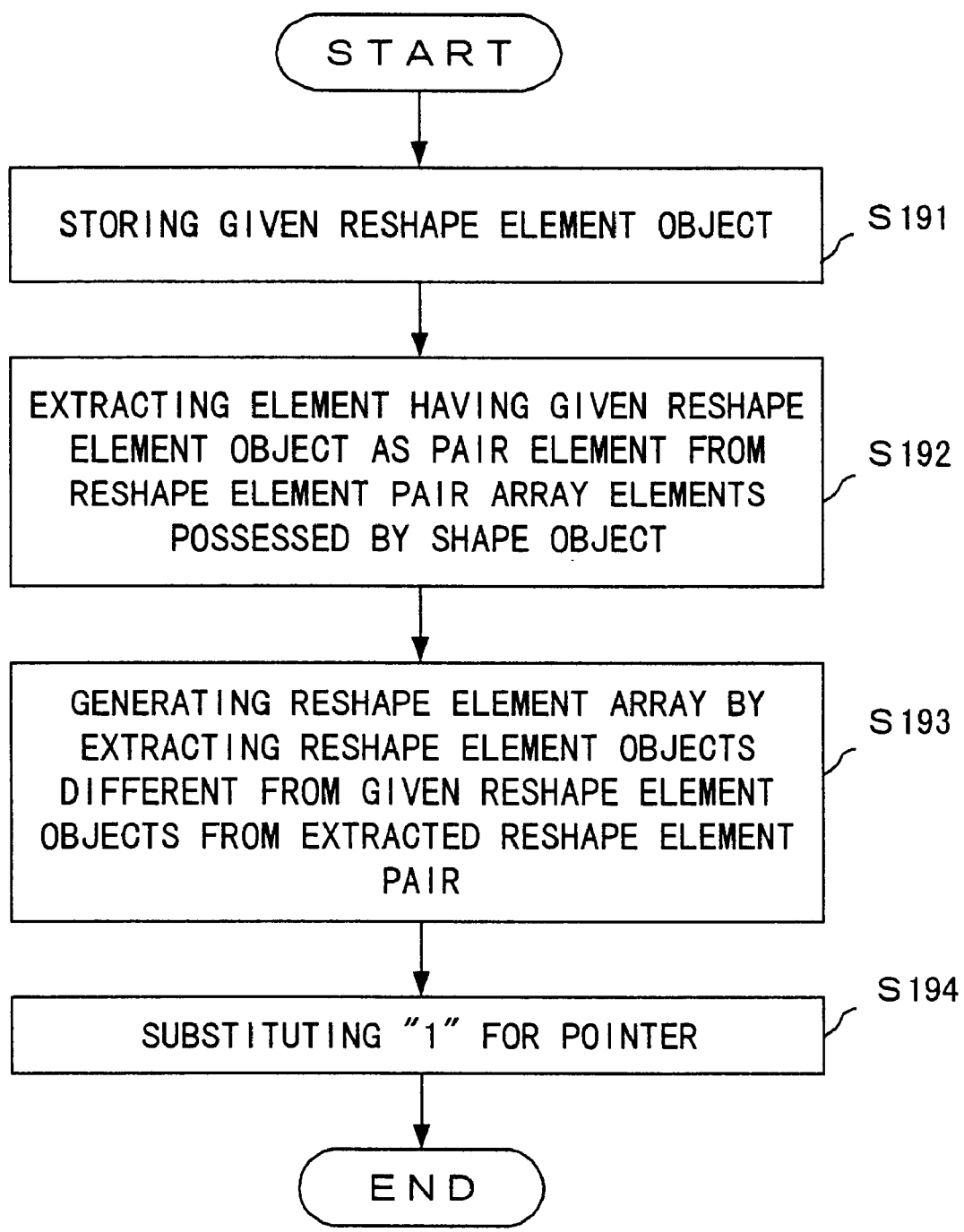
FIG. 26 is a flowchart showing a third initialization method.

FIG. 26 is a flowchart showing the process of the initialization method possessed by the point contraction reshape algorithm group object. The initialization method first stores a given reshape element object (step S191), and extracts the element having the given object as a pair element from the elements of the reshape element pair array possessed by a shape object (step S192).

Next, the method extracts the reshape element object different from the given reshape element object from the extracted reshape element object pair, generates a reshape element array, and stores the generated array (step S193). The method then substitutes "1" for a pointer (step S194), and terminates the process.

FIG. 27 is a flowchart showing the process of the reshape algorithm method possessed by the point contraction reshape algorithm group object. The reshape algorithm method compares the number of elements of an possessed reshape element array with the value of a pointer (step S201).

If the value of the pointer is equal to or smaller than the number of elements, the reshape algorithm method generates a point contraction reshape algorithm object (step S202), and makes the generated point contraction reshape algorithm object store as a first reshape element object the reshape element object possessed by the point contraction reshape algorithm group object (step S203).

Next, the method makes the generated point contraction reshape algorithm object store as a second reshape element object the reshape element object pointed to by the pointer in the reshape element array possessed by the point contraction reshape algorithm group object (step S204).

Then, the reshape algorithm method increments the pointer by "1" (step S205), returns the generated point contraction reshape algorithm object (step S206), and terminates the process. If the value of the pointer is larger than the number of elements in step S201, the method performs an error process (step S207) and terminates the process.

Figure 28:
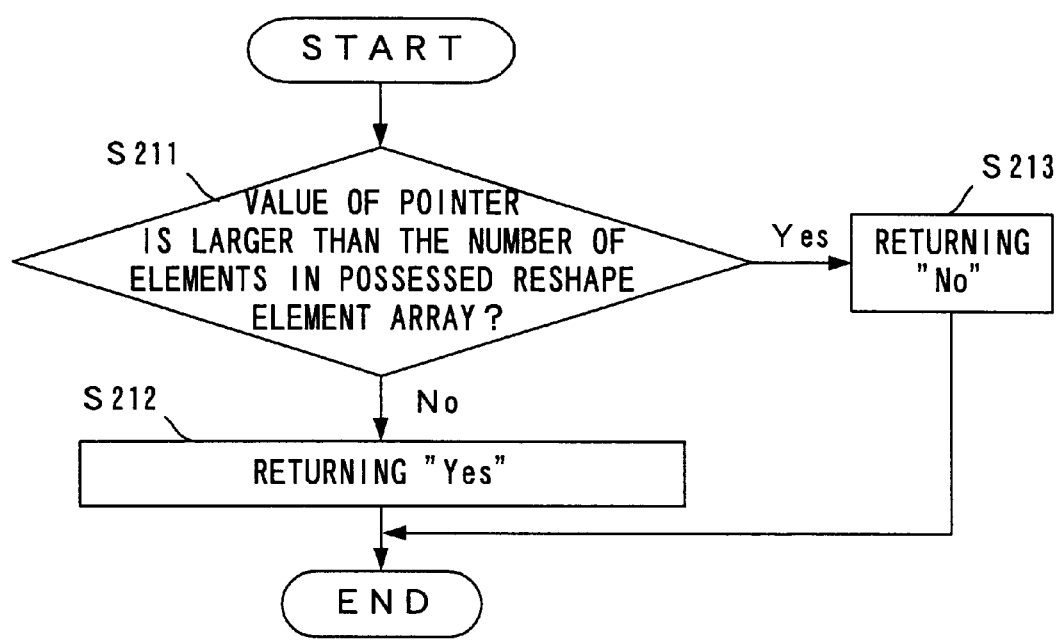
FIG. 28 is a flowchart showing a third notification method.

FIG. 28 is a flowchart showing the process of the notification method possessed by the point contraction reshape algorithm group object. The notification method compares the number of elements of a possessed reshape element array with the value of a pointer (step S211). If the value of the pointer is equal to or smaller than the number of elements, the method returns "Yes" (step S212) and terminates the process. If the value of the pointer is larger than the number of elements, the method returns "No" (step S213) and terminates the process.

Figure 29:
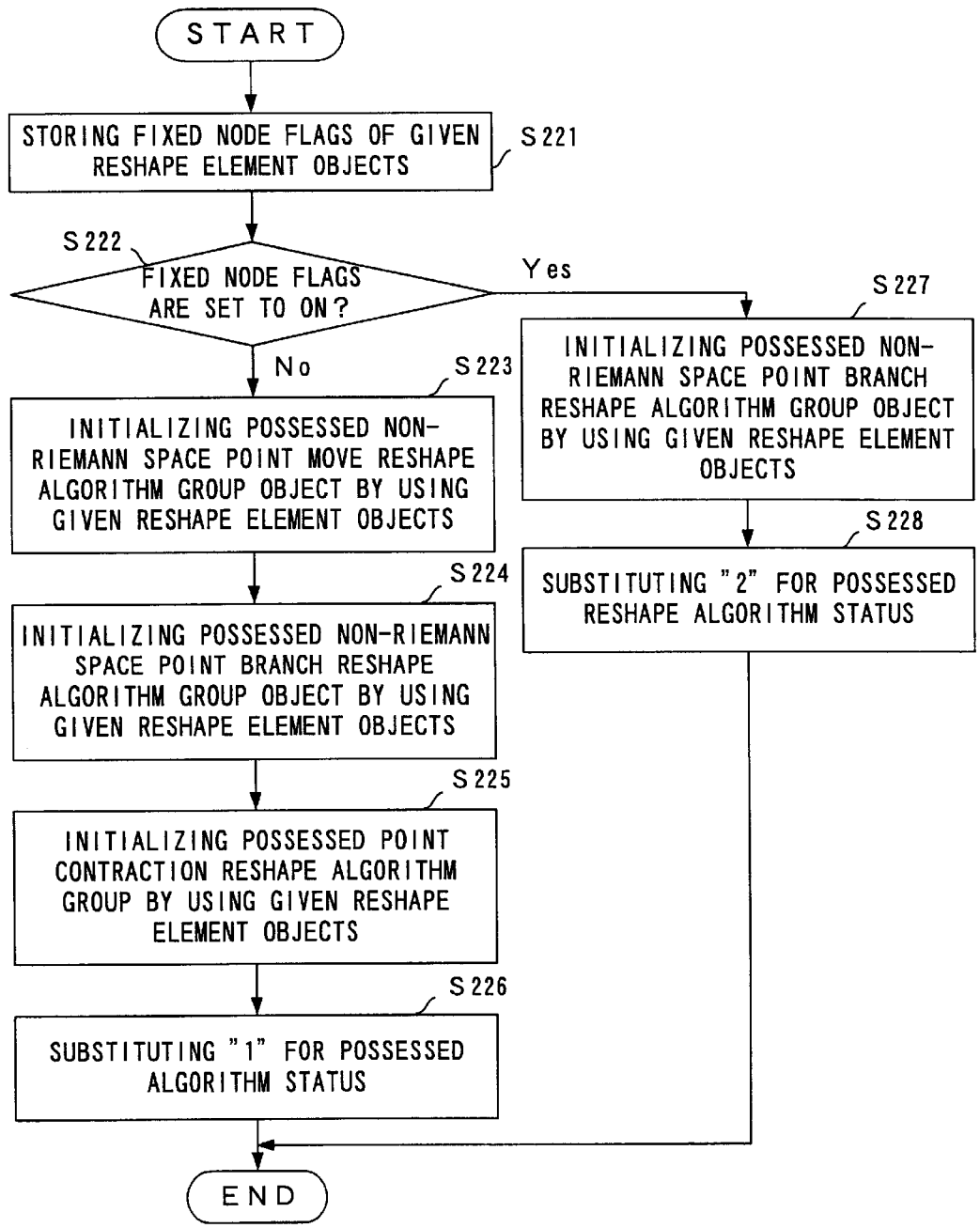
FIG. 29 is a flowchart showing a fourth initialization method.

FIG. 29 is a flowchart showing the process of the initialization method possessed by the non-Riemann space reshape algorithm group object. The initialization method first stores the fixed node flags of given reshape element objects (step S221), and checks whether or not the flags are set to ON (step S222).

If the fixed node flags are not set to ON, the initialization method initializes the possessed non-Riemann space point move reshape algorithm group object possessed by the non-Riemann space reshape algorithm group object by using the given reshape element objects (step S223), initializes the possessed non-Riemann space point branch reshape algorithm group object (step S224), and initializes the possessed point contraction reshape algorithm group object (step S225). Then, the initialization method substitutes "1" for the reshape algorithm status (step S226), and terminates the process.

If the fixed node flags are set to ON in step S222, the initialization method initializes the possessed non-Riemann space point branch reshape algorithm group object by using the given reshape element object (step S227), substitutes "2" for the reshape algorithm status (step S228), and terminates the process.

Figure 30:
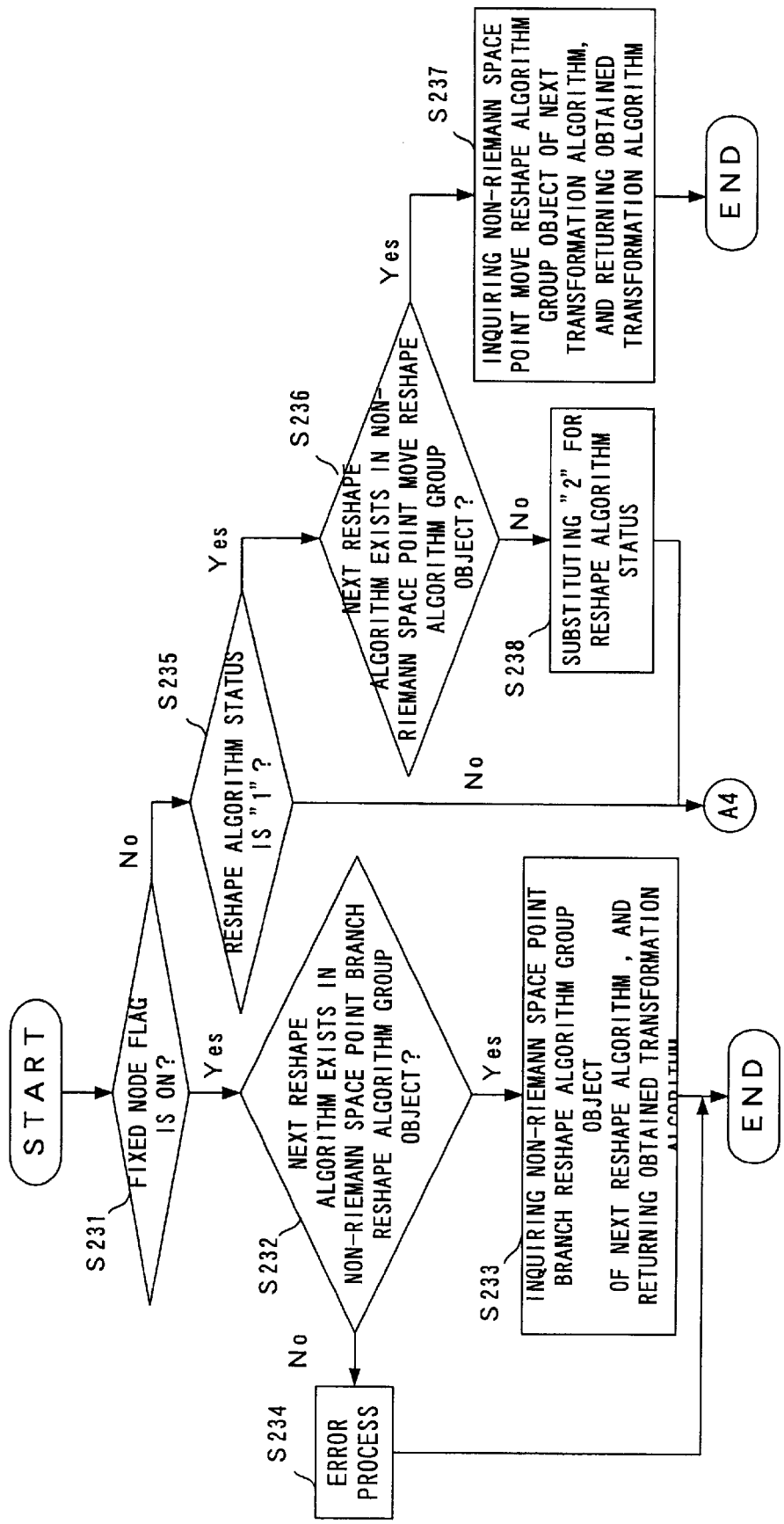
FIG. 30 is a flowchart showing a second reshape algorithm method (No. 1)
Figure 31:
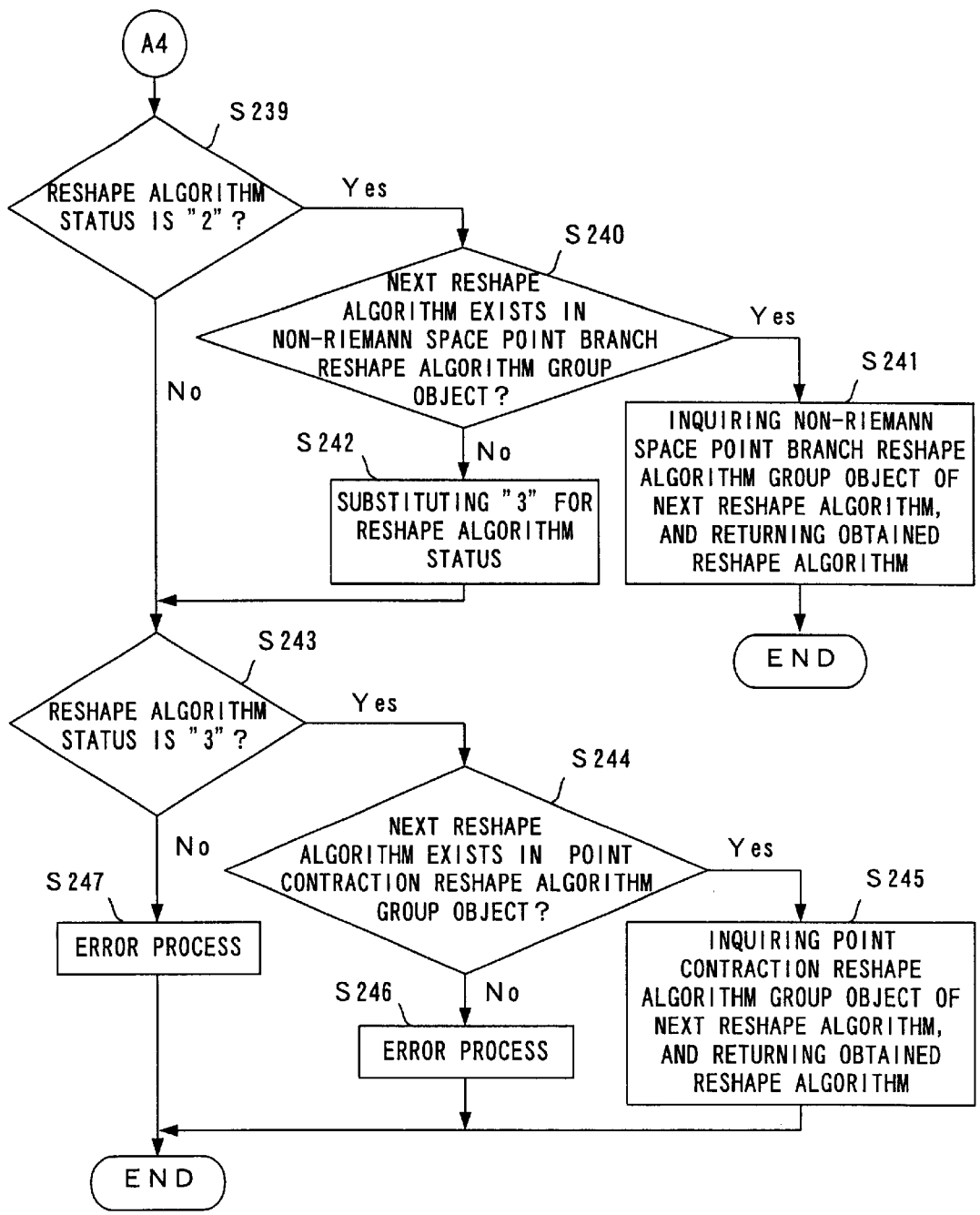
FIG. 31 is a flowchart showing the second reshape algorithm method (No. 2)

FIGS. 30 and 31 are flowcharts showing the process of the reshape algorithm method possessed by the non-Riemann space reshape algorithm group object. The reshape algorithm method first checks whether or not a fixed node flag is set to ON (step S231 of FIG. 30).

If the fixed node flag is set to ON, the reshape algorithm method inquires the non-Riemann space point branch reshape algorithm group object of whether or not the next reshape algorithm exists (step S232). If the next reshape algorithm exists, the method obtains the information of the reshape algorithm from the non-Riemann space point branch reshape algorithm group object, returns the obtained information (step S233), and terminates the process. If the next reshape algorithm does not exist, the method performs an error process (step S234), and terminates the process.

If the fixed node flag is not set to ON in step S231, the reshape algorithm method checks the reshape algorithm status (step S235). If its value is "1", the method inquires the non-Riemann space point move reshape algorithm group object of whether or not the next reshape algorithm exists (step S236). If the next reshape algorithm exists, the method obtains the information of the reshape algorithm from the non-Riemann space point move reshape algorithm group object, returns the obtained information (step S237), and terminates the process.

If the next reshape algorithm does not exist, the method substitutes "2" for the reshape algorithm status (step S238), and performs the process shown in FIG. 31. If the value of the reshape algorithm status is not "1" in step S235, the method continues to perform the process shown in FIG. 31.

Then, the reshape algorithm method checks the reshape algorithm status (step S239 of FIG. 31). If its value is "2", the method inquires the non-Riemann space point branch reshape algorithm group object of whether or not the next reshape algorithm exists (step S240). If the next reshape algorithm exists, the method obtains the information of the reshape algorithm from the non-Riemann space point branch reshape algorithm group object, returns the obtained information (step S241), and terminates the process.

If the next reshape algorithm does not exist, the reshape algorithm method substitutes "3" for the reshape algorithm status (step S242), and performs the operations in and after step S243. If the value of the reshape algorithm status is not "2" in step S239, the method continues to perform the operations in and after step S243.

The reshape algorithm method then checks the reshape algorithm status (step S243). If its value is "3", the method inquires the point contraction reshape algorithm group object of whether or not the next reshape algorithm exists (step S244). If the next reshape algorithm exists, the method obtains the information of the reshape algorithm from the point contraction reshape algorithm group object, returns the obtained information (step S245), and terminates the process.

If the next reshape algorithm does not exist, the method performs an error process (step S246) and terminates the process. If the value of the reshape algorithm status is not "3" in step S243, the method performs an error process (step S247) and terminates the process.

FIG. 32 is a flowchart showing the process of the notification method possessed by the non-Riemann space reshape algorithm group object. The notification method first checks whether or not a fixed node flag is set to ON (step S251).

If the fixed node flag is set to ON, the notification method inquires the non-Riemann space point branch reshape algorithm group object of whether or not the next reshape algorithm exists. The method then returns its result (step S252), and terminates the process.

If the fixed node flag is not set to ON, the notification method then checks the reshape algorithm status (step S253). If its value is "3", the method inquires the point contraction reshape algorithm group object of whether or not the next reshape algorithm exists. The method then returns its result (step S254), and terminates the process. If the value of the reshape algorithm status is not "3", the method returns "Yes" (step S255) and terminates the process.

Figure 33:
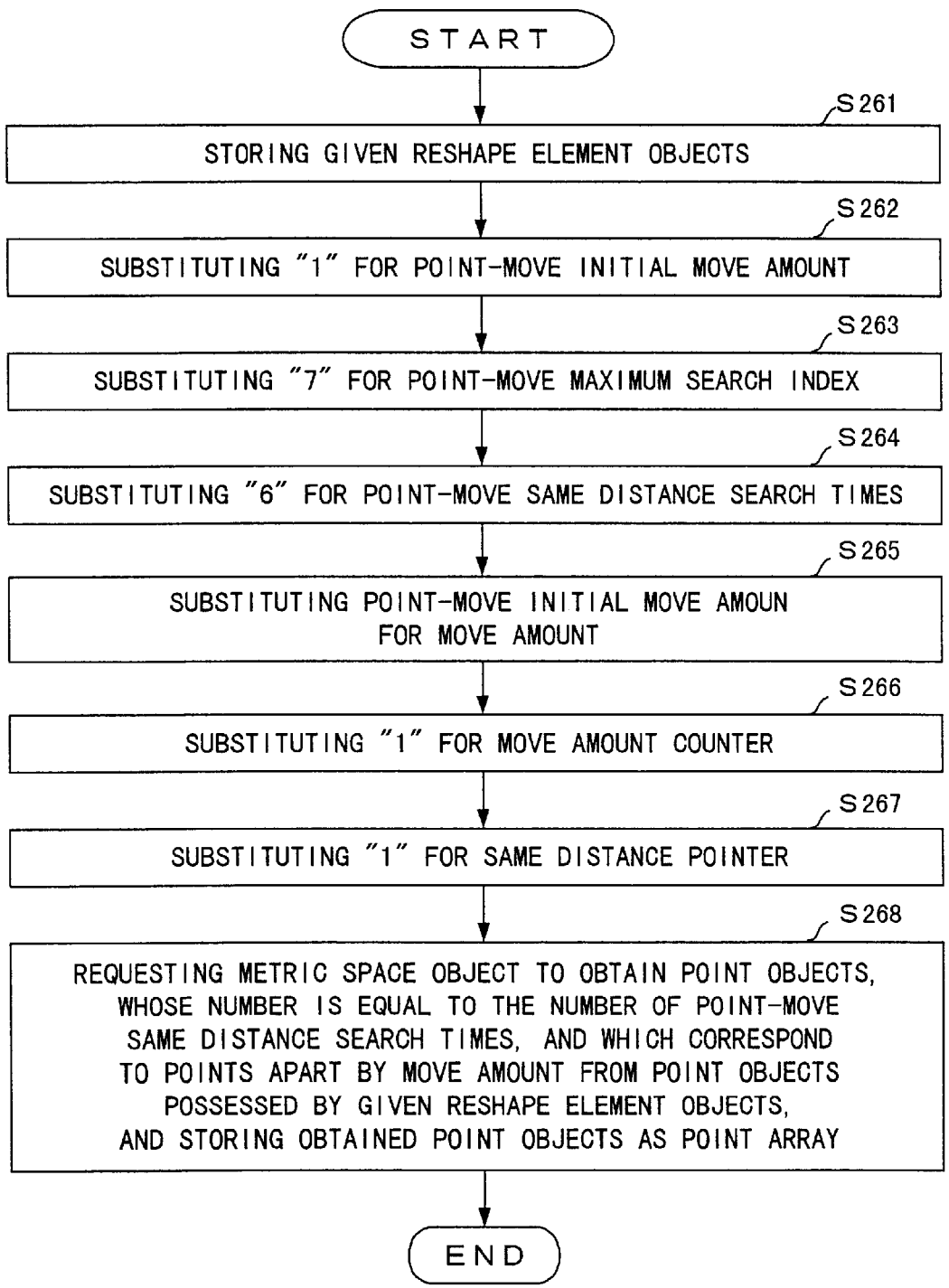
FIG. 33 is a flowchart showing a fifth initialization method.

FIG. 33 is a flowchart showing the process of the initialization method possessed by the non-Riemann space point move reshape algorithm group object. The initialization method first stores given reshape element objects (step S261).

Next, the method substitutes "1" for a point-move initial move amount (step S262), substitutes "7" for a point move maximum search index (step S263), and substitutes "6" for the number of point move same distance search times (step S264). Then, the initialization method substitutes the point-move initial move amount for the move amount (step S265), and substitutes "1" for a move amount counter (step S266), and substitutes "1" for a same distance pointer (step S267).

Then, the method requests the metric space object to obtain the point objects, whose number is equal to the number of point move same distance search times, and which correspond to the points apart by the move amount from the point objects possessed by the given reshape element objects, and stores the obtained point objects as a point array (step S268), and terminates the process.

Figure 34:
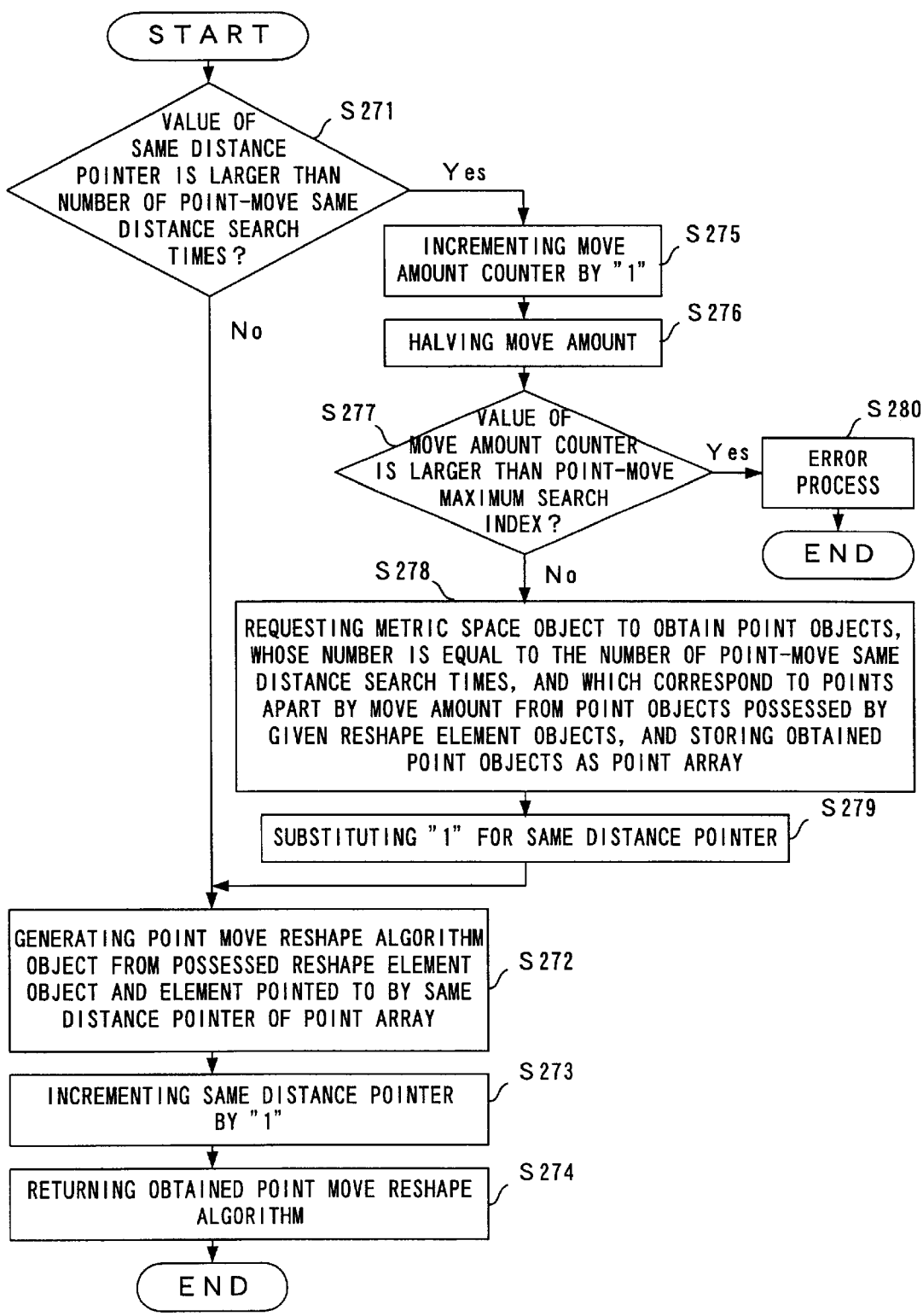
FIG. 34 is a flowchart showing a point move reshape algorithm method.

FIG. 34 is a flowchart showing the process of the point move reshape algorithm method possessed by the non-Riemann space point move reshape algorithm group object. The point move reshape algorithm method first compares the value of a same distance pointer with the number of point move same distance search times (step S271).

If the value of the same distance pointer is equal to or smaller than the number of point move same distance search times, the point move reshape algorithm method generates a point move reshape algorithm object from the reshape element object possessed by the group objects and the element (point object) pointed to by the same distance pointer in the point array (step S272). The method then increments the same distance pointer by "1" (step S273), returns the obtained point move reshape algorithm object (step S274), and terminates the process.

If the value of the same distance pointer is larger than the number of same distance search times, the method increments the move amount counter by "1" (step S275), halves the move amount (step S276), and compares the value of the move amount counter with a point move maximum search index (step S277).

If the value of the move amount counter is equal to or smaller than the maximum search index, the point move reshape algorithm method performs an operation similar to that in step S268 of FIG. 33 (step S278), substitutes "1" for the same distance pointer (step S279), and performs the operations in and after step S272. If the value of the move amount counter is larger than the maximum search index, the method performs an error process (step S280), and terminates the process.

Figure 35:
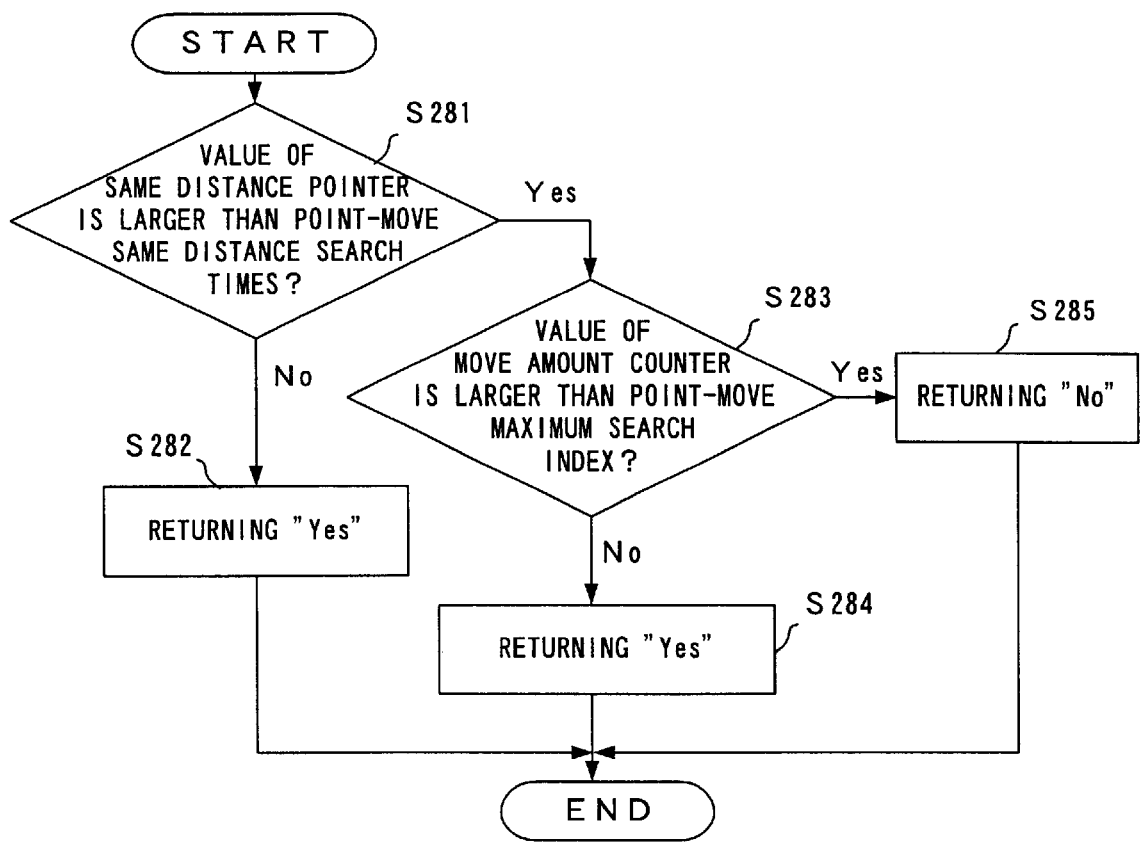
FIG. 35 is a flowchart showing a fifth notification method.

FIG. 35 is a flowchart showing the process of the notification method possessed by the non-Riemann space point move reshape algorithm group object. The notification method first compares the value of a same distance pointer with the number of point-move same distance search times (step S281). If the value of the same distance pointer is equal to or smaller than the umber of point-move same distance search times, the notification method returns "Yes" (step S282) and terminates the process.

If the value of the same distance pointer is larger than the number of point-move same distance search times, the method compares the value of a move amount counter with a point-move maximum search index (step S283). If the value of the move amount counter is equal to or smaller than the maximum search index, the method returns "Yes" (step S284) and terminates the process. If the value of the move amount counter is larger than the maximum search index, the method returns "No" (step S285) and terminates the process.

FIG. 36 is a flowchart showing the process of the initialization method possessed by the non-Riemann space point branch reshape algorithm group object. The initialization method first stores given reshape element objects (step S291).

Then, the initialization method substitutes "1" for a point-branch initial move amount (step S292), substitutes "6" for the point-branch same distance search times (step S293), substitutes "7" for a point-branch maximum search index (step S294), and substitutes "6" for the number of point-branch same distance search times (step S294). The method then substitutes the point-branch initial move amount for the move amount (step S295), substitutes "1" for the move amount counter (step S296), and substitutes "1" for the same distance pointer (step S297).

Next, the initialization method requests the metric space object to obtain the point objects, the number of which is equal to the number of point-branch same distance search times, corresponding to the points apart by the move amount from the point objects possessed by the given reshape element object, and stores the obtained point objects as a point array (step S298).

The initialization method then extracts the element having each of the given reshape element objects as a pair element from the reshape element pair array possessed by a shape object, generates the reshape element object being the other element of each extracted pair, and generates a reshape element array (step S299). The reshape element array is equivalent to an array of nodes connected to the nodes corresponding to the given reshape element objects.

Next, the initialization method generates a set object representing the set composed of the elements of the obtained reshape element array, enumerates all of the subsets in the set, and stores the enumerated subsets an array of subset objects (a subset array) (step S300). The method then terminates the process.

Figure 37:
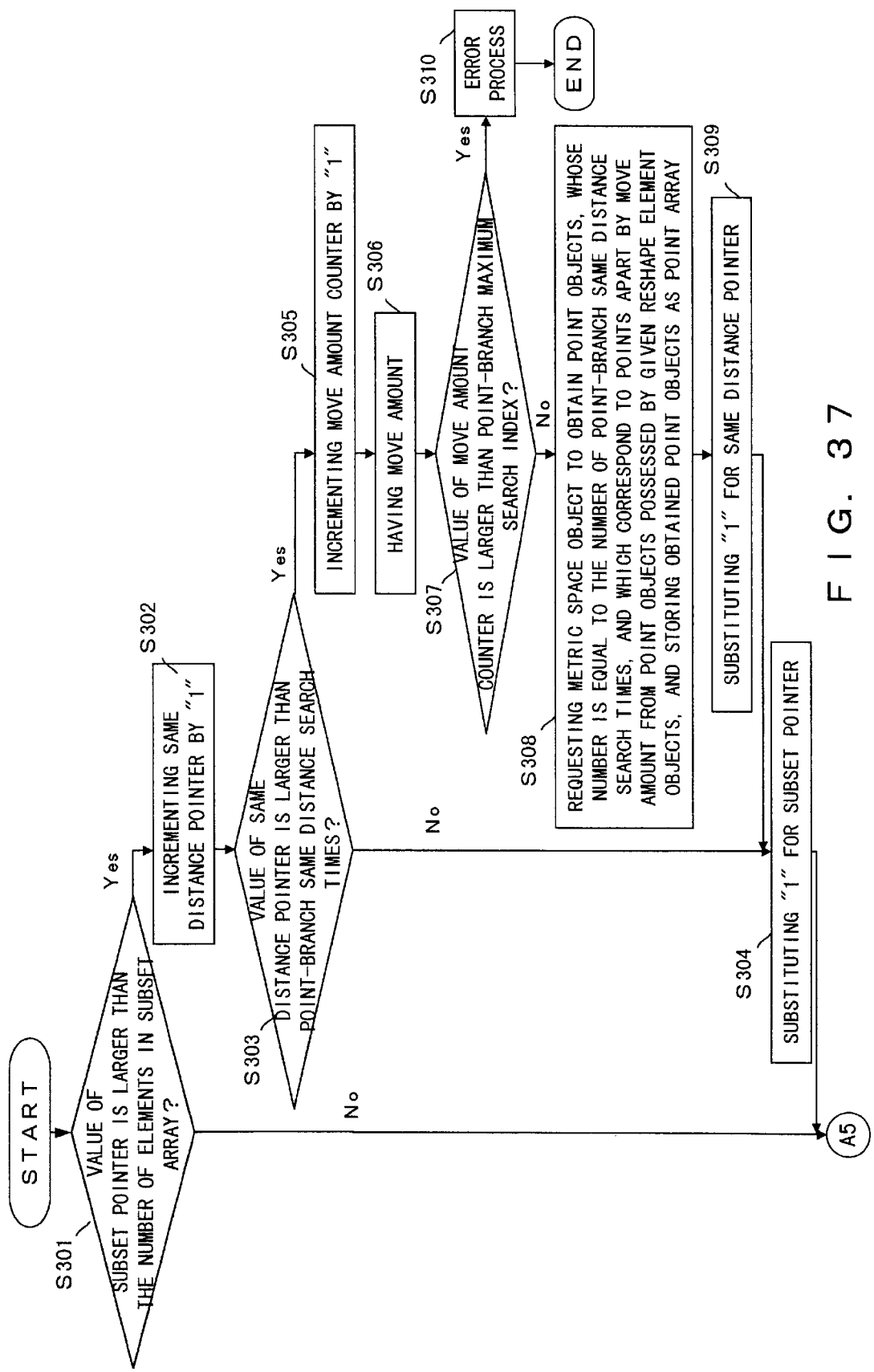
FIG. 37 is a flowchart showing a point branch reshape algorithm method (No. 1)

FIGS. 38 and 39 are flowcharts showing the process of the point-branch reshape algorithm method possessed by the non-Riemann space point-branch reshape algorithm group object. The point-branch reshape algorithm method compares the value of a subset pointer with the number of elements of a subset array (step S301 of FIG. 37). If the value of the subset pointer is equal to or smaller than the number of elements, the method performs the process shown in FIG. 38.

If the value of the subset pointer is larger than the number of elements, the method increments a same distance pointer by "1" (step S302), and compares the value of the same distance pointer with the number of point-branch same distance search times (step S303).

If the value of the same distance pointer is equal to or smaller than the number of point-branch same distance search times, the method substitutes "1" for the subset pointer (step S304) and performs the process shown in FIG. 38. If the value of the same distance pointer is larger than the number of same distance search times, the method increments the move amount counter by "1" (step S305), halves the move amount (step S306), and compares the value of the move amount counter with a point-branch maximum search index (step S307).

If the value of the move amount counter is equal to or smaller than the maximum search index, the method performs an operation similar to that in step S298 of FIG. 36 (step S308), substitutes "1" for the same distance pointer (step S309), and performs the operations inland after step S304. If the value of the move amount counter is larger than the maximum search index, the method performs an error process (step S310) and terminates the process.

Next, the point branch reshape algorithm method generates a point branch reshape algorithm object (step S311 of FIG. 38), and makes the generated point branch reshape algorithm object store given reshape element objects (step S312). The method then generates a reshape element array from the element (subset object) pointed to by the subset pointer in the subset array, and makes the generated point branch reshape algorithm object store the reshape element array (step S313).

Next, the point branch reshape algorithm method extracts the element (point object) pointed to by the same distance pointer in the point array, and makes the generated point branch reshape algorithm object store the extracted element (step S314). The method then increments the subset pointer by "1" (step S315), returns the generated point branch reshape algorithm object (step S316), and terminates the process.

FIG. 39 is a flowchart showing the process of the notification method possessed by the non-Riemann space point branch reshape algorithm group object. The notification method first compares the value of a subset pointer with the number of elements in a subset array (step S321). If the value of the subset pointer is equal to or smaller than the number of elements, the notification method returns "Yes" (step S322) and terminates the process.

If the value of the subset pointer is larger than the number of elements, the method compares the value of a same distance pointer with the number of point-branch same distance search times (step S323). If the value of the same distance pointer is smaller than the number of point-branch same distance search times, the notification method returns "Yes" (step S324) and terminates the process.

If the value of the same distance pointer is equal to or larger than the number of point-branch same distance search times, the notification method compares the value of the move amount counter with a point-branch maximum search index (step S325). If the value of the move amount counter is smaller than the maximum search index, the notification method returns "Yes" (step S326) and terminates the process. If the value of the move amount counter is equal to or larger than the maximum search index, the method returns "No" (step S327) and terminates the process.

FIG. 40 is a flowchart showing the process of the initialization method possessed by the Riemann space reshape algorithm group object. The initialization method stores the fixed node flags of given reshape element objects (step S331), initializes the Riemann space point move/branch reshape algorithm group object based on the given reshape element objects (step S332), and initializes the point contraction reshape algorithm group object (step S333). The method substitutes "1" for the reshape algorithm status (step S334), and terminates the process.

Figure 42:
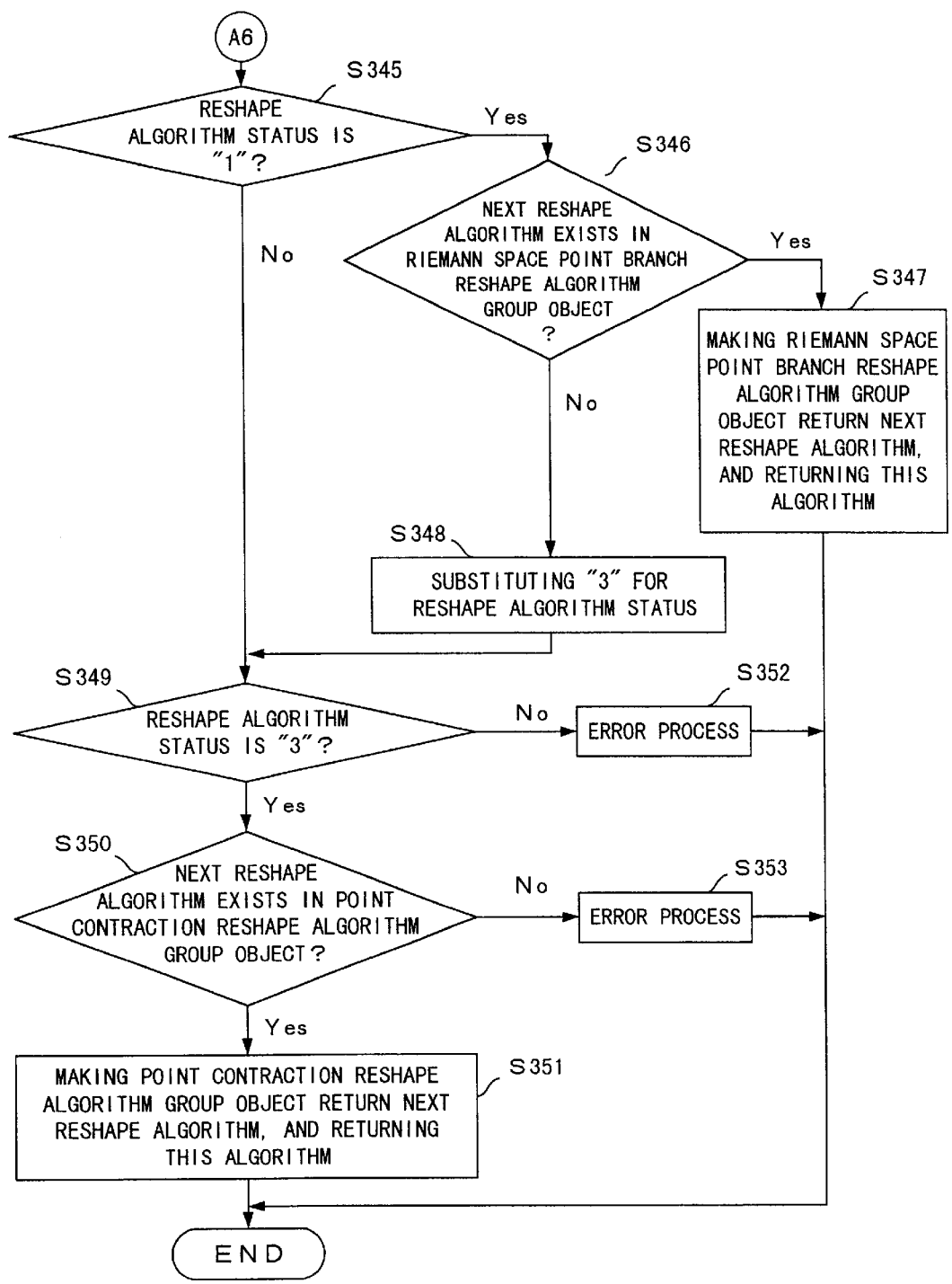
FIG. 42 is a flowchart showing the third reshape algorithm method (No. 2)

FIGS. 41 and 42 are flowcharts showing the process of the reshape algorithm method possessed by the Riemann space reshape algorithm group object. The reshape algorithm method first checks whether or not a fixed node flag is set to ON (step S341 of FIG. 41).

If the fixed flag node is set to ON, the reshape algorithm method inquires the Riemann space point move/branch reshape algorithm group object of whether or not the next reshape algorithm exists (step S342). If the next reshape algorithm exists, the method obtains the information of the reshape algorithm from the Riemann space point move/branch reshape algorithm group object, returns the obtained information (step S343), and terminates the process. If the next reshape algorithm does not exist, the method performs an error process (step S344) and terminates the process.

If the fixed node flag is not set to ON in step S341, the reshape algorithm method checks the reshape algorithm status (step S345 of FIG. 42). If its value is "1", the method inquires the Riemann space point move/branch reshape algorithm group object of whether or not the next reshape algorithm exists (step S346). If the next reshape algorithm exists, the method obtains the information of the reshape algorithm from the Riemann space point move/branch reshape algorithm group object, returns the obtained information (step S347), and terminates the process.

If the next reshape algorithm does not exist, the method substitutes "3" for the reshape algorithm status (step S348), and performs the operations in and after step S349. If the value of the reshape algorithm status is not "1" in step S345, the method performs the operations in and after step S349.

Next, the reshape algorithm method checks the reshape algorithm status (step S349). If its value is "3", the method inquires the point contraction reshape algorithm group object of whether or not the next reshape algorithm exists (step S350). If the next reshape algorithm exists, the method obtains the information of the reshape algorithm, returns the obtained information (step S351), and terminates the process.

If the value of the reshape algorithm status is not "3" in step S349, the reshape algorithm method performs an error process (step S352) and terminates the process. If the next reshape algorithm does not exist in step S3350, the method performs an error process (step S353) and terminates the process.

Figure 43:
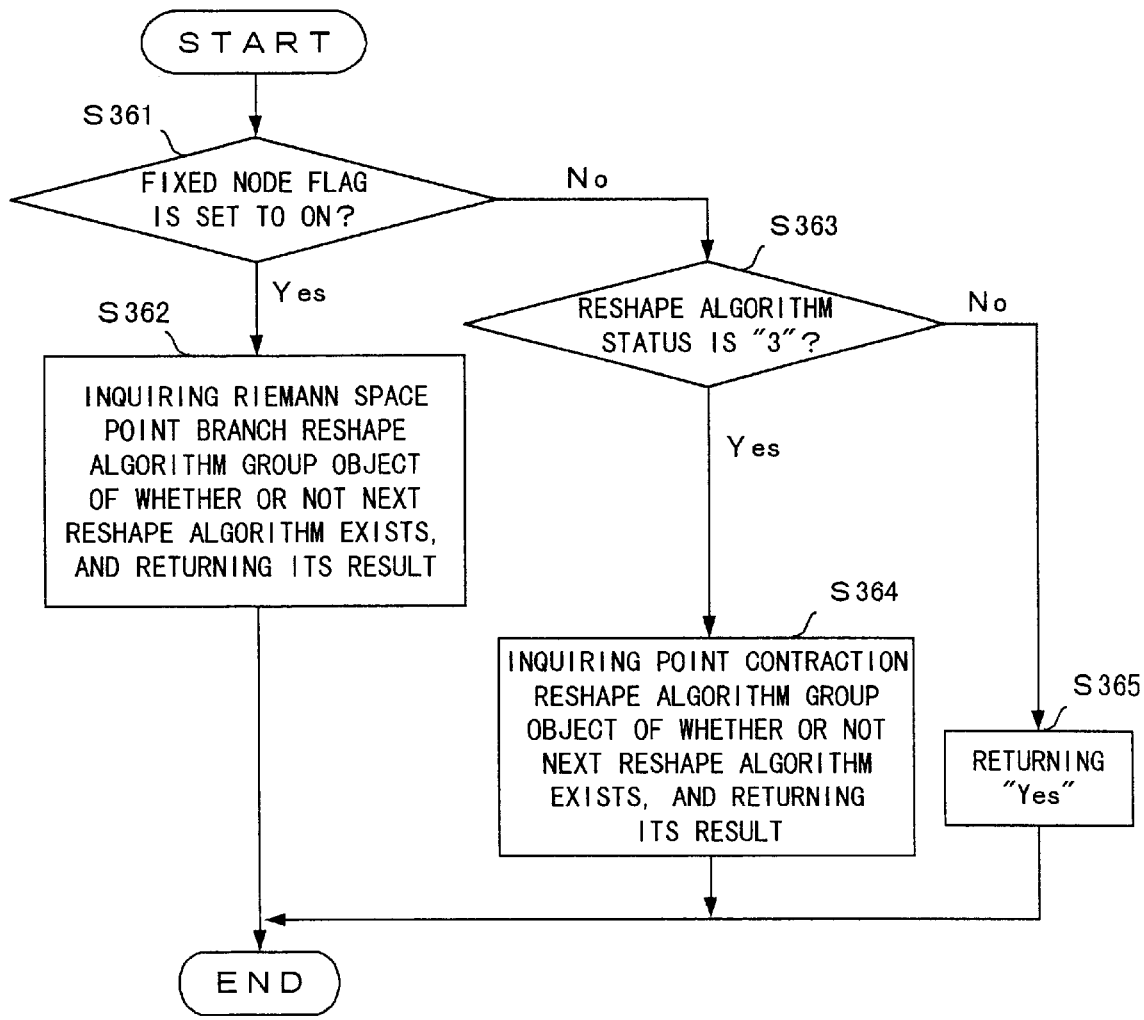
FIG. 43 is a flowchart showing a seventh notification method.

FIG. 43 is a flowchart showing the process of the notification method possessed by the Riemann space reshape algorithm group object. The notification method first checks whether or not a fixed node flag is set to ON (step S361).

If the fixed node flag is set to ON, the notification method inquires the Riemann space point move/branch reshape algorithm group object of whether or not the next reshape algorithm exists, returns its result (step S362), and terminates the process.

If the fixed node flag is not set to ON, the notification method checks the reshape algorithm status (step S363). If its value is "3", the method inquires the point contraction reshape algorithm group object of whether or not the next reshape algorithm exists, return's its result (step S364), and terminates the process. If the value of the reshape algorithm status is not "3", the method returns "Yes" (step S365) and terminates the process.

Figure 44:
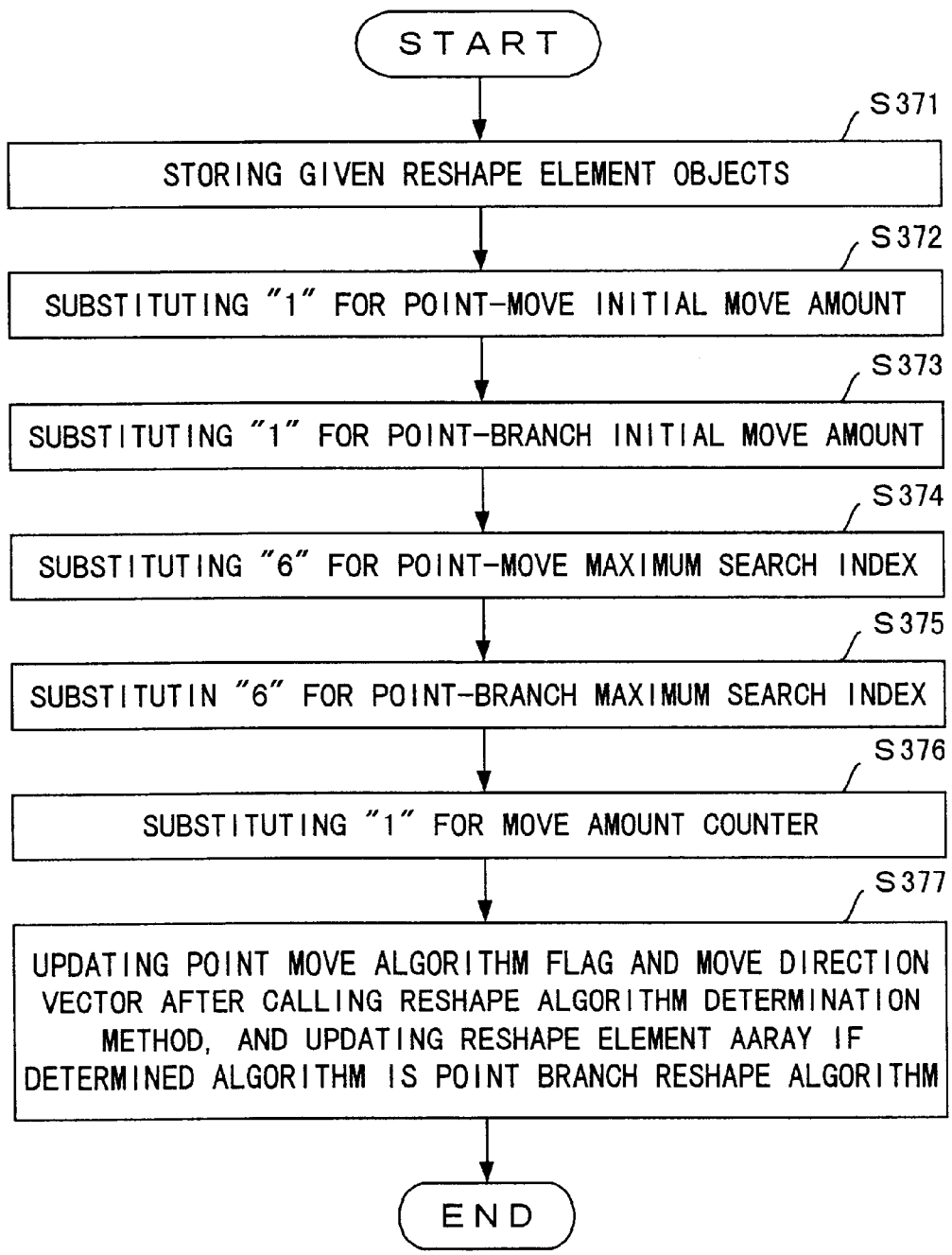
FIG. 44 is a flowchart showing an eighth initialization method.

FIG. 44 is a flowchart showing the process of the initialization method possessed by the Riemann space point move/branch reshape algorithm group object. The initialization method first stores given reshape element objects (step S371).

Next, the initialization method substitutes "1" for a point-move initial move amount (step S372), and substitutes "1" for a point-branch initial move amount (step S373). Then, the method substitutes "6" for a point-move maximum search index (step S374), substitutes "6" for a point-branch maximum search index (step S375), and substitutes "1" for a move amount counter (step S376).

The initialization method then updates a point move algorithm flag and a move direction vector after calling a reshape algorithm determination method, and updates a reshape element array if the determined algorithm is a point branch reshape algorithm (step S377), and terminates the process.

Figure 45:
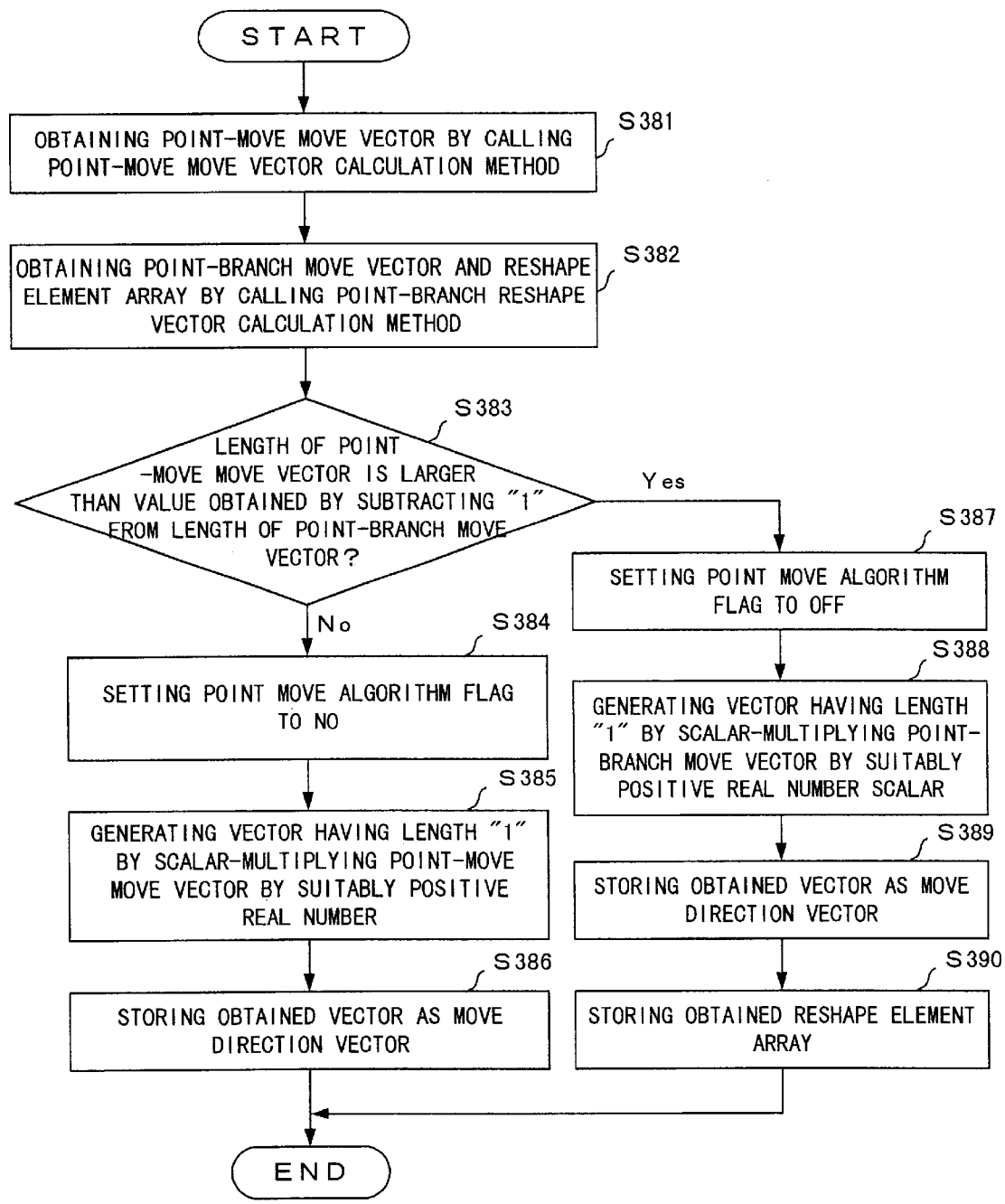
FIG. 45 is a flowchart showing a reshape algorithm determination method.

FIG. 45 is a flowchart showing the process of the reshape algorithm determination method called in step S377. The reshape algorithm determination method first obtains a point-move move vector by calling a point-move move vector calculation method (step S381), and obtain a point-branch move vector and a reshape element array by calling a reshape element array a point-branch move vector calculation method (step S382).

Next, the method compares the length of the point-move move vector with the value obtained by subtracting "1" from the length of the point-branch move vector (step S383). If the former is equal to or longer than the latter, the reshape algorithm determination method determines the adoption of the point move reshape algorithm, sets a point move algorithm flag to ON (step S384), and generates the vector having the length "1" by scalar-multiplying the point-move move vector by a suitably positive real number (step S385). Then, the method stores the obtained vector as a move direction vector (step S386), and terminates the process.

If the former is shorter than the latter, the reshape algorithm determination method determines the adoption of the point branch reshape algorithm, sets a point move algorithm flag to OFF (step S387), and generates the vector having the length "1" by scalar-multiplying the point-branch move vector by a suitably positive real number (step S388). The method stores the obtained vector as a move direction vector (step S389), stores the reshape element array obtained in step S382 (step S389), and terminates the process.

FIG. 46 is a flowchart showing the process of the point-move move vector calculation method which is called in step S381 of FIG. 45. The point-move move vector calculation method obtains the reshape element objects connected to the possessed reshape element objects, and generates a reshape element array including the obtained objects as elements (step S391).

Next, the method substitutes a 0 vector for a total vector possessed by a total vector object (step S392), substitutes "1" for a variable "N" (step S393), and compares the number of elements in the generated reshape element array with the variable "N" (step S394).

If "N" is equal to or smaller than the number of elements, the method extracts an "N" th element of the reshape element array and further extracts the point object possessed by the extracted reshape element object (step S395). Then, the method requests the metric space object to calculate the unit tangent vector at the point object which is possessed by the reshape element object that the method possesses, and exists on the geodesic connecting the two points which correspond to the above described point object and the extracted point object (step S396).

Next, the point-move move vector calculation method adds the calculated unit tangent vector to the total vector (step S397), adds "1" to "N" (step S398), and repeats the operations in and after step S394. If "N" exceeds the number of elements, the method returns the total vector object at that time (step S399) and terminates the process.

Figure 47:
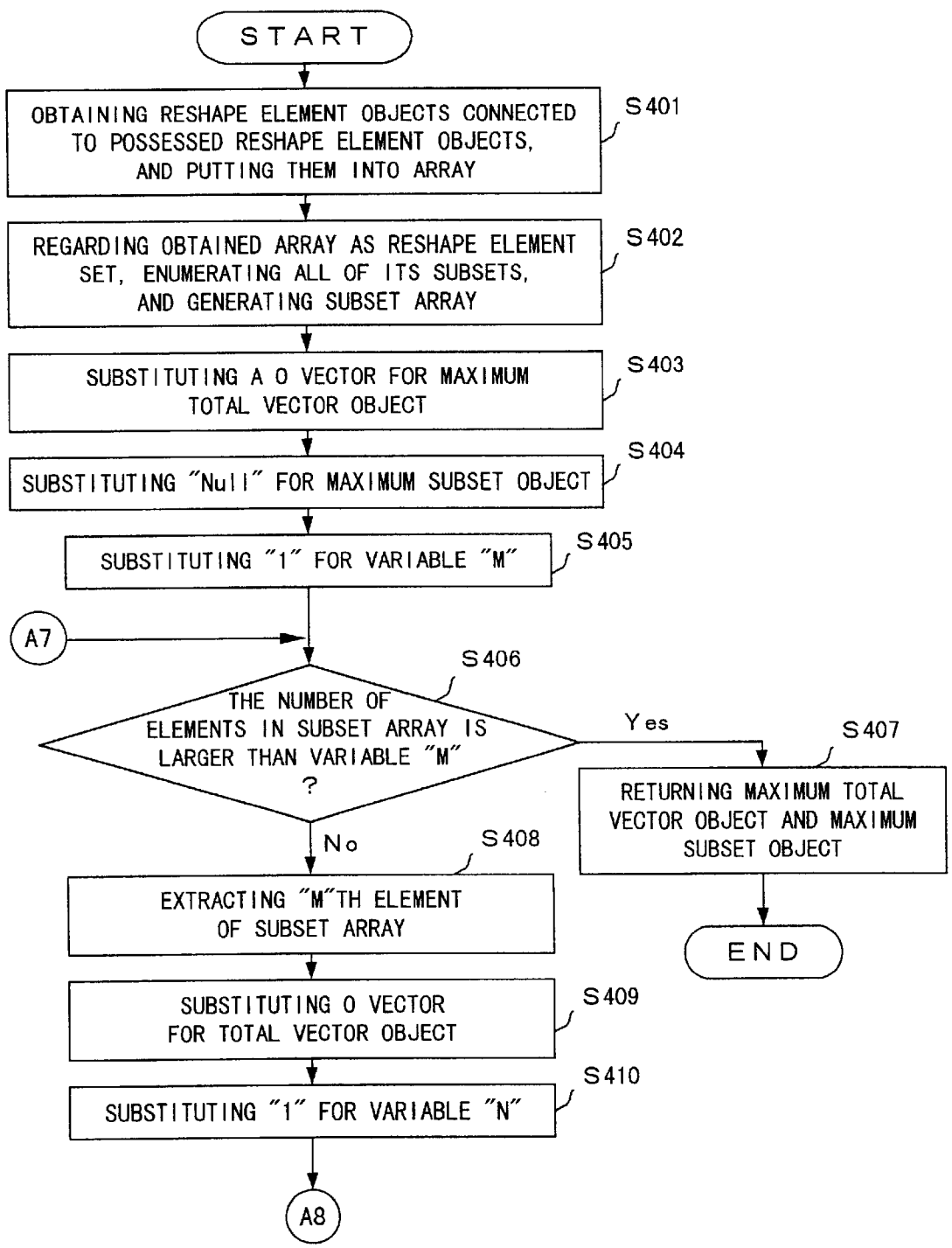
FIG. 47 is a flowchart showing the method for calculating a point-branch move vector (No. 1)

FIGS. 47 and 48 are flowcharts showing the process of the point-branch move vector calculation method which is called in step S382 of FIG. 45. The point-branch move vector calculation method first obtains the reshape element objects connected to its reshape element objects, and generates a reshape element array including the obtained objects as elements (step S401 of FIG. 47). Then, the method regards the obtained array as a set of reshape element objects, enumerates all of its subsets, and generates an array of the subsets (step S402).

Next, the method substitutes a 0 vector for a maximum total vector possessed by a maximum total vector object (step S403), substitutes "Null" for the maximum subset possessed by the maximum subset object (step S404), substitutes "1" for a variable "M" (step S405), and compares the number of elements in the subset array with the variable "M" (step S406). If "M" is larger than the number of elements, the point-branch move vector calculation method returns the maximum total vector object and the maximum subset object at that time (step S407), and terminates the process.

If "M" is equal to or smaller than the number of elements, the method extracts the reshape element array being the "M" th element of the subset array (step S408), substitutes a 0 vector for the total vector (step S409), and substitutes "1" for a variable "N" (step S410). Then, the method compares the number of elements in the extracted element array with the "N" (step S411).

If "N" is equal to or smaller than the number of elements, the method extracts the "N" th element of the reshape element array, and further extracts the point object possessed by the extracted reshape element object (step S412). Then, the method requests the metric space object to calculate a unit tangent vector in a similar manner as in step S396 of FIG. 46 (step S413).

Next, the point-branch move vector calculation method adds the calculated unit tangent vector to the total vector (step S414), adds "1" to "N" (step S415), and repeats the operations in and after step S411. If "N" exceeds the number of elements in step S411, the method adds "1" to "M" (step S416), and compares the length of the maximum total vector with that of the total vector (step S417).

If the total vector is longer than the maximum total vector, the method substitutes the total vector object for the maximum total vector object (step S418), substitutes the "M" th element of the subset array for the maximum subset object (step S419), and repeats the operations in and after step S406. If the length of the total vector is shorter than that of the maximum total vector, the method repeats the operations in and after step S406.

Figure 49:
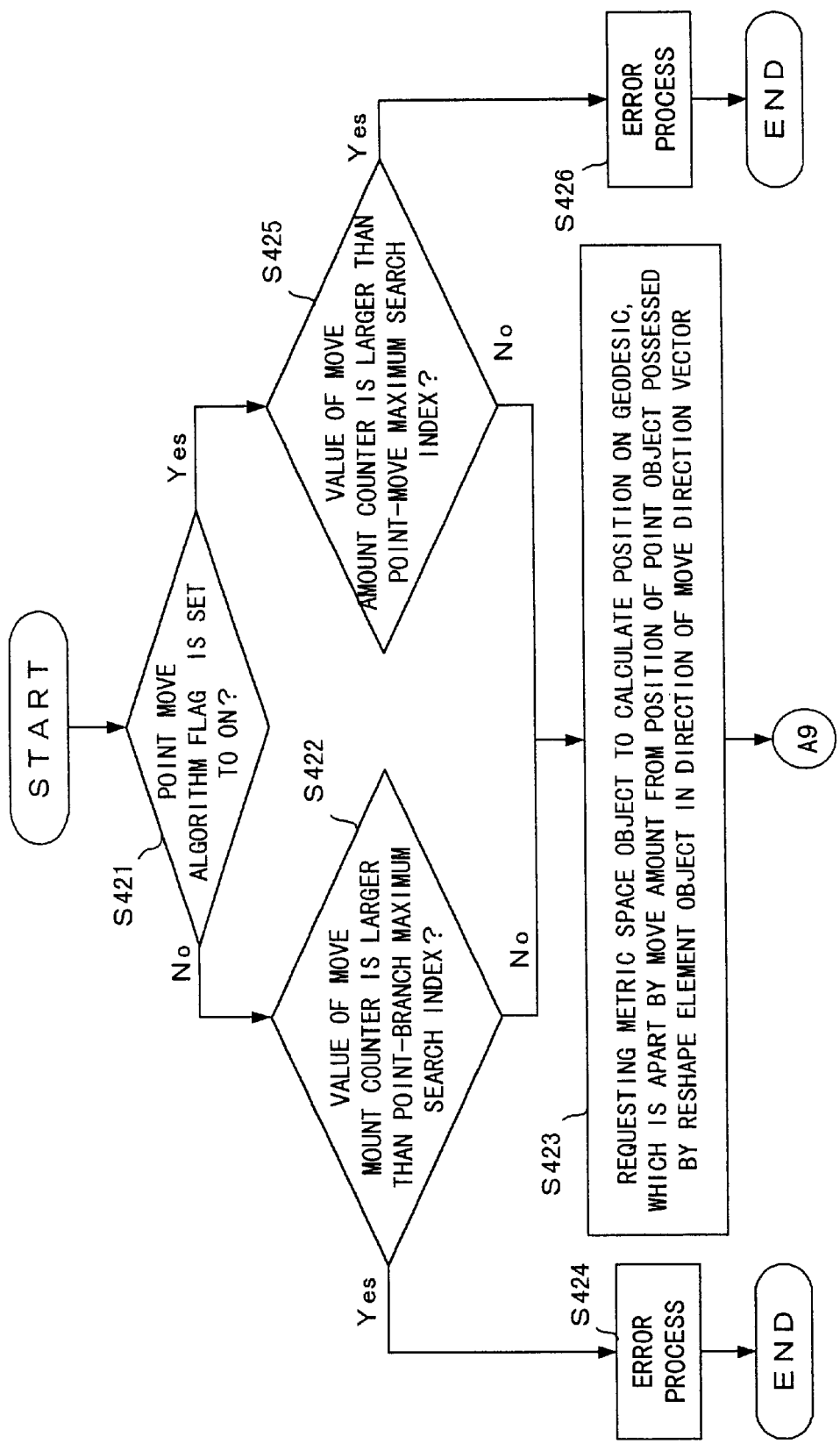
FIG. 49 is a flowchart showing a fourth reshape algorithm method (No. 1)
Figure 50:
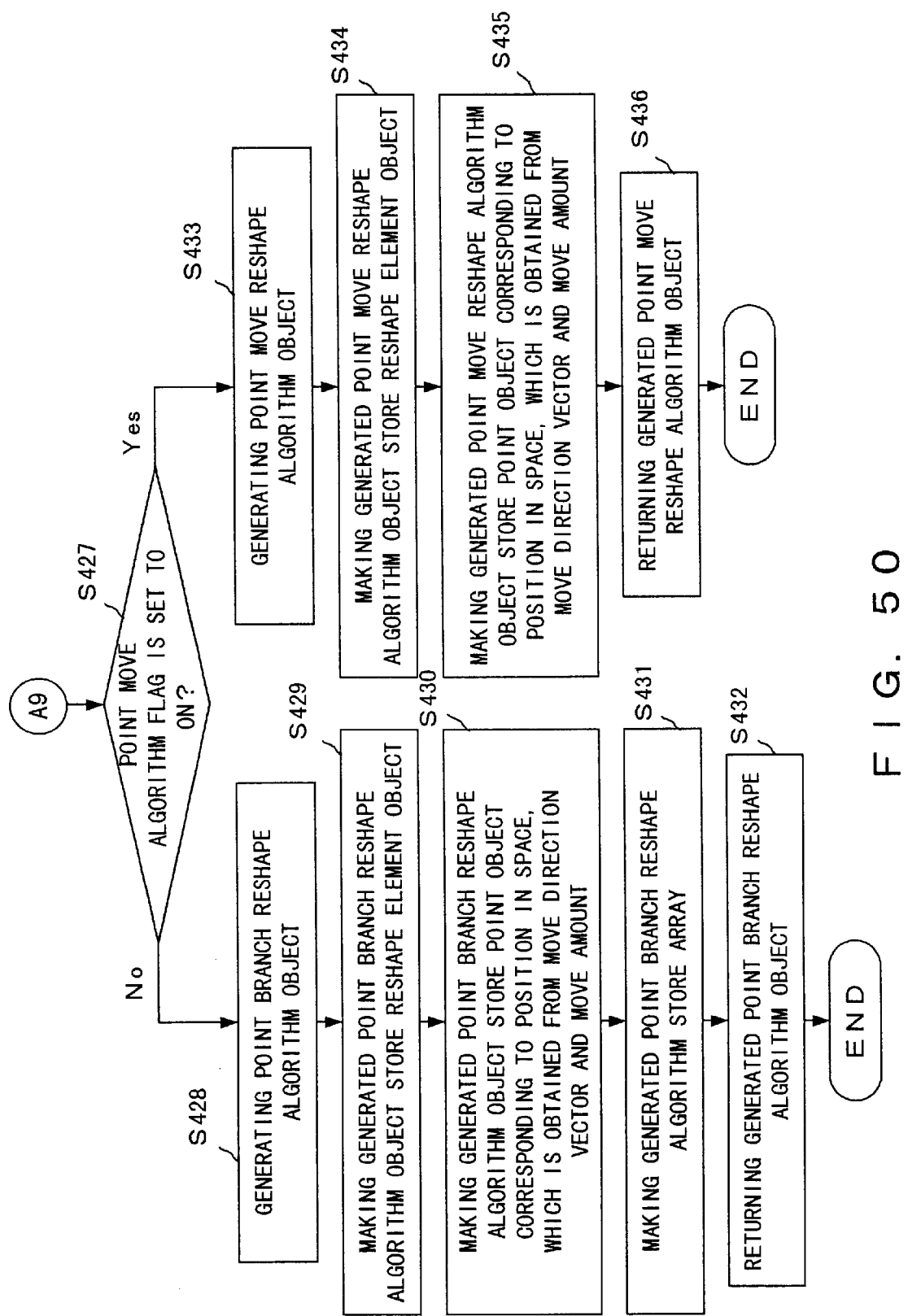
FIG. 50 is a flowchart showing the fourth reshape algorithm method (No. 2)

FIGS. 49 and 50 are flowcharts showing the process of the reshape algorithm method possessed by the Rieman space point move/branch reshape algorithm group object. The reshape algorithm method first checks whether or not a point move algorithm flag is set to ON (step S421 of FIG. 49). If the point move algorithm flag is not set to ON, the method compares the value of a move amount counter with a point-branch maximum search index (step S422).

If the value of the move amount counter is equal to or smaller than the maximum search index, the method requests the metric space object to calculate the position on a geodesic, which is apart by the move amount from the position of the point object possessed by the reshape element object in the direction indicated by a move direction vector (step S423), and performs the process shown in FIG. 50. If the value of the move amount counter is larger than the maximum search index, the method performs an error process (step S424) and terminates the process.

If the point move algorithm flag is set to ON in step S421, the reshape algorithm method compares the value of the move amount counter with the point-move maximum search index (step S425). If the value of the move amount counter is equal to or smaller than the maximum search index, the method performs the operations in and after step S423. If the value of the move amount counter is larger than the maximum search index, the method performs an error process (step S426) and terminates the process.

Next, the reshape algorithm method again checks whether or not a point move algorithm flag is set to ON (step S427 FIG. 50). If the point move algorithm flag is not set to ON, the method generates a point branch reshape algorithm object (step S428), and makes the generated point branch reshape algorithm object store its possessed reshape element object (step S429).

Then, the reshape algorithm method makes the generated point branch reshape algorithm object store the move direction vector and the point object corresponding to the position in a space, which is obtained form the move direction vector and the move amount (step S430), and further makes the reshape algorithm object store its possessed reshape element array (step S431). Then, the method returns this point branch reshape algorithm object (step S432), and terminates the process.

If the point move algorithm flag is set to ON in step S427, the reshape algorithm method generates a point move reshape algorithm object (step S433), and makes the generated point move reshape algorithm object store its possessed reshape element object (step S434).

Next, the method store this point move reshape algorithm object store a point object similar to that in step S430 (step S435), returns the point move reshape algorithm object (step S436), and terminates the process.

Figure 51:
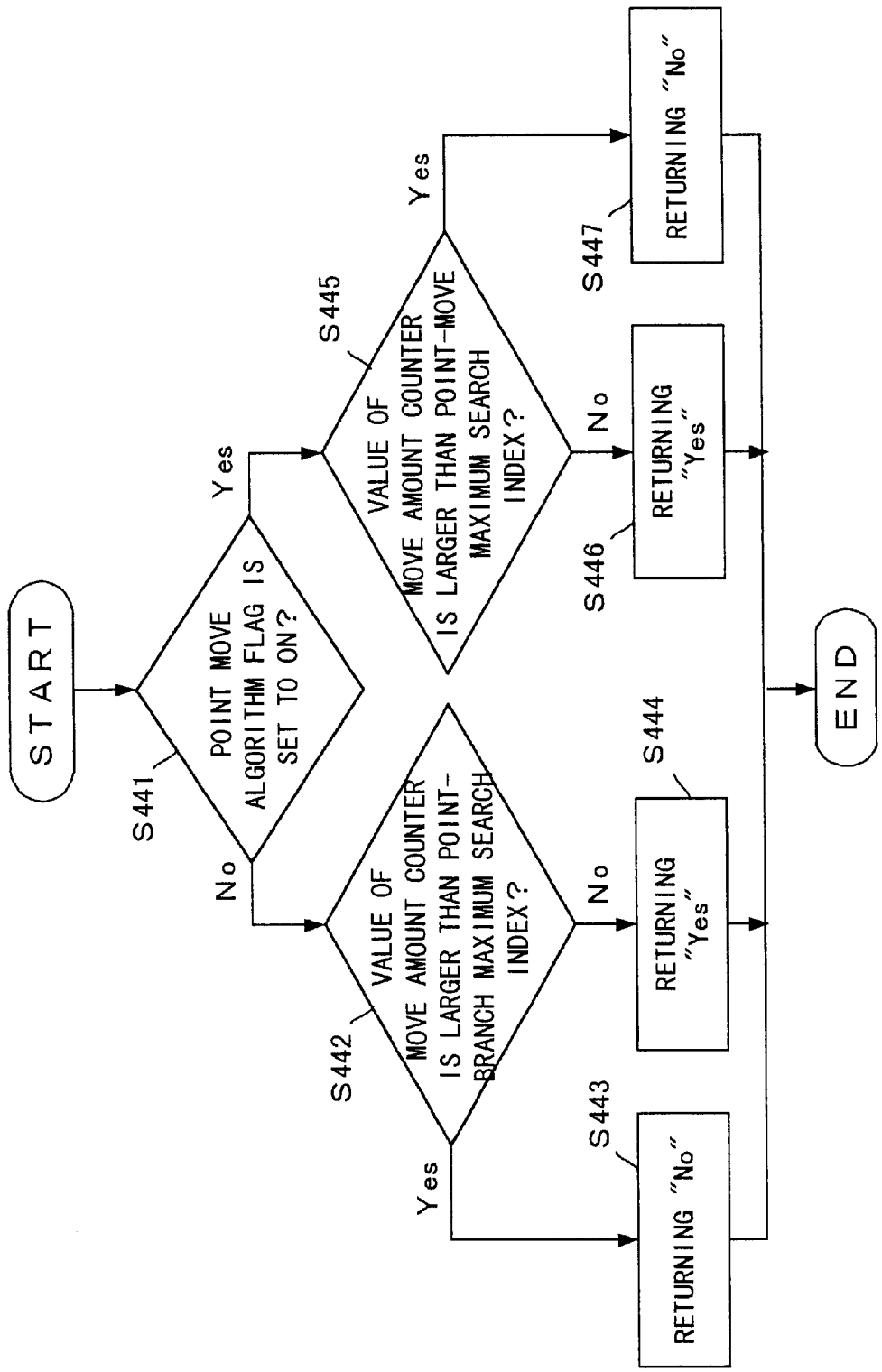
FIG. 51 is a flowchart showing an eighth notification method.

FIG. 51 is a flowchart showing the process of the notification method possessed by the Riemann space point move/branch reshape algorithm group object. The notification method first checks whether or not a point move algorithm flag is set to ON (step S441). If the point move algorithm flag is not set to ON, the notification method compares the value of a move amount counter with a point-branch maximum search index (step S442).

If the value of the move amount counter is larger than the maximum search index, the notification method returns "No" (step S443) and terminates the process. If the value of the move amount counter is equal to or smaller than the maximum search index, the method returns "Yes" (step S444) and terminates the process.

If the point move algorithm flag is set to ON in step S441, the notification method compares the value of the move amount counter with a point move maximum search index (step S445 ). If the value of the move amount counter is equal to or smaller than the maximum search index, the notification method returns "Yes" (step S446) and terminates the process. If the value of the move amount counter is larger than the maximum search index, the method returns "No" (step S447) and terminates the process.

Next, the processes of the respective objects included in the metric space object group 14 are explained by taking as examples the two cases where a metric space is a plane and a three-dimensional RectLinear space.

Initially, if a metric space is a plane, the Riemann space flag possessed by the metric space object is fixed to ON. The point object is generated as a two-dimensional vector object having an "x" and "y" component objects. The "x" component object possesses an "x" component (real number) at a point (x, y) on an x-y coordinates plane, while the "y" component object possesses a "y" component (real number) at this point.

The screen coordinate transformation object possesses a screen horizontal pixel number object and a screen vertical pixel number object. The screen horizontal pixel number object possesses the number (integer) of horizontal pixels on a screen, while the screen vertical pixel number object possesses the number (integer) of vertical pixels on a screen. Here, it is assumed that the numbers of horizontal pixels and vertical pixels are fixed to 300. In this case, the processes of the respective methods are as follows.

FIG. 52 is a flowchart showing the process of the distance method possessed by the metric space object. The distance method first obtains from the two two-dimensional vectors which correspond to given two point objects the two-dimensional vector representing the difference between the two vectors (step S451). Next, the method squares and adds the "x" and the "y" components of the obtained two-dimensional vector, and calculates the square root of the obtained sum (step S452). The method then returns the obtained value (step S453), and terminates the process.

FIG. 53 is a flowchart showing the process of the random method possessed by the metric space object. The random method generates two real numbers which are equal to or larger than −0.5 and equal to or smaller than +0.5 by using a random-number generator (step S461). The method then generates the two-dimensional vector object that possesses a two-dimensional vector composed of the obtained two real numbers as an "x" and "y" components (step S462). Then, the random method returns the generated two-dimensional vector object as a point object (step S463), and terminates the process.

Figure 54:
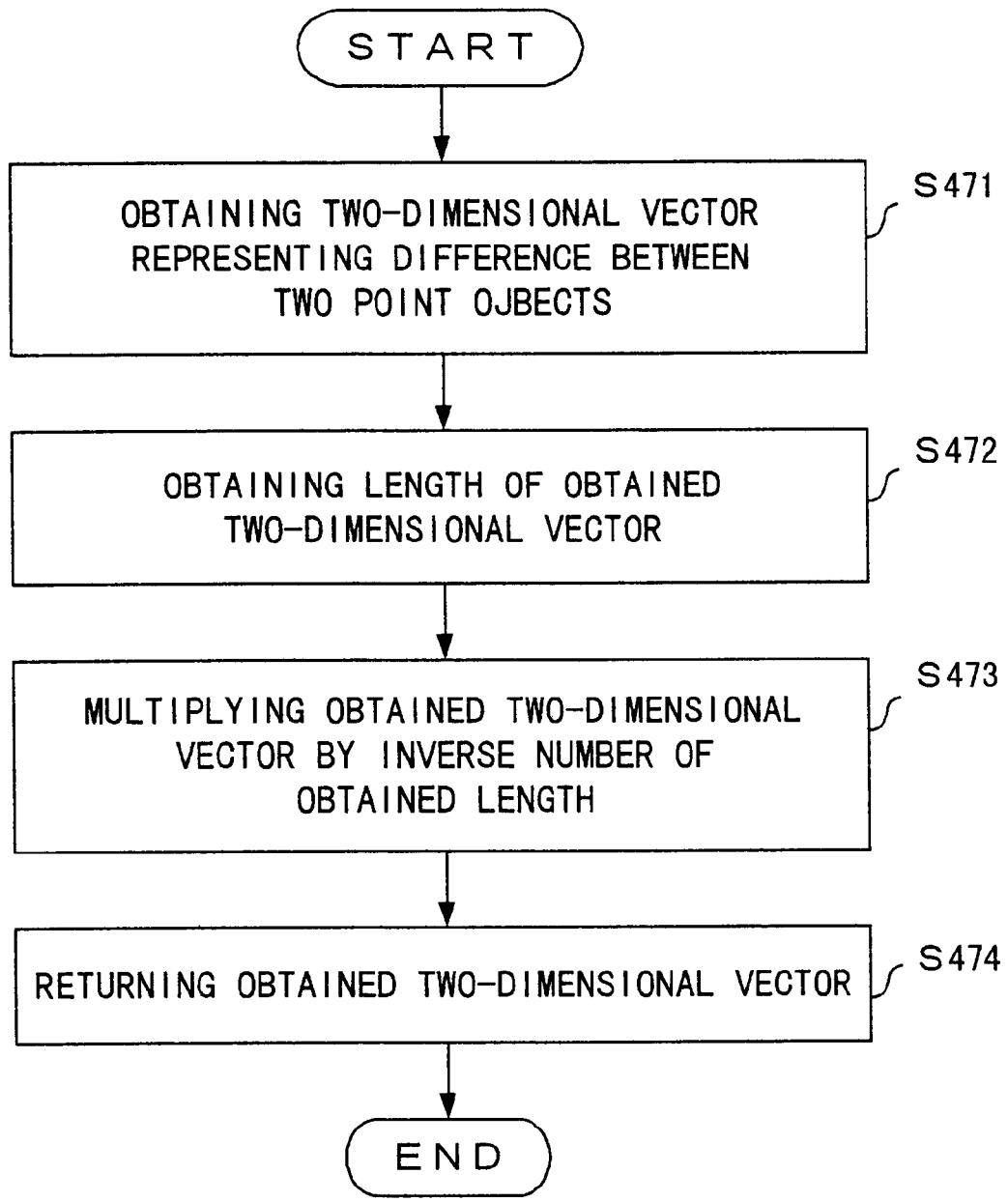
FIG. 54 is a flowchart showing a tangent vector method.

FIG. 54 is a flowchart showing the process of the tangent vector method possessed by the metric space object. The tangent vector method first obtains from the two two-dimensional vectors which correspond to given two point objects the two-dimensional vector representing the difference between the two vectors (step S471), and acquires the length of the obtained two-dimensional vector (step S472). Then, the method scalar-multiplies the obtained two-dimensional vector by an inverse number of the length of the vector (step S473), returns the obtained two-dimensional vector as a unit tangent vector (step S474), and terminates the process.

FIG. 55 is a flowchart showing the process of the geodesic method possessed by the metric space object. The geodesic method first scalar-multiplies a given unit tangent vector by a given length, and calculates a two-dimensional vector (step S481). Then, the geodesic method adds the calculated two-dimensional vector to a given point object (step S482), returns the obtained two-dimensional vector as a point object (step S483), and terminates the process.

Figure 56:
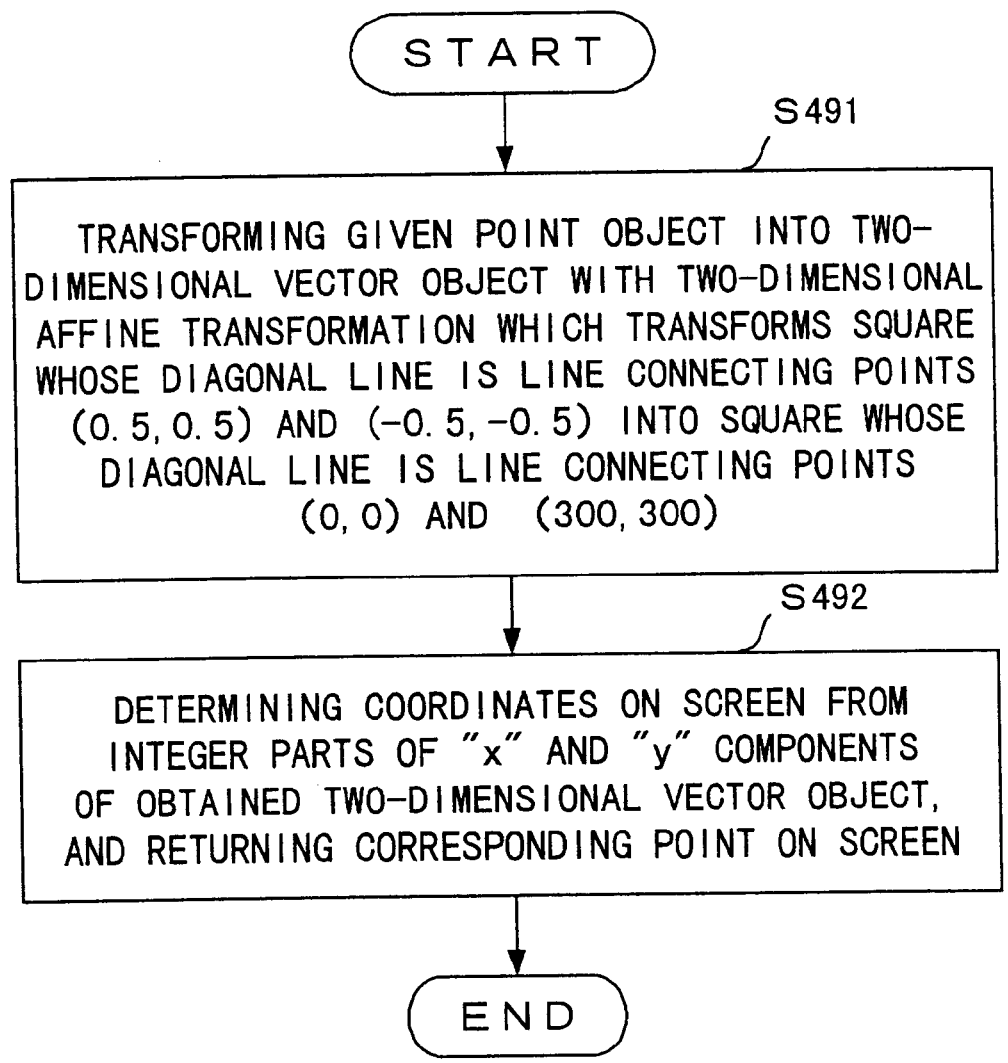
FIG. 56 is a flowchart showing a first coordinate transformation method.

FIG. 56 is a flowchart showing the process of the coordinate transformation method possessed by the screen coordinate transformation object. The coordinate transformation method transforms a given point object into a two-dimensional vector object with two-dimensional affine transformation which transforms the square whose diagonal line is a line connecting points (0.5, 0.5) and (−0.5, −0.5) into the square whose diagonal line is a line connecting points (0, 0) and (300, 300) on an x-y coordinates plane (step S491).

Then, the method determines the coordinates on a screen from the integer parts of the "x" and "y" components of the obtained two-dimensional vector object, returns the corresponding point (step S492), and terminates the process.

Figure 57:
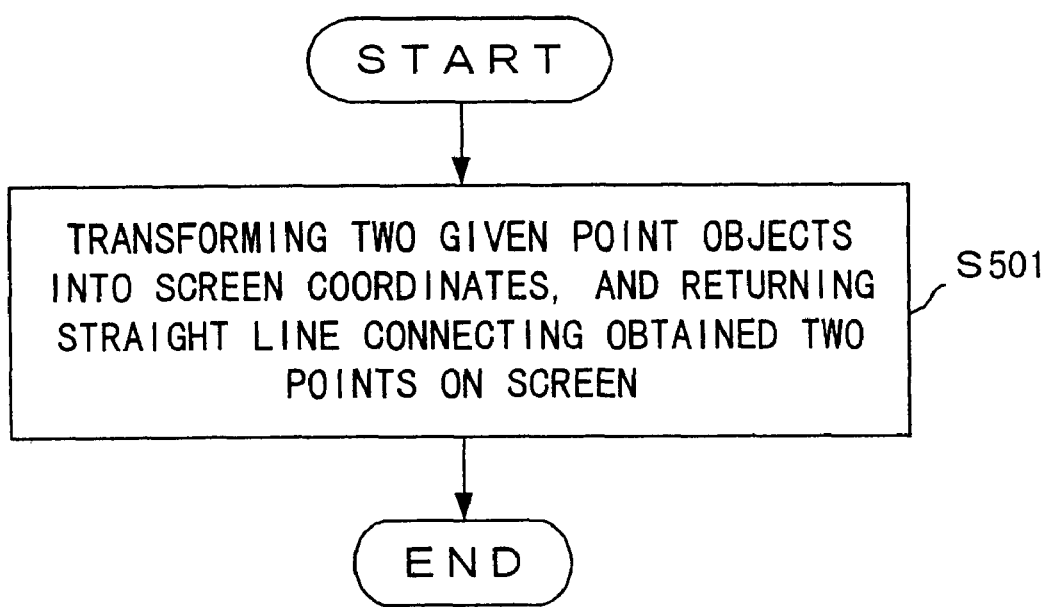
FIG. 57 is a flowchart showing a first line method.

FIG. 57 is a flowchart showing the process of the line method possessed by the screen coordinate transformation object. The line method transforms two given point objects into screen coordinates, returns the straight line connecting the obtained two points on a screen (step S501), and terminates the process.

Next, if the metric space is a three-dimensional RectLinear space, the Riemann space flag is fixed to OFF. The point object is generated as a two-dimensional vector object having an "x" and "y" component objects in a similar manner as on a plane, and the "x" and "y " components are described as integers.

The screen coordinate transformation object possesses the screen horizontal pixel number object and the screen vertical pixel number object in a similar manner as on a plane. Here, it is assumed that the numbers of the horizontal and vertical pixels are fixed to 256. In this case, the processes of the respective methods are as follows.

FIG. 58 is a flowchart showing the process of the distance method possessed by the metric space object. The distance method obtains from the two two-dimensional vectors corresponding to two given point objects the two-dimensional vector representing the difference between the two vectors (step S511). Then, the method adds the absolute values of the "x" and "y" components of the obtained two-dimensional vector (step S512), returns the value acquired by dividing the obtained value by 64 (step S513), and terminates the process.

FIG. 59 is a flowchart showing the process of the random method possessed by the metric space object. The random method first generates two integers which are equal to or larger than "0" and equal to or smaller than "63" by using a random number generator (step S521), generates the two-dimensional vector object having the two-dimensional vector composed of the obtained two integers as an "x" and "y" components (step S522), returns the generated two-dimensional vector object as a point object (step S523), and terminates the process.

Figure 60:
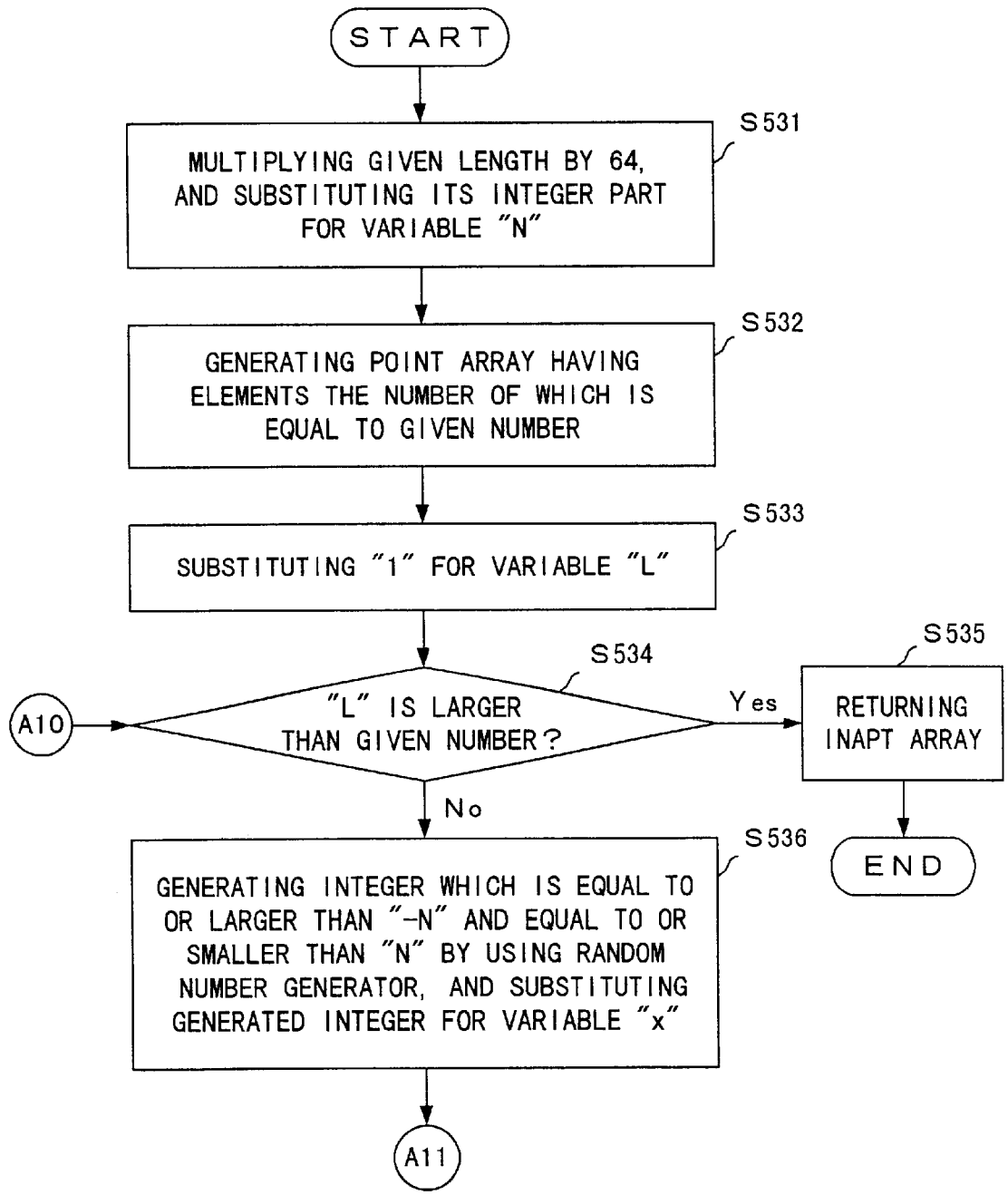
FIG. 60 is a flowchart showing a plural-points method (No. 1)

FIGS. 60 and 61 are flowcharts showing the process of the plural-points method possessed by the metric space object. The plural-points method first multiplies a given length by 64, and substitutes the integer part of the obtained value for a variable "N" (step S531 of FIG. 60). Then, the method generates a point array having elements the number of which is equal to a given number (step S532), substitutes "1" for a variable "L" (step S533), and compares "L" with the given number (step S534). If "L" is larger than the given number, the method returns the point array at that time (step S535) and terminates the process.

If "L" is equal to or smaller than the given number, the method generates an integer which is equal to or larger than −N and equal to or smaller than N by using a random number generator, substitutes the generated integer for a variable "X" (step S536), and compares "X" with "0" (step S537 of FIG. 61). If "X" is equal to or larger than "0", the method generates a positive or a negative sign with the random number generator (step S538), checks the generated sign (step S539). The method substitutes "X-N" for a variable "Y" if the sign is negative (step S540), and substitutes "N-X" for the variable "Y" if the sign is positive (step S541).

Then, the plural-points method generates a point object whose "x" and "y" components are "X" and "Y" (step S542), adds the given and the generated point objects (step S543). Then, the method registers the obtained point object to a point array (step S544), adds "1" to "L" (step S545), and repeats the operations in and after step S534.

If "X" is smaller than "0" in step S537, the method generates a positive or a negative sign with the random number generator (step S546), and checks the generated sign (step S547). The method substitutes "N+X" for the variable "Y" if the sign is positive (step S548), and substitutes "−N−X" for the variable "Y" if the sign is negative (step S549). The method then performs the operations in and after step S542.

Figure 62:
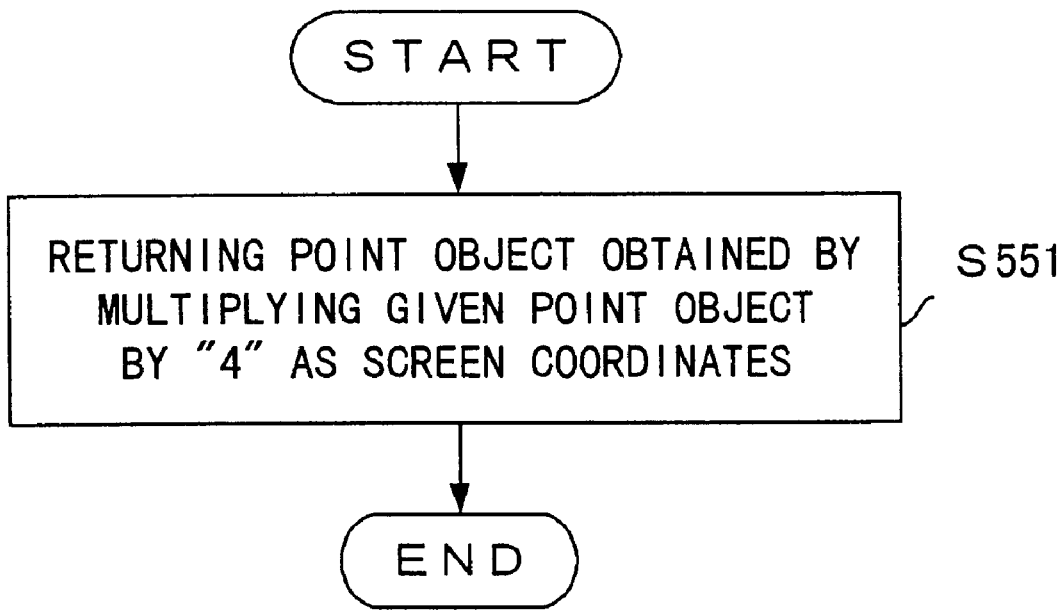
FIG. 62 is a flowchart showing a second coordinate transformation method.

FIG. 62 is a flowchart showing the process of the coordinate transformation method possessed by the screen coordinate transformation object. The coordinate transformation method scalar-multiplies a given point object by "4", returns the obtained point object as screen coordinates (step S551), and terminates the process.

Figure 63:
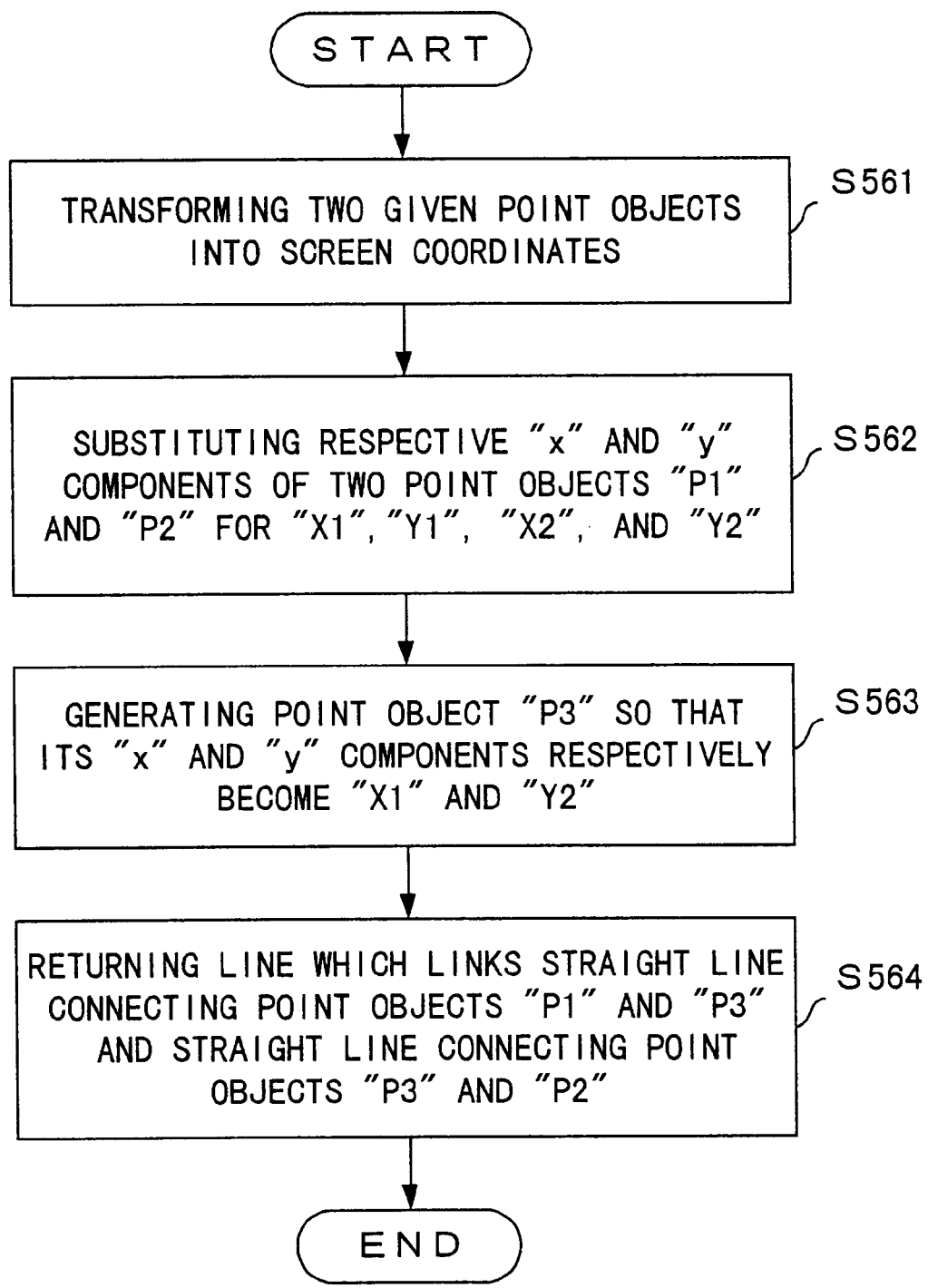
FIG. 63 is a flowchart showing a second line method.

FIG. 63 is a flowchart showing the process of the line method possessed by the screen coordinate transformation object. The line method first transforms two given point objects into screen coordinates (step S561). Then, the line method generates two point objects P1 and P2 which possess the obtained coordinates of the two points on the screen, substitutes the "x" and "y" components of the point object P1 respectively for variables X1 and Y1, and substitutes the "x" and "y" components of the point object P2 respectively for variables X2 and Y2 (step S562).

The line method then generates a point object P3 whose "x" and "y" components are X1 and Y2 (step S563), returns the line which links the straight line connecting P1 and P3 and the straight line connecting P3 and P2 on the screen (step S564), and terminates the process.

Figure 64:
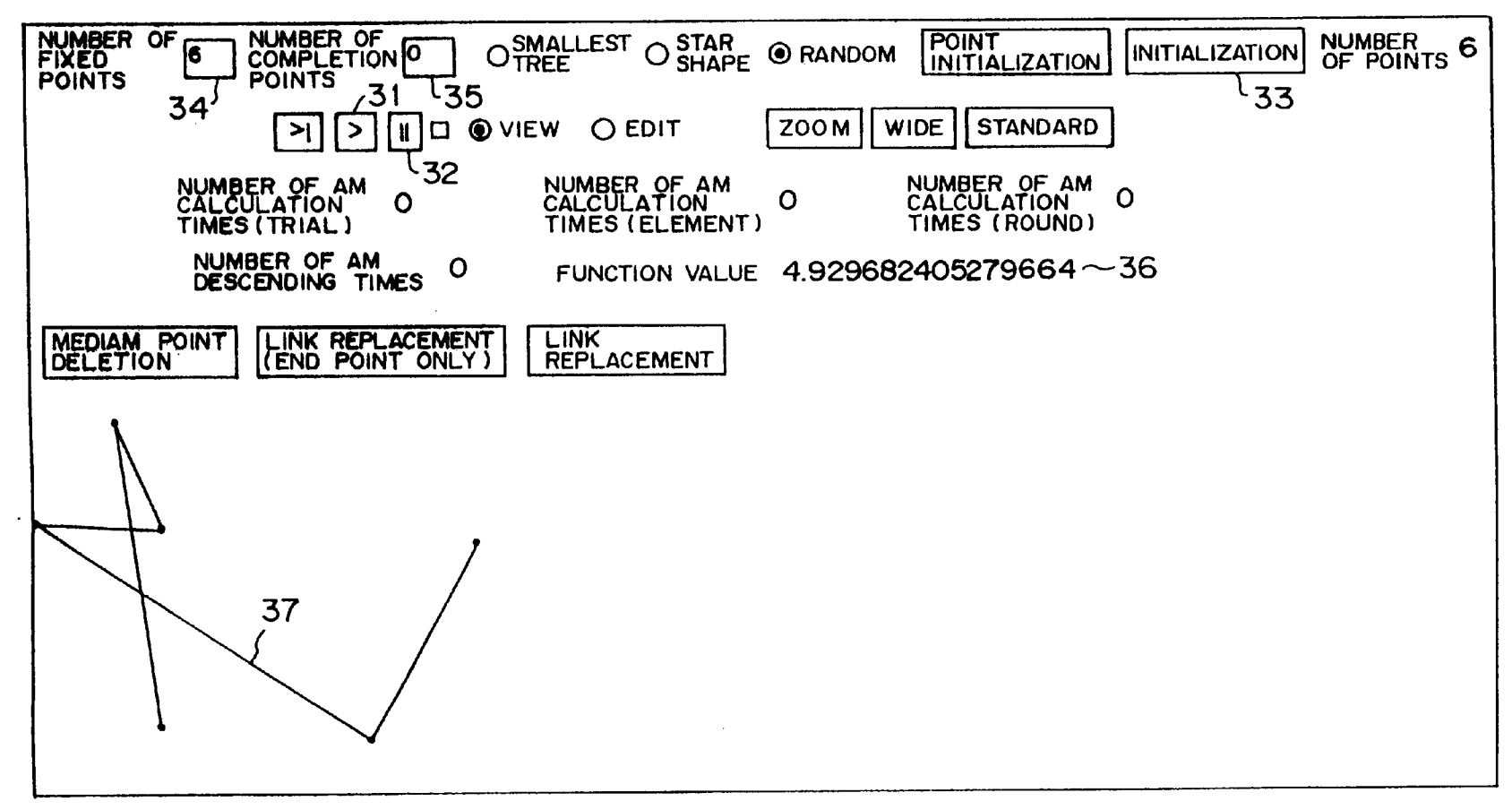
Figure 65:
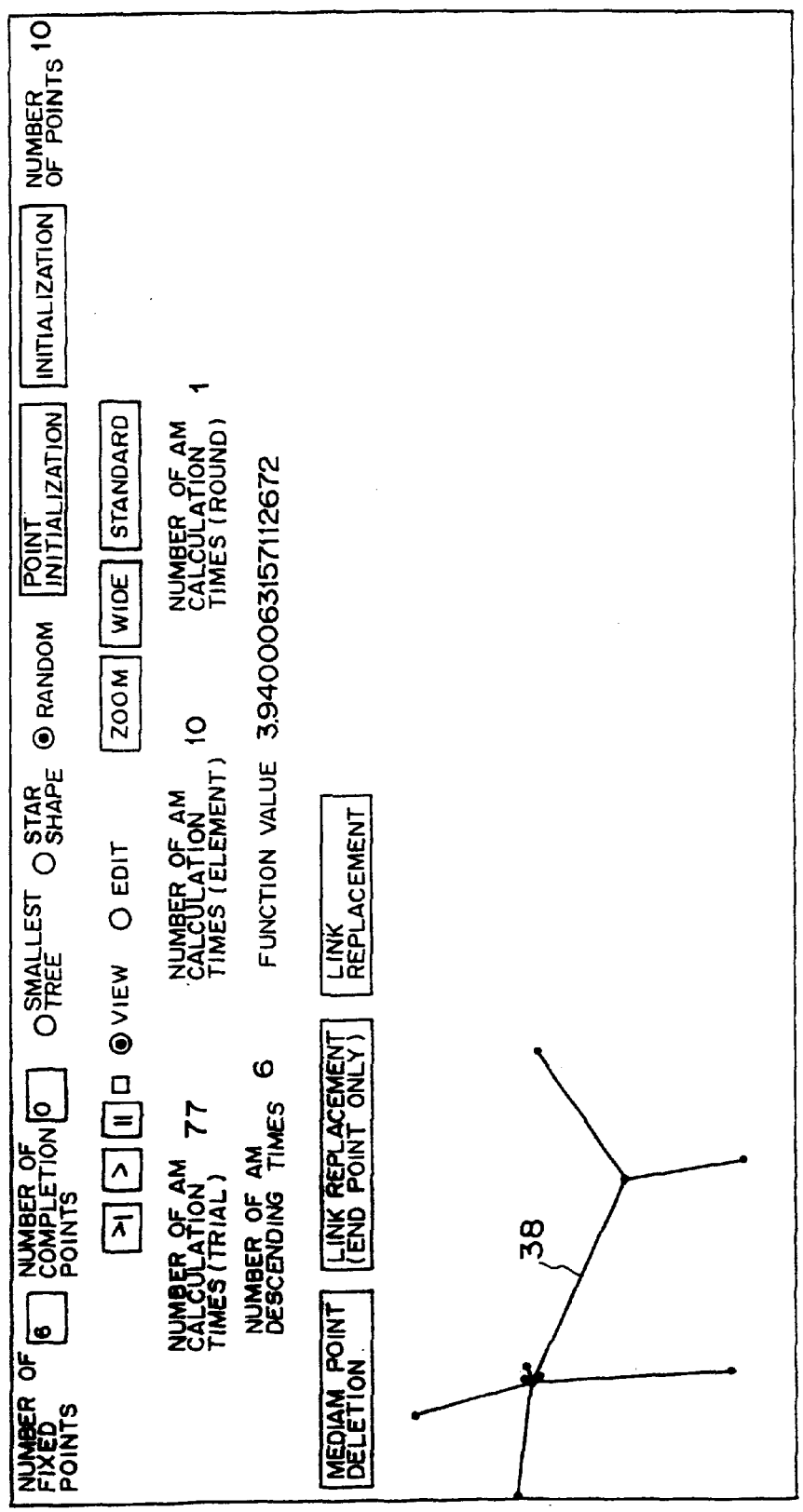
FIG. 65 shows a second display screen.
Figure 66:
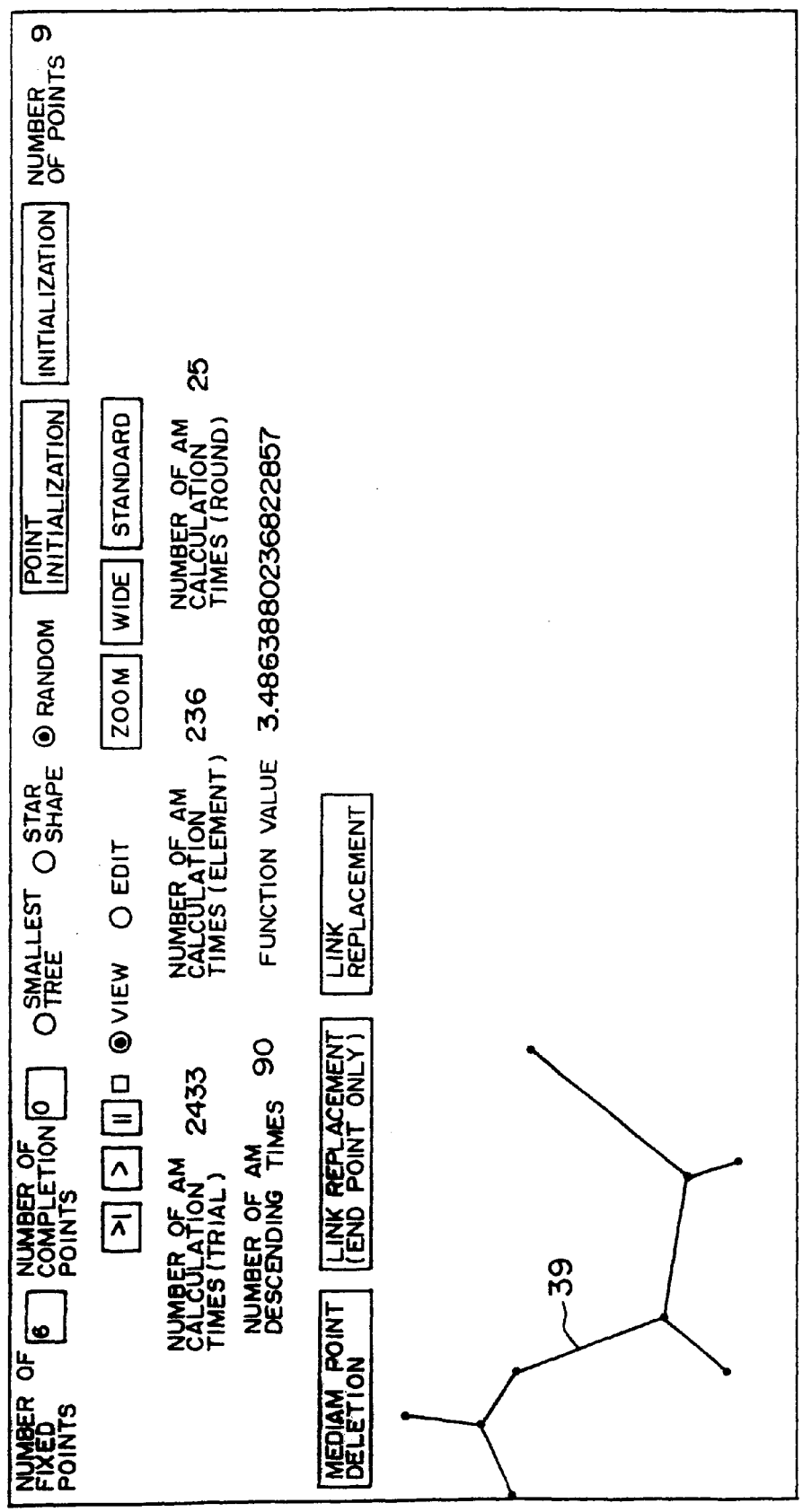
FIG. 66 shows a third display screen.

FIGS. 64 through 66 exemplify display screens at the time of a Steiner problem simulation in the case where a metric space is a plane. On a display screen shown in FIG. 64, buttons 31, 32, and 33 respectively correspond to a start button, a stop button, and a start shape generation button. A field 34 represents the number of initially given fixed nodes, while a field 35 represents the number of completion nodes. A function value 35 represents a cost value. Here, the number of fixed nodes is assumed to be 6, and a tree 37 obtained by connecting these nodes in a suitable order is displayed as a start shape.

If a search is performed based on the tree 37 shown in FIG. 64, the tree 37 reshapes into a tree 38 shown in FIG. 65 on the condition that the number of nodes is 10. When the search sufficiently proceeds, the tree converges to a tree 39 shown in FIG. 66. The tree 39 is proved to have 9 nodes.

Figure 67:
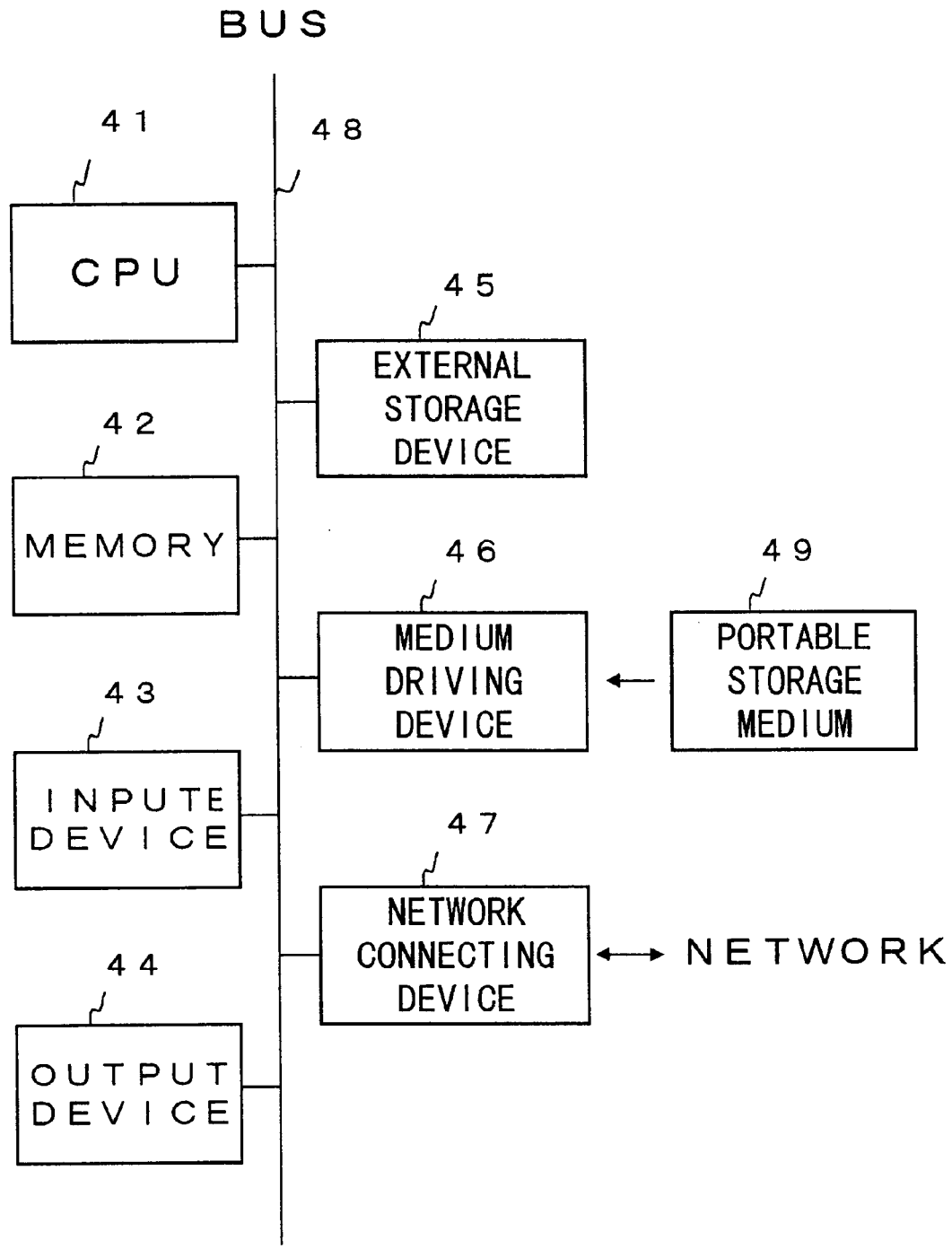
FIG. 67 is a block diagram showing the configuration of an information processing device.

The above described processing device shown in FIG. 6 can be configured by using an information processing device (computer) shown in FIG. 67. The information processing device shown in FIG. 67 comprises a CPU (Central Processing Unit) 41, a memory 42, an input device 43, an output device 44, an external storage device 45, a medium driving device 46, and a network connecting device 47, which are interconnected by a bus 48.

The memory 42 includes, for example, a ROM (Read Only Memory), a RAM (Random Access Memory), etc., and stores a program and data used for processing. The CPU 41 performs necessary processing by executing the program with the memory 42.

Each of the objects included in the search common object group 11, the search interface object group 12, the Steiner problem common object group 13, the metric space object group 14, and the metric space object factory object group 14 corresponds to a software component stored in a particular program code segment in the memory 42, and is implemented by a program composed or one or more instructions.

The input device 43 is, for example, a keyboard, a pointing device, a touch panel, etc, and is used to input an instruction or information from a user. The output device 44 is, for example, a display, a printer, a speaker, etc., and is used to output an inquiry to a user or a processing result.

The external storage device 45 is, for example, a magnetic disk device, an optical disk device, a magneto-optical disk device, etc. Additionally, the above described program and data are stored in the external storage device 45, and can be used by being loaded into the memory 42 depending on need. Furthermore, the external storage device 45 is used also as a database storing the respective objects shown in FIG. 6 as component parts.

The medium driving device 46 drives a portable storage medium 49, and accesses its stored contents. As the portable storage medium 49, an arbitrary computer-readable storage medium such as a memory card, a floppy disk, a CD-ROM (Compact Disk-Read Only Memory), an optical disk, a magneto-optical disk, etc. is used. The above described program and data may be stored onto the portable storage medium 49, and can be used by being loaded into the memory 42 depending on need.

The network connecting device 47 communicates with an external device via an arbitrary network (line) such as a LAN (Local Area Network), etc., and performs data conversion accompanying a communication. Additionally, the above described program and data may be received from an external device, and can be used by being loaded into the memory 42 as occasion demands.

FIG. 68 shows computer-readable storage media which can provide the information processing device shown in FIG. 67 with a program and data. The program and data stored onto the portable storage medium 49 or in an external database 50 are loaded into the memory 49. The CPU 41 executes the program by using the data, and performs necessary processing.

According to the present invention, it is possible to solve a problem of searching for an optimum or locally optimum network in an arbitrary metric space, not limited to a case where the length of a network is given as a Euclidean distance on a plane. Furthermore, the present invention can be applied also to a case where a network installation prohibition area exists, and a case where a space is weighted.

What is claimed is:

1. A processing device, comprising:
    a generating device to generate a shape object which represents a model of a tree in an arbitrary space and possesses a plurality of reshape element objects, each corresponding to a node of the tree and each possessing a point object;
    a storing device to store the shape object;
    a reshaping device to reshape the model of the tree by using a point move reshape algorithm object for moving a position of an existing node of the tree, the point move reshape algorithm object possessing a reshape element object and a replacement point object, said reshaping device extracting the reshape element object possessed by the point move reshape algorithm object, from among the reshape element objects possessed by the shape object, and replacing a previous point object possessed by the reshape element object with the replacement point object; and
    an outputting device to output a reshape result.

2. A processing device, comprising:
    a generating device to generate a shape object which represents a model of a tree in an arbitrary space and possesses a plurality of reshape element objects each corresponding to a node of the tree and each possessing a point object, and a reshape element pair object possessing a plurality of pairs of the reshape element objects;
    a storing device to store the shape object;
    a reshaping device to reshape the model of the tree by using a point branch reshape algorithm object for adding a new node to the model of the tree, for connecting the new node and an existing node of the tree, and for relinking the new node to a connection destination node of the existing node other than the new node, the point branch reshape algorithm object possessing a first reshape element object, a new point object, and a reshape element array object that possesses a second reshape element object, said reshaping device generating a third reshape element object that possesses the new point object, adding the third reshape element object to the shape object, adding a first pair of the first and third reshape element objects to the reshape element pair object, deleting a second pair of the first and second reshape element objects from the reshape element pair object, and adding a pair of the second and third reshape element objects to the reshape element pair object; and
    an outputting device to output a reshape result.

3. A processing device, comprising:
    a generating device to generate a shape object which represents a model of a tree in an arbitrary space and possesses a plurality of reshape element objects each corresponding to a node of the tree and each possessing a point object and a reshape element pair object possessing a plurality of pairs of the reshape element objects;
    a storing device to store the shape object;
    a reshaping device to reshape the model of the tree by using a point contraction reshape algorithm object for moving an existing node of the tree to a connection destination node of the existing node, and for making the existing node and the connection destination node overlap, the point contraction reshape algorithm object possessing first and second reshape element objects, said reshaping device deleting the first reshape element object from the shape object, and replacing the first reshape element object in a pair possessed by the reshape element pair object with the second reshape element object; and
    an outputting device to output a reshape result.

4. A processing device, comprising:
    a generating device to generate a shape object which represents a model of a tree in a Riemann space and possesses a plurality of reshape element objects each corresponding to a node of the tree and each possessing a point object;
    a storing device to store the shape object;
    a reshaping device to reshape the model of the tree by using a point move reshape algorithm object for moving the existing node of the tree to a position on a geodesic which starts from the existing node and goes along a tangent vector at the existing node according to the tangent vector, the point move reshape algorithm object possessing a reshape element object and a replacement point object, said reshaping device extracting the reshape element object possessed by the point move reshape algorithm object, from among the reshape element objects possessed by the shape object, and replacing a previous point object possessed by the reshape element object with the replacement point object possessed by the point move reshape algorithm object;
    an outputting device to output a reshape result; and
    a searching device to search for a local Steiner tree in the Riemann space by using the reshape result.

5. The processing device according to claim 4, wherein said reshaping device generates the tangent vector at the existing node by using a unit tangent vector at the position of the existing node on the geodesic connecting the existing node and a connection destination node of the existing node.

6. A processing device, comprising:
    a generating device to generate a shape object which represents a model of a tree in a Riemann space and possesses a plurality of reshape element objects each corresponding to a node of the tree and each possessing a point object, and a reshape element pair object possessing a plurality of pairs of the reshape element objects;

a storing device to store the shape object;

a reshaping device to reshape the model of the tree by using a point branch reshape algorithm object for adding a new node at a position on a geodesic which starts from an existing node of the tree and goes along a tangent vector at the existing node according to the tangent vector, for connecting the new node and the existing node, and for relinking the new node to a connection destination node of the existing node other than the new node, the point branch reshape algorithm object possessing a first reshape element object, a new point object, and a reshape element array object that possesses a second reshape element object, said reshaping device generating a third reshape element object that possesses the new point object, adding the third reshape element object to the shape object, adding a first pair of the first and third reshape element objects to the reshape element pair object, deleting a second pair of the first and second reshape element objects from the reshape element pair object, and adding a third pair of the second and third reshape element objects to the reshape element pair object;

an outputting device to output a reshape result; and a searching device to search for a local Steiner tree in the Riemann space by using the reshape result.

7. The processing device according to claim 6, wherein said reshaping device generates a tangent vector the magnitude of which exceeds a predetermined value by using one or more unit tangent vectors at a position of the existing node on one or more geodesics connecting the existing node and one or more connection destination nodes of the existing node, and uses the generated tangent vector as the tangent vector at the existing node.

8. The processing device according to claim 7, wherein said reshaping device selects the one or more unit tangent vectors so that a magnitude of the tangent vector at the existing node becomes a maximum.

9. The processing device according to claim 7, wherein said reshaping device selects the one or more unit tangent vectors so that a magnitude of the tangent vector at the existing node becomes close to a maximum.

10. A processing device, comprising:

a generating device to generate a shape object which represents a model of a tree in a Riemann space and possesses a plurality of reshape element objects each corresponding to a node of the tree and each possessing a point object and a reshape element pair object possessing a plurality of pairs of the reshape element objects;

a storing device to store the shape object;

a reshaping device to reshape the model of the tree by selecting a reshape algorithm object which improves a cost value of the model of the tree from among a point move reshape algorithm object for moving an existing node of the tree to a position on a geodesic which starts from the existing node and goes along a first tangent vector at the existing node according to the first tangent vector, and a point branch reshape algorithm object for adding a new node at a position on a geodesic which starts from the existing node and goes along a second tangent vector at the existing node according to the second tangent vector, for connecting the new node and the existing node, and for relinking to the new node a connection destination node of the existing node other than the new node, the point move reshape algorithm object possessing a first reshape element object and a first point object, and the point branch reshape algorithm object possessing a second reshape element object, a second point object, and a reshape element array object that possesses a third reshape element object;

an outputting device to output a reshape result; and a searching device to search for a local Steiner tree in the Riemann space by using the reshape result, wherein, when the point move reshape algorithm object is selected, said reshaping device extracts the first reshape element object from among the reshape element objects possessed by the shape object and replaces a third point object possessed by the first reshape element object with the first point object, and when the point branch reshape algorithm object is selected, said reshaping device generates a fourth reshape element object that possesses the second point object, adds the fourth reshape element object to the shape object, adds a first pair of the second and fourth reshape element objects to the reshape element pair object, deletes a second pair of the second and third reshape element objects from the reshape element pair object, and adds a third pair of the third and fourth reshape element objects to the reshape element pair object.

11. The processing device according to claim 1, wherein at least one of said generating device, said storing device, said reshaping device, and said outputting device includes a common component part which does not depend on a nature of the arbitrary space.

12. The processing device according to claim 1, wherein at least one of said generating device, said storing device, said reshaping device, and said outputting device includes an individual component part which is exchangeable according to a nature of the arbitrary space.

13. A computer-readable storage medium on which is recorded a program for causing a computer to perform a method comprising:

generating a shape object which represents a model of a tree in an arbitrary space and possesses a plurality of reshape element objects, each corresponding to a node of the tree and each possessing a point object;

reshaping the model of the tree based on an existing node included in the model of the tree by using a point move reshape algorithm object for moving a position of an existing node of the tree, the point move reshape algorithm object possessing a reshape element object and a replacement point object, by extracting the reshape element object possessed by the point move reshape algorithm object, from among the reshape element objects possessed by the shape object, and replacing a previous point object possessed by the reshape element object with the replacement point object; and outputting a reshape result.

14. A computer-readable storage medium on which is recorded a program for causing a computer to perform a method comprising:

generating a shape object which represents a model of a tree in an arbitrary space and possesses a plurality of reshape element objects each corresponding to a node of the tree and each possessing a point object, and a reshape element pair object possessing a plurality of pairs of the reshape element objects;

reshaping the model of the tree based on an existing node included in the model of the tree by using a point branch reshape algorithm object for adding a new node to the model of the tree, for connecting the new node and an existing node of the tree, and for relinking the new node to a connection destination node of the existing node other than the new node, the point branch reshape algorithm object possessing a first reshape element object, a new point object, and a reshape element array object that possesses a second reshape element object, by generating a third reshape element object that possesses the new point object, adding the third reshape element object to the shape object, adding a first pair of the first and third reshape element objects to the reshape element pair object, deleting a second pair of the first and second reshape element objects from the reshape element pair object, and adding a pair of the second and third reshape element objects to the reshape element pair object; and outputting a reshape result.

15. A computer-readable storage medium on which is recorded a program for causing a computer to perform a method comprising:

generating a shape object which represents a model of a tree in an arbitrary space and possesses a plurality of reshape element objects each corresponding to a node of the tree and each possessing a point object and a reshape element pair object possessing a plurality of pairs of the reshape element objects;

reshaping the model of the tree based on an existing node included in the model of the tree by using a point contraction reshape algorithm object for moving the existing node to a connection destination node of the existing node, and for making the existing node and the connection destination node overlap, the point contraction reshape algorithm object possessing first and second reshape element objects, by deleting the first reshape element object from the shape object and replacing the first reshape element object in a pair possessed by the reshape element pair object with the second reshape element object; and outputting a reshape result.

16. A computer-readable storage medium on which is recorded a program for causing a computer to perform a method comprising:

generating a shape object which represents a model of a tree in an arbitrary space and possesses a plurality of reshape element objects, each corresponding to a node of the tree and each possessing a point object;

reshaping the model of the tree based on an existing node included in the model of the tree by using a point move reshape algorithm object for moving the existing node to a position on a geodesic which starts from the existing node and goes along a tangent vector at the existing node according to the tangent vector, the point move reshape algorithm object possessing a reshape element object and a replacement point object, by extracting the reshape element object possessed by the point move reshape algorithm object, from among the reshape element objects possessed by the shape object, and replacing a previous point object possessed by the reshape element object with the replacement point object possessed by the point move reshape algorithm object; and outputting a reshape result.

17. A computer-readable storage medium on which is recorded a program for causing a computer to perform a method comprising:

generating a shape object which represents a model of a tree in an arbitrary space and possesses a plurality of reshape element objects each corresponding to a node of the tree and each possessing a point object, and a reshape element pair object possessing a plurality of pairs of the reshape element objects;

reshaping the model of the tree based on an existing node included in the model of the tree by using a point branch reshape algorithm object for adding a new node at a position on a geodesic which starts from the existing node and goes along a tangent vector at the existing node according to the tangent vector for connecting the new node and the existing node, and for relinking the new node to a connection destination node of the existing node other than the new node, the point branch reshape algorithm object possessing a first reshape element object, a new point object, and a reshape element array object that possesses a second reshape element object, by generating a third reshape element object that possesses the new point object, adding the third reshape element object to the shape object, adding a first pair of the first and third reshape element objects to the reshape element pair object, deleting a second pair of the first and second reshape element objects from the reshape element pair object, and adding a third pair of the second and third reshape element objects to the reshape element pair object; and outputting a reshape result.

18. A computer-readable storage medium on which is recorded a program for causing a computer to perform a method comprising:

generating a shape object which represents a model of a tree in an arbitrary space and possesses a plurality of reshape element objects each corresponding to a node of the tree and each possessing a point object and a reshape element pair object possessing a plurality of pairs of the reshape element objects;

reshaping the model of the tree based on an existing node included in the model of the tree by selecting a reshape algorithm object which improves a cost value of the model of the tree among a point move reshape algorithm object for moving an existing node to a position on a geodesic which starts from the existing node and goes along a first tangent vector at the existing node according to the first tangent vector, and a point branch reshape algorithm object for adding a new node at a position on a geodesic which starts from the existing node and goes along a second tangent vector at the existing node according to the second tangent vector, for connecting the new node and the existing node, and for relinking to the new node a connection destination node of the existing node other than the new node, the point move reshape algorithm object possessing a first reshape element object and a first point object, and the point branch reshape algorithm object possessing a second reshape element object, a second point object, and a reshape element array object that possesses a third reshape element object; and outputting a reshape result, wherein, when the point move reshape algorithm object is selected, said reshaping device extracts the first reshape element object from among the reshape element objects possessed by the shape object and replaces a third point object possessed by the first reshape element object with the first point object, and when the point branch reshape algorithm object is selected, said reshaping device generates a fourth reshape element object that possesses the second point object, adds the fourth reshape element object to the shape object, adds a first pair of the second and fourth reshape element objects to the reshape element pair object, deletes a second pair of the second and third reshape element objects from the reshape element pair object, and adds a third pair of the third and fourth reshape element objects to the reshape element pair object.

19. The computer-readable storage medium according to claim 13, wherein a common component part which does not depend on a nature of the space and is included in the program causes the computer to perform at least one of said generating, reshaping, and outputting.

20. The computer-readable storage medium according to claim 13, wherein an individual component part which is exchangeable according to a nature of the space and is included in the program causes the computer to perform at least one of said generating, reshaping, and outputting.

21. A processing device, comprising:

generating means for generating a shape object which represents a model of a tree in an arbitrary space and possesses a plurality of reshape element objects, each corresponding to a node of the tree and each possessing a point object;

storing means for storing the shape object;

reshaping means for reshaping the model of the tree by using a point move reshape algorithm object for moving a position of an existing node of the tree, the point move reshape algorithm object possessing a reshape element object and a replacement point object, said reshaping means extracting the reshape element object possessed by the point move reshape algorithm object, from among the reshape element objects possessed by the shape object, and replacing a previous point object possessed by the reshape element object with the replacement point object; and outputting means for outputting a reshape result.

22. A processing device, comprising:

generating means for generating a shape object which represents a model of a tree in an arbitrary space and possesses a plurality of reshape element objects each corresponding to a node of the tree and each possessing a point object, and a reshape element pair object possessing a plurality of pairs of the reshape element objects;

storing means for storing the shape object;

reshaping means for reshaping the model of the tree by using a point branch reshape algorithm object for adding a new node to the model of the tree, for connecting the new node and an existing node of the tree, and for relinking the new node to a connection destination node of the existing node other than the new node, the point branch reshape algorithm object possessing a first reshape element object, a new point object, and a reshape element array object that possesses a second reshape element object, said reshaping means generating a third reshape element object that possesses the new point object, adding the third reshape element object to the shape object, adding a first pair of the first and third reshape element objects to the reshape element pair object, deleting a second pair of the first and second reshape element objects from the reshape element pair object, and adding a pair of the second and third reshape element objects to the reshape element pair object; and outputting means for outputting a reshape result.

23. A processing device, comprising:

generating means for generating a shape object which represents a model of a tree in an arbitrary space and possesses a plurality of reshape element objects each corresponding to a node of the tree and each possessing a point object and a reshape element pair object possessing a plurality of pairs of the reshape element objects;

storing means for storing the shape object;

reshaping means for reshaping the model of the tree by using a point contraction reshape algorithm object for moving an existing node of the tree to a connection destination node of the existing node, and for making the existing node and the connection destination node overlap, the point contraction reshape algorithm object possessing first and second reshape element objects, said reshaping device deleting the first reshape element object from the shape object, and replacing the first reshape element object in a pair possessed by the reshape element pair object with the second reshape element object; and outputting means for outputting a reshape result.

24. A processing device, comprising:

generating means for generating a shape object which represents a model of a tree in a Riemann space and possesses a plurality of reshape element objects, each corresponding to a node of the tree and each possessing a point object;

storing means for storing the shape object;

reshaping means for reshaping the model of the tree by using a point move reshape algorithm object for moving the existing node of the tree to a position on a geodesic which starts from the existing node and goes along a tangent vector at the existing node according to the tangent vector, the point move reshape algorithm object possessing a reshape element object and a replacement point object, said reshaping means extracting the reshape element object possessed by the point move reshape algorithm object, from among the reshape element objects possessed by the shape object, and replacing a previous point object possessed by the reshape element object with the replacement point object possessed by the point move reshape algorithm object;

outputting means for outputting a reshape result; and searching means for searching for a local Steiner tree in the Riemann space by using the reshape result.

25. A processing device, comprising:

generating means for generating a shape object which represents a model of a tree in a Riemann space and possesses a plurality of reshape element objects each corresponding to a node of the tree and each possessing a point object, and a reshape element pair object possessing a plurality of pairs of the reshape element objects;

storing means for storing the shape object;

reshaping means for reshaping the model of the tree by using a point branch reshape algorithm object for adding a new node at a position on a geodesic which starts from an existing node of the tree and goes along a tangent vector at the existing node by using the tangent vector, for connecting the new node and the existing node, and for relinking the new node to a connection destination node of the existing node other than the new node, the point branch reshape algorithm object possessing a first reshape element object, a new point object, and a reshape element array object that possesses a second reshape element object, said reshaping means generating a third reshape element object that possesses the new point object, adding the third reshape element object to the shape object, adding a first pair of the first and third reshape element objects to the reshape element pair object, deleting a second pair of the first and second reshape element objects from the reshape element pair object, and adding a pair of the second and third reshape element objects to the reshape element pair object;

outputting means for outputting a reshape result; and searching means for searching for a local Steiner tree in the Riemann space by using the reshape result.

26. A processing device, comprising:

generating means for generating a shape object which represents a model of a tree in a Riemann space and possesses a plurality of reshape element objects each corresponding to a node of the tree and each possessing a point object and a reshape element pair object possessing a plurality of pairs of the reshape element objects;

storing means for storing the shape object;

reshaping means for reshaping the model of the tree by selecting a reshape algorithm object which improves a cost value of the model of the tree among a point move reshape algorithm object for moving an existing node to a position on a geodesic which starts from the existing node and goes along a first tangent vector at the existing node according to the first tangent vector, and a point branch reshape algorithm object for adding a new node at a position on a geodesic which starts from the existing node and goes along a second tangent vector at the existing node according to the second tangent vector, for connecting the new node and the existing node, and for relinking the new node to a connection destination node of the existing node other than the new node, the point move reshape algorithm object possessing a first reshape element object and a first point object, and the point branch reshape algorithm object possessing a second reshape element object, a second point object, and a reshape element array object that possesses a third reshape element object;

outputting means for outputting a reshape result; and searching means for searching for a local Steiner tree in the Riemann space by using the reshape result, wherein, when the point move reshape algorithm object is selected, said reshaping means extracts the first reshape element object from among the reshape element objects possessed by the shape object and replaces a third point object possessed by the first reshape element object with the first point object, and when the point branch reshape algorithm object is selected, said reshaping means generates a fourth reshape element object that possesses the second point object, adds the fourth reshape element object to the shape object, adds a first pair of the second and fourth reshape element objects to the reshape element pair object, deletes a second pair of the second and third reshape element objects from the reshape element pair object, and adds a third pair of the third and fourth reshape element objects to the reshape element pair object.

27. The processing device according to claim 24, wherein at least one of said generating means, said storing means, said reshaping means, and said outputting means includes a common component part which does not depend on a nature of the arbitrary space.

28. The processing device according to claim 24, wherein at least one of said generating means, said storing means, said reshaping means, and said outputting means includes an individual component part which is exchangeable according to a nature of the arbitrary space.

* * * * *